US010616155B2

(12) United States Patent
Choi et al.

(10) Patent No.: US 10,616,155 B2
(45) Date of Patent: Apr. 7, 2020

(54) MOBILE TERMINAL AND METHOD FOR CONTROLLING THE SAME

(71) Applicant: LG ELECTRONICS INC., Seoul (KR)

(72) Inventors: Huran Choi, Seoul (KR); Younhwa Choi, Seoul (KR); Hyungtae Jang, Seoul (KR); Yoojin Choi, Seoul (KR); Sunjae Kim, Seoul (KR); Sunghye Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 15/663,550

(22) Filed: Jul. 28, 2017

(65) Prior Publication Data

US 2018/0145937 A1 May 24, 2018

(30) Foreign Application Priority Data

Nov. 18, 2016 (KR) .................. 10-2016-0154337
Nov. 21, 2016 (KR) .................. 10-2016-0155128

(51) Int. Cl.
*H04L 12/58* (2006.01)
*H04N 21/488* (2011.01)
(Continued)

(52) U.S. Cl.
CPC .......... *H04L 51/046* (2013.01); *H04L 51/066* (2013.01); *H04L 51/10* (2013.01);
(Continued)

(58) Field of Classification Search
USPC ........................................................ 709/206
See application file for complete search history.

(56) References Cited

U.S. PATENT DOCUMENTS

| 2009/0061825 A1* | 3/2009 | Neelakantan | H04L 29/12292 455/412.1 |
| 2013/0069969 A1* | 3/2013 | Chang | H04M 1/72552 345/589 |

(Continued)

FOREIGN PATENT DOCUMENTS

WO        2016039509        3/2016

OTHER PUBLICATIONS

European Patent Office Application Serial No. 17177200.7, Search Report dated Jan. 31, 2018, 8 pages.

*Primary Examiner* — Brian Whipple
*Assistant Examiner* — John Fan
(74) *Attorney, Agent, or Firm* — Lee, Hong, Degerman, Kang & Waimey

(57) ABSTRACT

The present invention relates to a mobile terminal and a method for controlling the same. A mobile terminal displays a group chat screen corresponding to a group chat, determines whether exclusive conversations between several participants in the group chat are continued over a reference range, groups the exclusive conversations between those participants in the group chat when it is determined that the exclusive conversations between those participants are continued over a reference range, and displays a skip area for selectively confirming the grouped exclusive conversations within the group chat screen, wherein the mobile terminal restricts download and output of received information belonging to the skip area and updates an indication related to the exclusive conversations corresponding to the skip area, when the information is received.

20 Claims, 47 Drawing Sheets

(51) Int. Cl.
*H04M 1/725* (2006.01)
*H04W 52/02* (2009.01)

(52) U.S. Cl.
CPC .............. *H04L 51/12* (2013.01); *H04L 51/16* (2013.01); *H04M 1/72547* (2013.01); *H04N 21/488* (2013.01); *H04L 51/38* (2013.01); *H04W 52/0209* (2013.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/20* (2018.01); *Y02D 70/26* (2018.01)

(56) References Cited

U.S. PATENT DOCUMENTS

| | | | | |
|---|---|---|---|---|
| 2013/0321340 A1* | 12/2013 | Seo | ........................ | G06F 1/1641 345/174 |
| 2014/0011487 A1* | 1/2014 | Hwang | .............. | G06K 9/00221 455/416 |
| 2014/0321072 A1* | 10/2014 | Cavallaro | .............. | H05K 1/028 361/749 |
| 2016/0065672 A1* | 3/2016 | Savage | .............. | H04L 67/1095 709/219 |
| 2016/0323333 A1 | 11/2016 | Aggarwal et al. | | |
| 2017/0289085 A1 | 10/2017 | Kim | | |

\* cited by examiner

FIG. 2
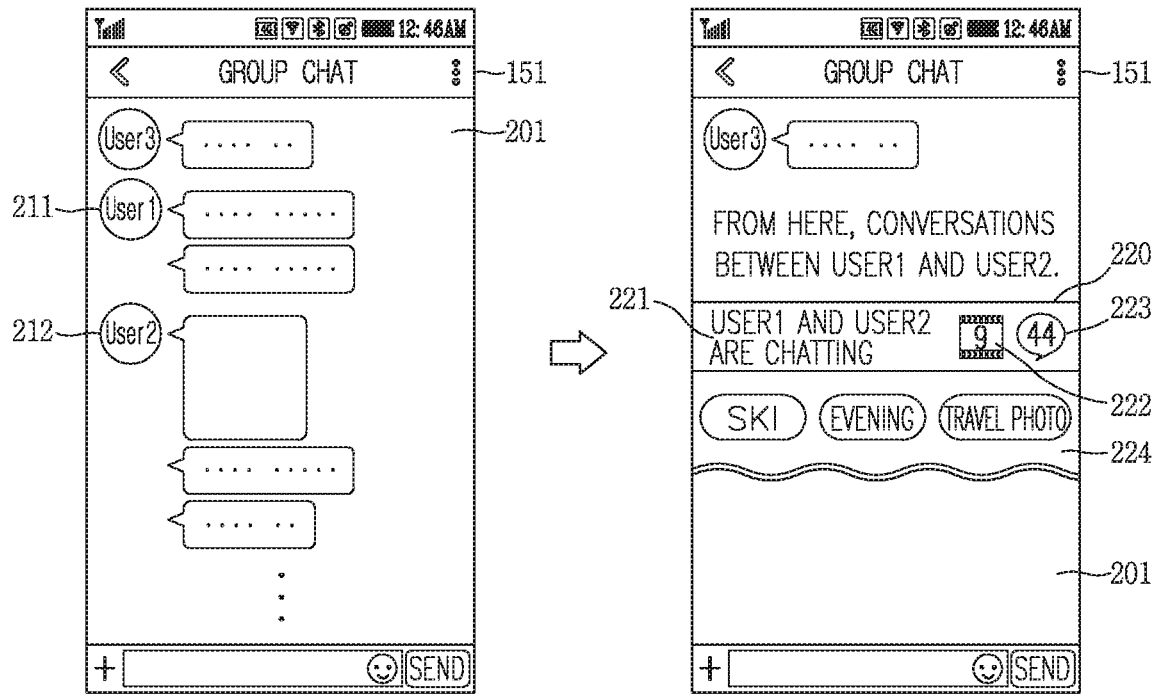
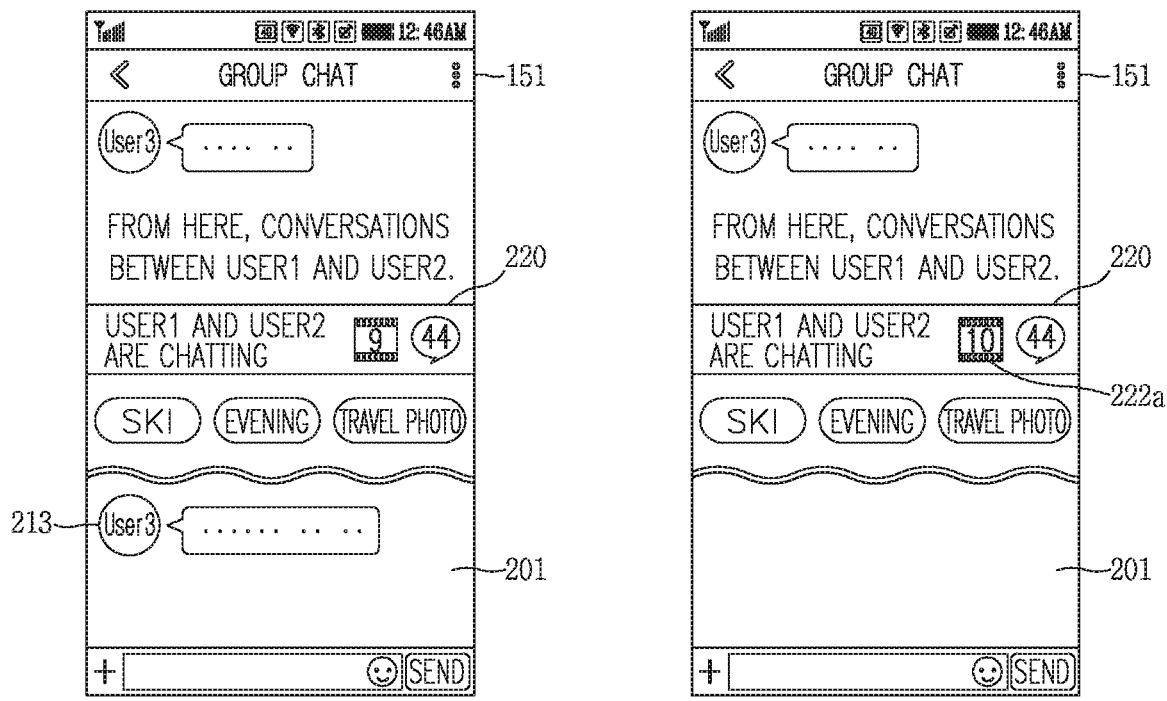

FIG. 14A
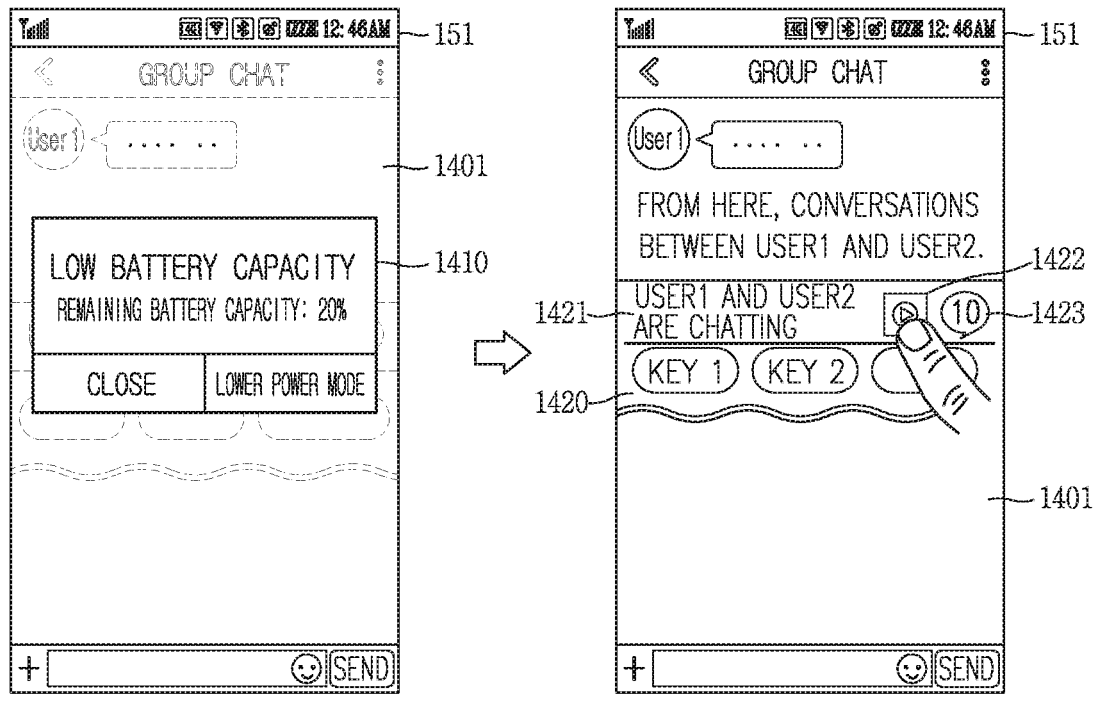
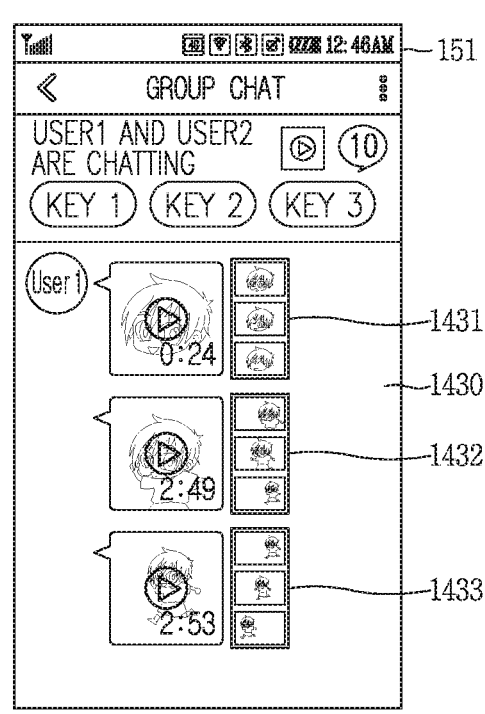

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application Nos. 10-2016-0154337, filed on Nov. 18, 2016, and 10-2016-0155128, filed on Nov. 21, 2016, the contents of which are all hereby incorporated by reference herein in their entireties.

BACKGROUND OF THE INVENTION

1. Field of the Invention

The present invention relates to a mobile terminal supporting a chatting function, and a method for controlling the same.

2. Background of the Invention

Terminals may be divided into mobile/portable terminals and stationary terminals according to their mobility. Also, the mobile terminals may be classified into handheld terminals and vehicle mounted terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Also, the terminal may execute an individual chat (exclusive or single chat) with a specific person (user) or a group chat with a plurality of users (participants) by activating at least one application. In this instance, during the chat, various contents such as images, videos web pages and the like may be shared.

Here, since the shared content is displayed in a small size within a chat screen, a user has to enter a detail view of the content to confirm the shared content. Accordingly, a context of conversation or content appreciation is disconnected and an additional operation for returning to the chat screen from the detail view should be executed, thereby causing user inconvenience.

Also, even while chat conversations are individually or exclusively performed among only some participants (users) in a group chat, since messages and shared files are all displayed on a corresponding chat screen, a charging issue occurs and noise is generated due to frequent push alarms. Furthermore, when such individual or exclusive conversations are accumulated for a long time or a total cumulative number of individual or exclusive conversations is very great during the group chat, in order to check a currently-input chat conversation or input a new message by skipping such cumulative chat conversations, a scroll operation should be inconveniently repeated several times until reaching a current conversation time point.

SUMMARY OF THE INVENTION

Therefore, an aspect of the detailed description is to provide a mobile terminal, capable of directly concentrating on a current chat conversation without a check of accumulated unchecked conversations or shared contents even when such unchecked conversations or shared contents are accumulated in the terminal, and a method for controlling the same.

Another aspect of the detailed description is to provide a mobile terminal capable of fast checking conversations among some participants in a group chat selectively, partially or by converting a format to be suitable for a situation, and a method for controlling the same.

Still another object of the detailed description is to provide a mobile terminal capable of continuing current chat conversations seamlessly while appreciating (watching, viewing) a content shared during the chat without having to enter a detail view, and a method for controlling the same.

Still another object of the detailed description is to provide a mobile terminal capable of quickly editing a content shared during a chat to be suitable for a conversation context and re-sharing the edited content, and a method for controlling the same.

Still another object of the detailed description is to provide a mobile terminal capable of quickly searching for a past chat conversation written during a chat based on a content shared during the chat, and a method for controlling the same.

To achieve these and other advantages and in accordance with the purpose of this specification, as embodied and broadly described herein, there is provided a mobile terminal, including a wireless communication unit disposed in a main body of the terminal and configured to receive information, a display unit configured to output a group chat screen corresponding to a group chat, and a controller configured to group exclusive conversations between several participants in the group chat when the exclusive conversations between those participants are continued over a reference range, and provide a skip area for selectively confirming the grouped exclusive conversations within the group chat screen. The controller may restrict download and output of received information belonging to the skip area and updates an indication related to the exclusive conversations corresponding to the skip area, when the information is received.

In one embodiment disclosed herein, whether or not the exclusive conversations between those participants in the group chat are continued over the reference range may be determined based on at least one of a number of conversations, a conversation duration and conversation contents between specific persons participated in the group chat.

In one embodiment disclosed herein, an output area of the exclusive conversations between those participants may be folded and replaced with the skip area when the exclusive conversations between those participants in the group chat are continued over the reference range, and the skip area may be generated in the group chat screen at a started position of the exclusive conversation between those participants.

In one embodiment disclosed herein, when the information belonging to the skip area is received, the controller may update at least one of keywords, a cumulative number of chat conversations and a cumulative number of shared contents, all related to the exclusive conversations output in the skip area, and when information without belonging to the skip area is received, the controller may download the information and output the downloaded information within the group chat screen out of the skip area.

In one embodiment disclosed herein, those participants corresponding to the skip area may be set based on a user input applied on the group chat screen.

In one embodiment disclosed herein, guide information related to an amount of data to be consumed during a download of the exclusive conversations corresponding to the skip area may be popped up when a touch input is applied to the skip area.

In one embodiment disclosed herein, a summary of the exclusive conversations corresponding to the skip area may be provided within the group chat screen, when a preset gesture is applied to the group chat screen while the exclusive conversations corresponding to the skip area are fully output within the group chat screen.

In one embodiment disclosed herein, an icon for checking only shared contents in a distinguishing manner may be output in the skip area when the shared contents are present in the exclusive conversations corresponding to the skip area. The shared contents in the exclusive conversations corresponding to the skip area may be output in a form of a preview image within the group chat screen, when a touch is applied to the icon.

In one embodiment disclosed herein, an image whose size changes may be generated in the skip area when one of the preview images is selected, and a part of the contents shared in the exclusive conversations may be output within the generated image based on the selected preview image. Also, a download of other contents shared in the exclusive conversations may be restricted while the part of the shared contents is output.

In one embodiment disclosed herein, an image whose size changes may be generated in the skip area when a touch input is applied to one of keywords output in the skip area, and exclusive conversations related to the touch input-applied keyword may be output within the generated image.

In one embodiment disclosed herein, the entire exclusive conversations corresponding to the skip area may be unfolded within the group chat screen while the skip area disappears, when a touch applied to the skip area is dragged toward a top of the group chat screen.

In one embodiment disclosed herein, the controller may provide a second skip area for selectively checking a second exclusive conversation in the group chat screen when the second exclusive conversation is continued over a reference range after first information without belonging to the skip area is output in the group chat screen, and the skip area and the second skip area may be integrated with each other within the group chat screen.

In one embodiment disclosed herein, the controller may reconstruct a content shared in the exclusive conversations corresponding to the skip area to correspond to a low power mode and output the reconstructed content, when a charged level of a battery disposed in the main body is less than a reference value at a time point that a touch input is applied to the skip area, and the controller may differently convert a file size or a file format of the content shared in the exclusive conversations in the low power mode.

In one embodiment disclosed herein, the group chat screen may include a message area and a background area. The controller may set a first content of a plurality of contents shared in the group chat screen as an image of the background area. When a sharing request for a second content related to the group chat screen is received while the first content is output, the controller may output information related to the sharing request for the second content in the message area and switch the set image of the background area to an image corresponding to the second content.

In one embodiment disclosed herein, information related to an originator who has requested for sharing of the second content and attribute information related to the second content may be displayed in the message area when the sharing request for the second content is received.

In one embodiment disclosed herein, the image of the second content may be changed to correspond to an indication indicating a secret content and displayed in the background area when the indication is included in the attribute information displayed in the message area, and the screen may be controlled to output at least part of the hidden second content when a touch input is applied to the background area.

In one embodiment disclosed herein, a plurality of images corresponding to a plurality of contents may be output in the background area in a form of a collective view or a slide show, when it is confirmed, based on the information related to the sharing request output in the message area, that a sharing request for the plurality of contents is received for a preset time and information related to an originator sending the request for sharing the plurality of contents is the same.

In one embodiment disclosed herein, a detail view image of the shared content output in the background area may be output in the entire display unit when a touch input is applied to the background area while the chat screen is output. The controller may execute a search mode based on a content-shared time point when a touch input is applied to the output detail view image in left and right directions.

In one embodiment disclosed herein, in the search mode, one of shared contents in the chat screen may be output as a background image, and at least part of the message area displayed at a shared time point of the corresponding content may be output in the display unit.

In one embodiment disclosed herein, when a message related to a shared content output in the background area is output in the message area, the controller may differently change an image output in the background area based on the message related to the shared content output in the message area.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

In the drawings:

FIG. 2 is a conceptual view illustrating an operation implemented in a mobile terminal in accordance with the present invention;

FIGS. 14A and 14B are conceptual views illustrating examples related to displaying a content shared in an exclusive conversation in a group chat in a state of a low battery, in a mobile terminal in accordance with the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
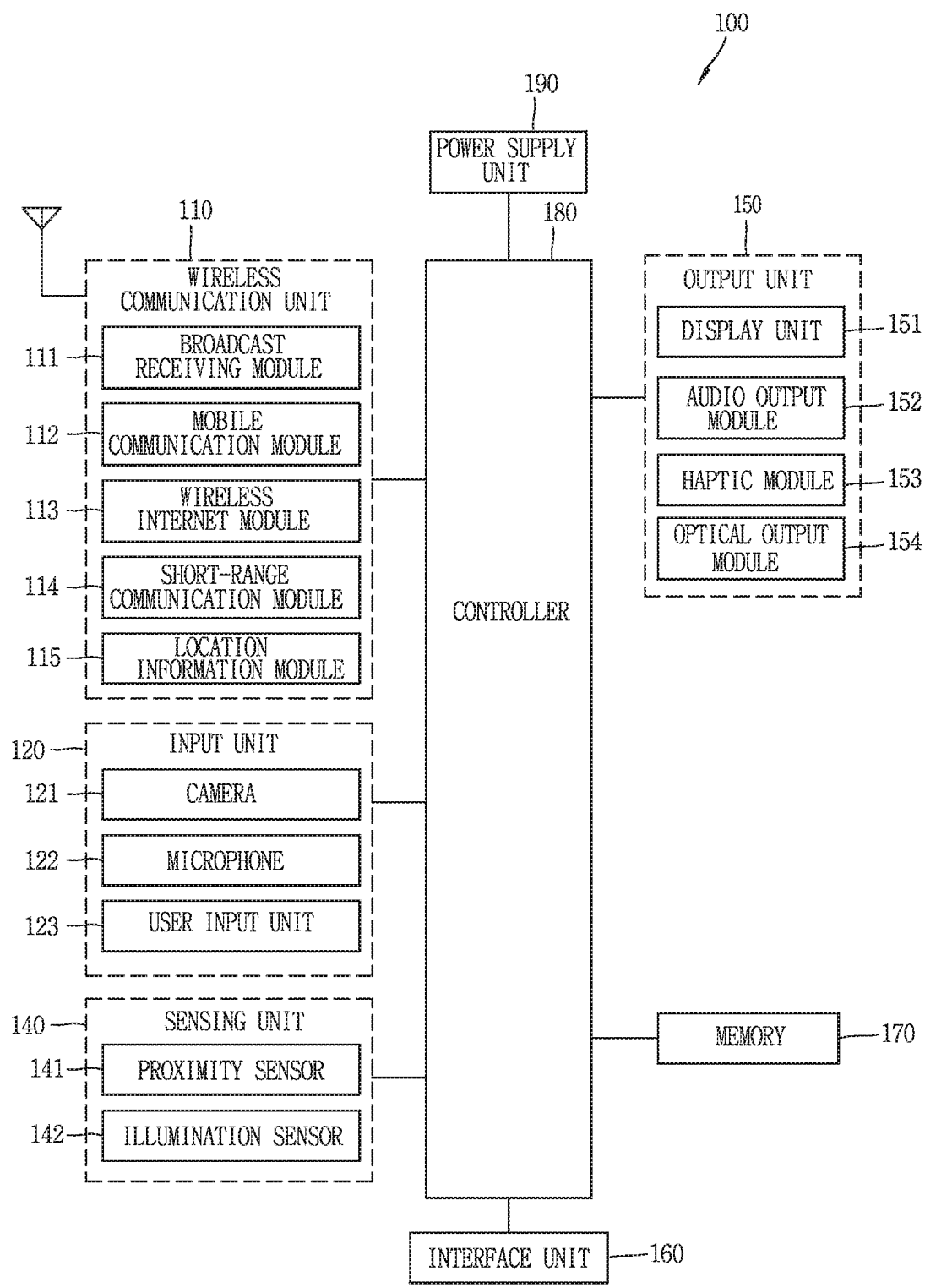
FIG. 1A is a block diagram of a mobile terminal in accordance with one embodiment of the present invention.
Figure 1B:
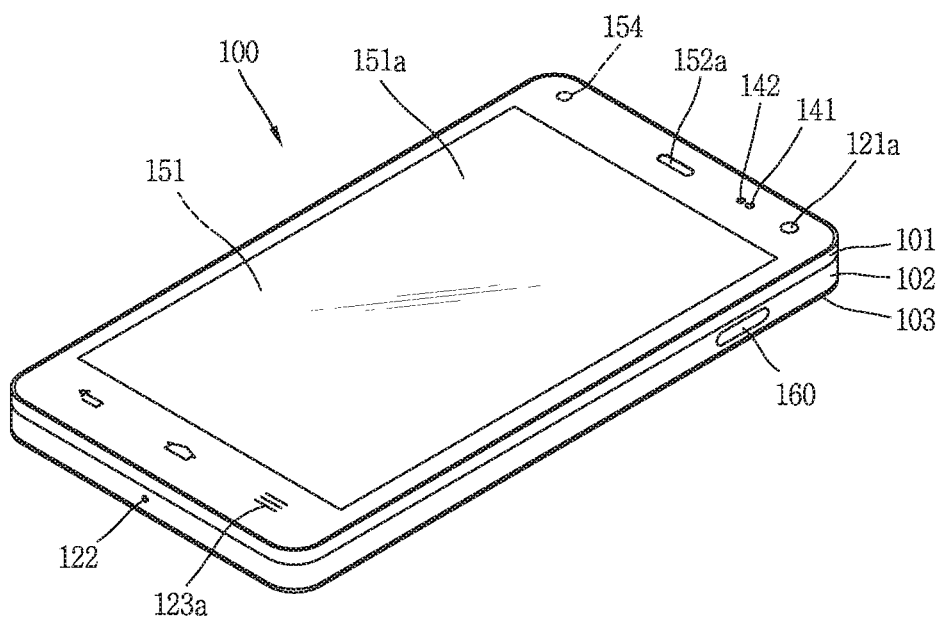
FIGS. 1B and 1C are conceptual views illustrating one example of a mobile terminal, viewed from different directions.
Figure 1C:
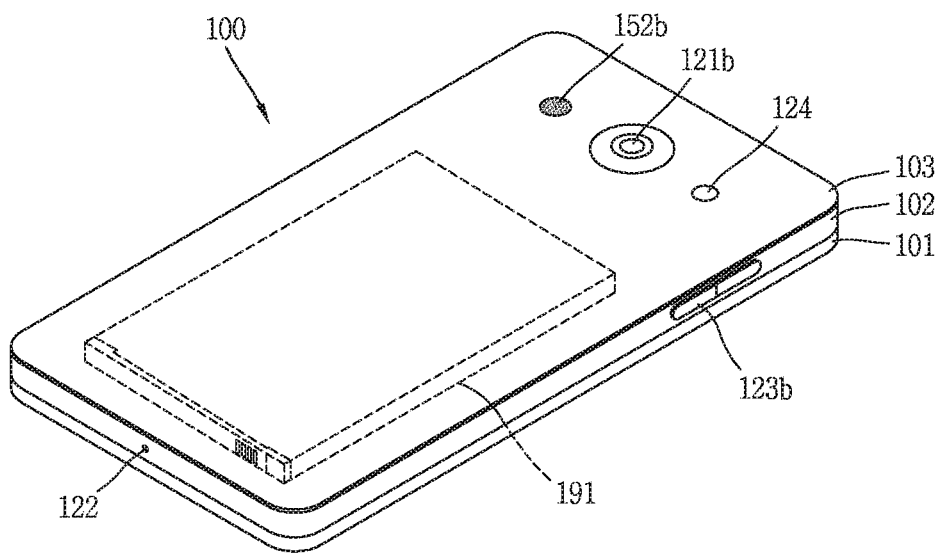

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control an operation associated with an application program and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type the body of the portable electronic device. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device. However, such teachings with regard to a particular type of portable electronic device will generally apply to other types of mobile terminals as well.

The body of the mobile terminal may be understood to indicate the mobile terminal 100 by regarding the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, description will be given of embodiments related to a control method which can be implemented in the mobile terminal having such configuration, with reference to the accompanying drawings. It will be obvious to those skilled in the art that the present invention can be specified into other specific forms without departing from the scope and essential features of the present invention.

As described above, the mobile terminal 100 according to the embodiment of the present invention may display a group chat screen, which corresponds to an execution of an application allowing a group chat on the display unit 151. Also, when exclusive chats (exclusive or individual conversations) between some of participants in the corresponding group chat (i.e., chats exchanged only between some (at least two) of participants in the group chat) are continued by a reference range or more, the controller 180 of the mobile terminal 100 groups the exclusive chat conversations between those participants and provides a skip area, in which the grouped exclusive conversations can selectively be checked, within the group chat screen.

Afterwards, when information belonging to the skip area is received through the wireless communication unit 110 of the mobile terminal 100, the controller 180 restricts download and display of the received information and updates only an output related to the exclusive conversations corresponding to the skip area. Here, the output related to the exclusive conversations, for example, may include information related to the participants of the exclusive chat conversations, a cumulative number of the exclusive conversations, a cumulative number of contents such as shared files, keywords and the like.

Accordingly, a user may selectively open, partially check, or skip without viewing, the exclusive chat conversations between those participants in the group chat. Thus, charging (billing) due to downloading of the entire exclusive conversations can be prevented, and a repetitive scroll operation for confirming information following after the exclusive conversations is not needed. In addition, when information belonging to the skip area is received, an output of a push alarm is limited and a noise blocking effect is provided accordingly.

Hereinafter, FIG. 2 is a conceptual view illustrating in detail an operation implemented in a mobile terminal according to the present invention.

First, as illustrated in FIG. 2, a group chat screen 201 enabling a group chat among a plurality of participants (users) may be output on the display unit 151 of the mobile terminal 100. However, the output of the group chat screen 201 may be omitted when the user does not use the mobile terminal 100 or uses another application.

During the group chat, the controller 180 may determine whether exclusive conversations (independent conversations or individual conversations) between some (e.g., at least two) of users (participants) participating in the group chat, for example, User 1 and User 2, are continued over a reference range. Specifically, the controller 180 may determine whether or not the exclusive conversations between the two users are to be continued by taking into account conversations between User 1 and User 2, a cumulative number of chat conversations, a conversation length, a conversation duration, and the like. For example, when the cumulative number of the chats between User 1 and User 2 exceeds a reference number (e.g., 30 to 50) without another user newly participating in the group chat during the exclusive conversations between User 1 and User 2, the controller 180 may determine that the exclusive conversations between the two users will be continued even after that time and thus group the exclusive conversations between the two users.

The determination as to whether the exclusive conversations between the two users are to be continued may be executed even though the group chat screen is not output on the display unit 151. For example, if the user is using another application, whether the exclusive conversations between the two users are to be continued may be determined based on push alarms which are received while the group chat is executed on a background of the terminal. Alternatively, for example, if an application corresponding to a group chat is not executed, whether exclusive conversations (between at least two users) in a specific group chat are to be continued may be determined at a time point when a chat room list corresponding to the execution of the application is output.

Next, an area (hereinafter, referred to as a 'skip area') for selectively confirming such grouped exclusive conversations is provided in the group chat screen 201. Specifically, the area where the exclusive conversations between User 1 and User 2 were displayed disappears, and a skip area 220 for selectively confirming/skipping the exclusive conversations is provided at a started position of the chat between User 1 and User 2.

In this instance, when providing the skip area 220, a visual effect may be output such that the output area of the exclusive conversations between User 1 and User 2 is gradually folded toward a top of the group chat screen 201.

The skip area 220 is displayed in the group chat screen 201. Specifically, group conversations that were performed prior to the grouped exclusive conversations are displayed above the skip area 220. Also, group conversations that do not belong to the skip area 220 after the exclusive conversations are grouped are continuously displayed below the skip area 220.

Also, the skip area 220, as illustrated in FIG. 2, may be implemented to be displayed at a position where the exclusive or individual conversation between the two users is started in the group chat, and fill both of left and right ends of the display unit 151. Or, in another example, the skip area 220 may be arranged at an area where a chat of another user is output within the group chat screen, for example, at a left area of the group chat screen, similar to an area where a chat of User 3 is displayed.

Also, as illustrated in FIG. 2, the skip area 220 may output thereon information related to the exclusive conversations, for example, information 221 related to the users (participants) (e.g., a name or ID of each participant) executing the exclusive conversations within the group chat, a cumulative number of contents 222 shared in the exclusive conversations, a cumulative number of exclusive conversations 223 between the two users, and keywords 224 associated with the exclusive conversations. Based on those information displayed on the skip area 220, the user may decide whether to entirely unfold the exclusive conversations, partially unfold the exclusive conversations, or view a next conversation without checking the exclusive conversations.

As such, when the skip area 220 is provided, the controller 180 may process information belonging to the skip area and information without belonging to the skip area differently in the group chat.

Specifically, after the skip area 220 is provided in the group chat screen 201, when the information belonging to the skip area 220 is received, for example, an image file belonging to the exclusive conversation is received from User 2, the controller 180 may restrict download and output (display) of the received image file. This is similar even though the group chat screen 201 is currently output on the display unit 151. Instead, an indication of the information displayed in the skip area 220, for example, an icon 222 informing a cumulative number of shared contents is updated (222*a*).

In addition, the controller 180 may limit a push alarm corresponding to the reception of the information belonging to the skip area 220. For example, before the skip area 220 is displayed, the push alarm is provided every time when information related to the group chat is received. However, after the skip area 220 is provided, the push alarm may not be output or may be output soundlessly for information belonging to the exclusive conversation.

Continuously, as illustrated in FIG. 2, after providing the skip area 220, when information that does not belong to the skip area 220 is received, for example, a message belonging to the group conversation is received from User 3, who is not a participant in the exclusive conversation, the controller 180 may subsequently output the received message 213 below the skip area 220. When the information belonging to the group conversation is continuously received, the skip area 220 is scrolled up together with other group conversations. Afterwards, when the information belonging to the skip area 220 is received again, the information is included in the skip area 220, ignoring a temporal sequence.

As described above, the present invention can provide the skip area on the group chat screen. Accordingly, the user can skip the exclusive conversations corresponding to the skip area 220 without checking by scrolling the group chat screen 201. Alternatively, a part of the exclusive conversations corresponding to the skip area 220 may be checked starting from a desired position or by a desired display method, in a manner of using the displayed skip area 220.

Figure 3:
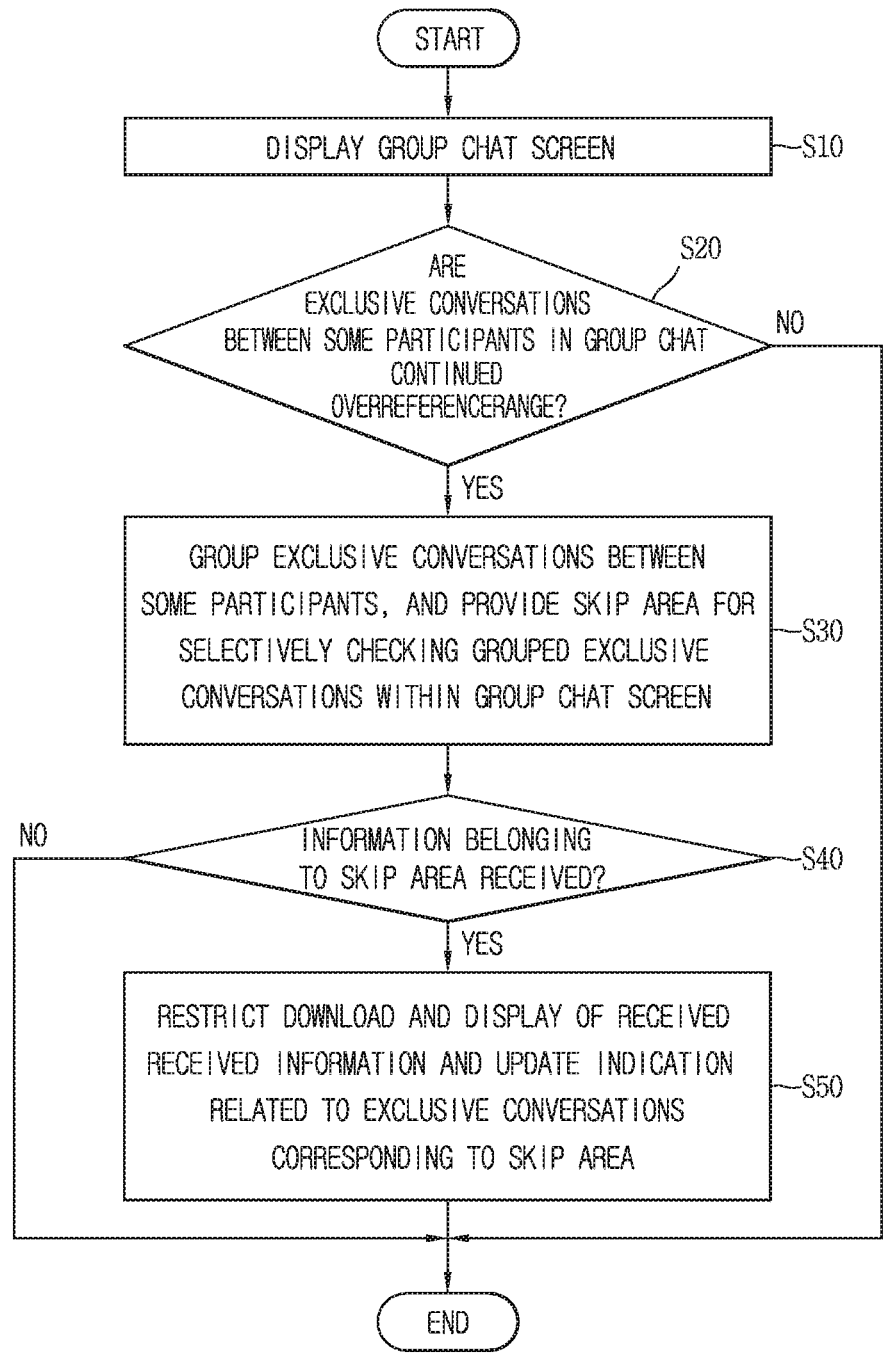
FIG. 3 is a flowchart illustrating an operation implemented in a mobile terminal in accordance with the present invention.

Next, FIG. 3 is a flowchart illustrating an operation implemented in the mobile terminal according to the present invention.

As illustrated in FIG. 3, first, a step of displaying a group chat screen corresponding to a group chat on the display unit 151 of the mobile terminal 100 according to the embodiment of the present invention is initiated (S10). However, when the user is not currently using the terminal or is using another application, the step of displaying the chat screen may be omitted. In this instance, for example, the terminal may recognize the currently-executed group chat by a push alarm or the like.

During the group chat, the controller 180 of the mobile terminal 100 may determine whether exclusive conversations of only some of users participating in the group chat are continued over a reference range (S20).

Here, the exclusive conversations may refer to that contents (i.e., conversations) exchanged by some of users participating in the group chat are conversations that are not related to other participants in the group chat. Or, the exclusive conversations may refer to that person-to-person (1:1) conversations last for a considerable period of time without other users participating in the conversation within the group chat. In addition, whether or not the exclusive conversations last over the reference range may be determined based on at least one of a number of conversations between (among) specific persons (users) who have performed the exclusive conversation, a conversation duration, conversation contents, and consistency of the conversation contents.

In case where it is determined that the exclusive conversations of some of the users participating in the group chat is continued over the reference range, the controller 180 of the mobile terminal 100 may group the exclusive conversations among those some users and provide a skip area for selectively checking the grouped exclusive conversations within the group chat screen (S30).

Specifically, an area in which the exclusive conversations between some participants have been displayed may be folded in the group chat screen, and the folded area may be replaced with the skip area for selectively checking the grouped exclusive conversations. In this instance, an image whose size is gradually reduced may be generated in the corresponding area, and a visual effect that the exclusive conversations gradually disappear may appear within the corresponding image. When the image disappears, the skip area may appear. Also, a quantity of exclusive conversations to be grouped is too much to be displayed on the display unit 151 at a time, the controller 180 may control the screen in a manner that the displayed exclusive conversations disappear from the group chat screen as the group chat screen is scrolled in a reverse direction.

The skip area is also created by grouping the exclusive conversations executed in the group chat, and is generated at a start position of the grouped exclusive conversations. To this end, the group chat screen may be scrolled in the reverse direction up to the position where the exclusive conversation has started.

On the other hand, when the group chat screen is not output on the display unit 180, the skip area may be provided at a time point when the group chat screen is output.

In a state that the skip area is provided, when information belonging to the skip area is received through the wireless communication unit 110 of the mobile terminal 100 (S40), the controller 180 may restrict download and output of the information, and update an indication related to the exclusive conversations corresponding to the skip area (S50).

In detail, when the information belonging to the skip area is received, the controller 180 may update at least one of indications indicating a keyword related to the exclusive conversations output in the skip area, a cumulative number of conversations, and a cumulative number of shared contents. On the other hand, when information that does not belong to the skip area is received after providing the skip area, the controller 180 may download the corresponding information and subsequently display the downloaded information in the group chat screen, for example, below the skip area.

In addition, in the embodiment of the present invention, the contents of the exclusive conversations corresponding to the skip area may be provided in a summary form or may be confirmed starting from a portion to be confirmed, using a touch input applied to the skip area. Embodiments related to this will be described in more detail hereinafter with reference to the accompanying drawings.

As described above, according to the present invention, the user can selectively check the exclusive conversations executed in the group chat, so that charging due to an automatic download of the exclusive conversations and noise due to push alarms can be prevented. Furthermore, the user does not have to repeat unnecessary screen scroll operations for confirming the group chat conversations that follow the exclusive conversations.

Figure 4:
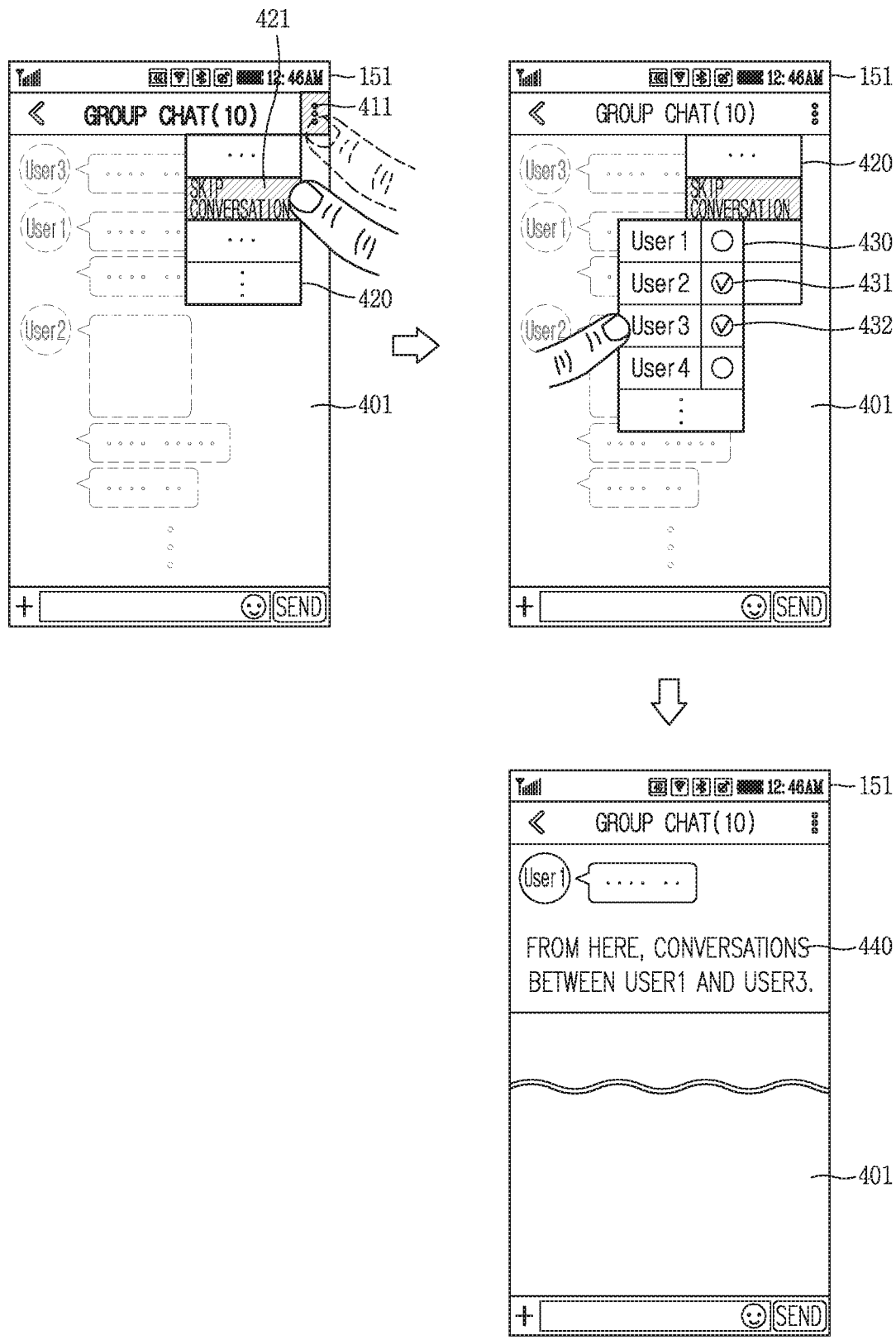
FIG. 4 is a conceptual view illustrating a method of setting several participants (users) corresponding to a skip area, in a mobile terminal in accordance with the present invention.

FIG. 4 is an exemplary view of setting some users (participants) corresponding to the skip area in the mobile terminal according to the present invention.

In one embodiment according to the present invention, those some of the users participating in the group chat, corresponding to the aforementioned skip area, may be set based on a user input applied on the group chat screen. Specifically, a user may intentionally set an intention to skip conversations between several participants within a specific group chat without viewing the conversations. Or, the user may intentionally set to confirm all of conversations between specific participants within a specific group chat without skipping the conversations.

For example, referring to FIG. 4, a group chat screen 401 corresponding to a group chat is output on the display unit 151. When a touch input is applied to a more view icon 411 provided at a top of the group chat screen, a menu item 421 for setting whether or not to provide a skip area may be output within a pop-up window 420.

In this instance, when the corresponding menu item 421 is selected, as illustrated in FIG. 4, a list 430 of sub items for selecting several users (participants) corresponding to the skip area from the users participating in the group chat appears. The user may select the participants, for example, User 2 and User 3 431 and 432, corresponding to the skip area to be provided at the moment of executing the exclusive conversations, by using the list 430. Afterwards, when the exclusive conversations between the selected participants are executed over a reference range, for example, 30 or more exclusive conversations are exchanged, a skip area 440 is generated in the group chat screen 401.

Meanwhile, for exclusive conversations between User 1 and User 4 that are not selected in the list 430, it may be considered that the user intends not to skip the conversations and thus the skip area may not be provided.

In addition, the mobile terminal 100 according to the present invention may execute download and output of the exclusive conversations by considering a charging issue, when confirming the exclusive conversations corresponding to the skip area.

Figure 5A:
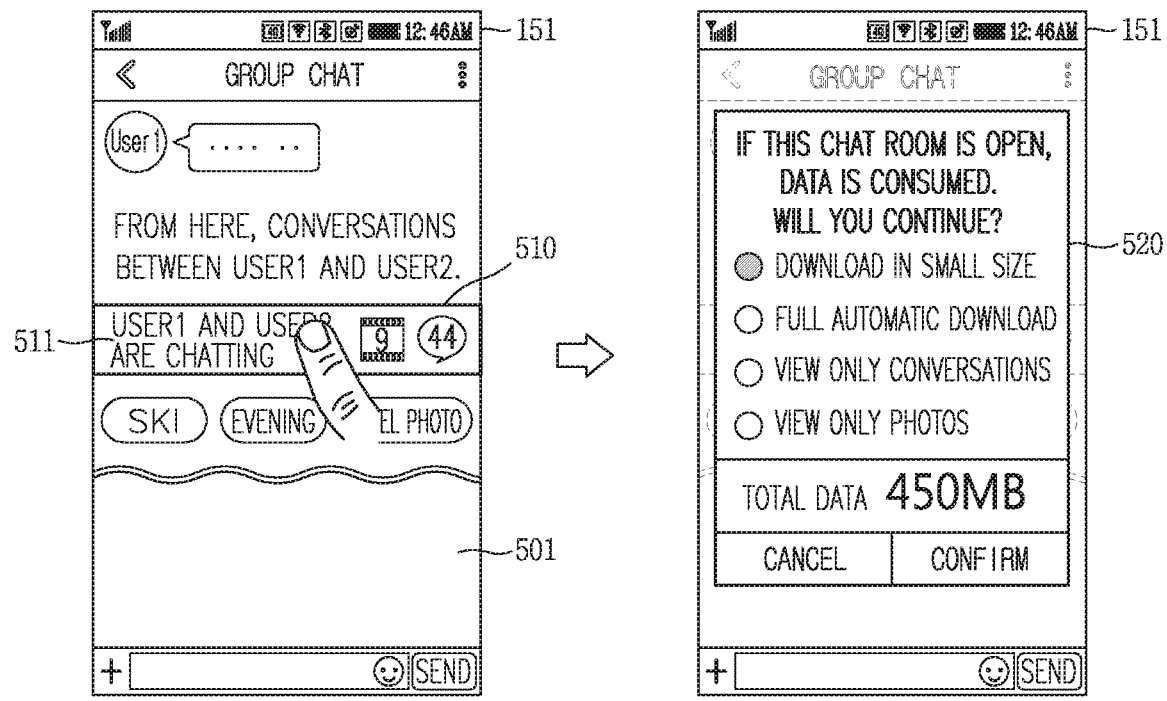
FIGS. 5A, 5B, 6, 7, 8A, 8B, 9, 10, 11 and 12 are conceptual views illustrating various embodiments related to displaying exclusive chat conversations corresponding to a skip area within a group chat screen using a touch input, in a mobile terminal in accordance with the present invention.

As one embodiment, referring to FIG. 5A, when a touch input is applied to an upper bar 511, in which participants of exclusive conversations are displayed in a skip area 510 provided in a group chat screen 501, guide information 520 informing an amount of data to be consumed during downloading of the exclusive conversations corresponding to the skip area may be popped up before displaying the exclusive conversations. For example, referring to FIG. 5A, when the upper bar 511 of the skip area 510 is touched, the guide information 520 for guiding that data of about 450 MB is to be used for downloading the entire exclusive conversations may be popped up at the time of confirming the exclusive conversations between User 1 and User 2.

In this instance, the popped-up guide information 520 may include options to select an output degree of the exclusive conversations. The options may be in a form of menus that provide selectable display schemes consuming different amounts of data upon downloading the exclusive conversations. For example, as illustrated in FIG. 5A, the options may be provided in the form of downloading contents included in the exclusive conversations in a small size, viewing only text, and viewing only photographs.

Figure 5B:
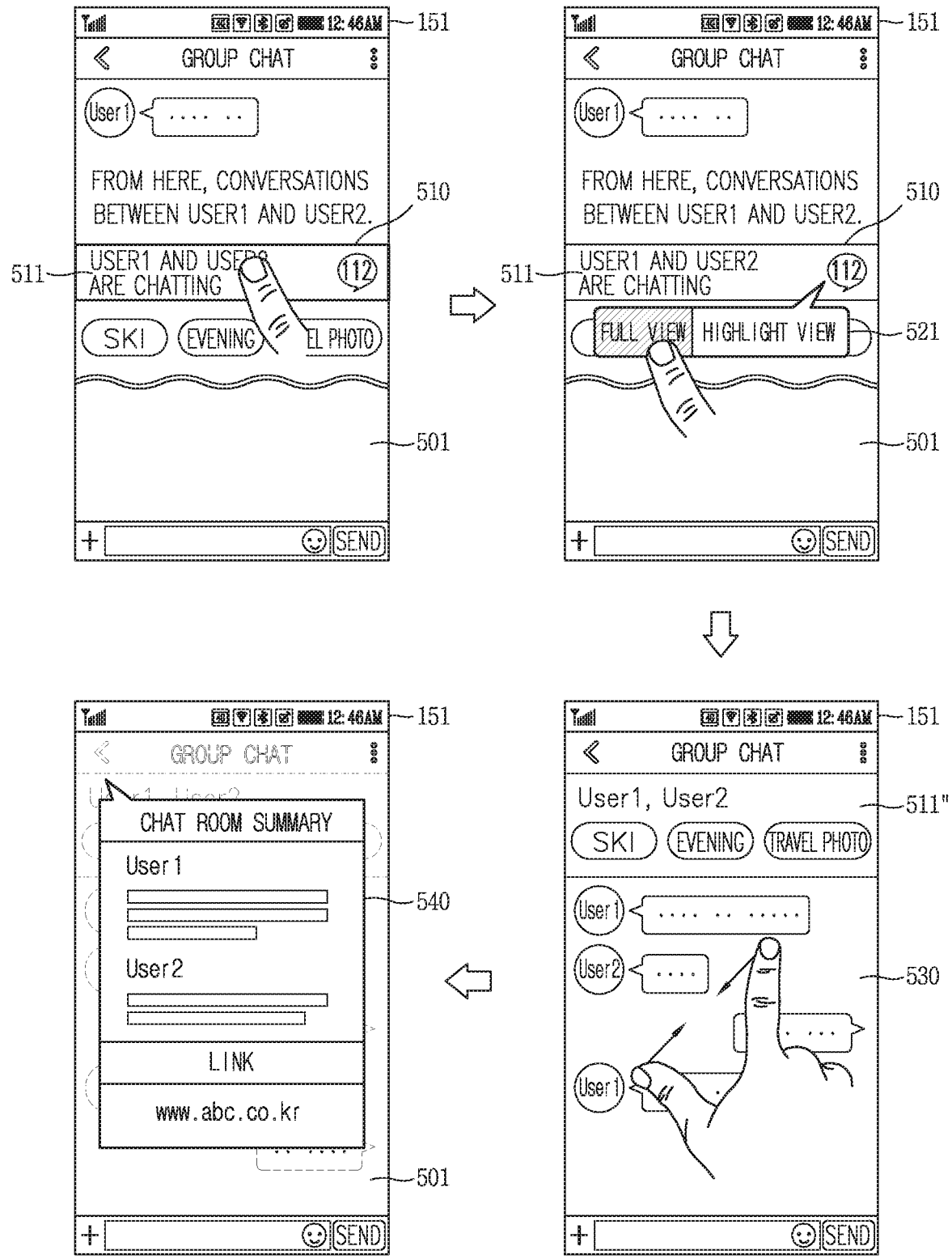

As another example, referring to FIG. 5B, when a touch input is applied to the upper bar 511 in which the participants of the exclusive conversations are output within the skip area 510, a menu window 520 for selecting one of a full view and a summary view for confirming the exclusive conversations may be popped up.

In response to a selection of the full view for the exclusive conversations, all of the exclusive conversations corresponding to the skip area 510, for example, 112 conversations exchanged between User 1 and User 2 may be output within the group chat screen 501. In this instance, when a preset touch gesture, for example, a pinch-in touch input, is applied to the group chat screen 530 in a state that the exclusive conversations are unfolded (511″), the controller 180 may immediately switch the full view into the summary view for the exclusive conversations. Accordingly, a summary 540 for the 112 conversations exchanged between User 1 and User 2 may be displayed within the group chat screen 501, for example, in a form of a speech balloon. Different types of information, such as text messages and shared link information, in the summary 540 may be displayed in distinct areas from each other.

In addition, the mobile terminal 100 according to the present invention provides user convenience by displaying the exclusive conversations, starting from a portion that the user intentionally wants to check, at the time of checking the exclusive conversations corresponding to the skip area.

Figure 6:
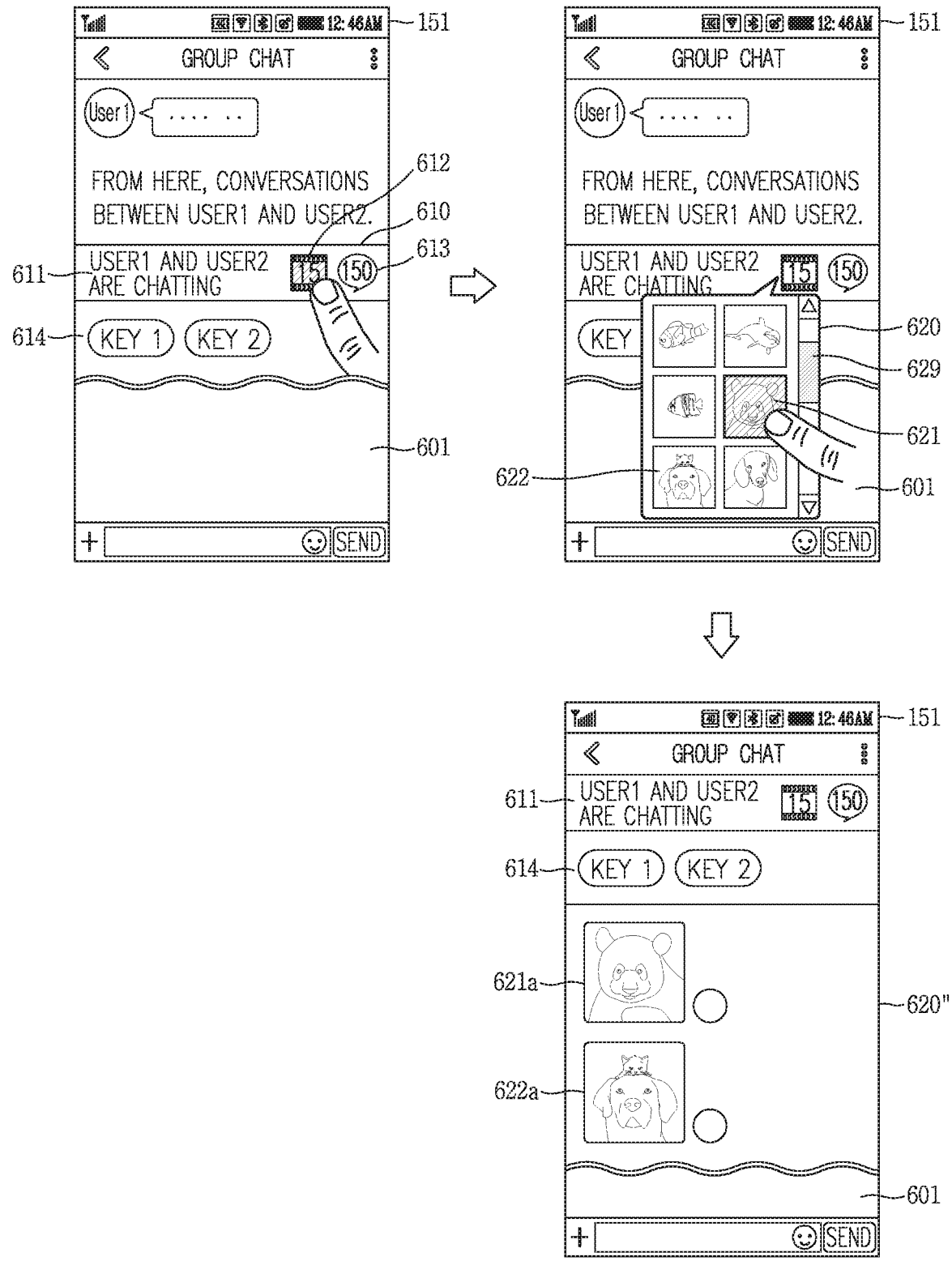

As one embodiment, referring to FIG. 6, when a skip area 610 is provided in a group chat screen 601, a file icon 612 for checking contents, for example, images and/or videos, which have been transmitted and received between User 1 and User 2 participating in an exclusive conversation (exchanging exclusive conversations or exclusively exchanging individual conversations), may be output in the skip area 610 such that the contents can be checked in a manner of distinguishing from messages.

When a touch input is applied to the file icon 612, contents shared in the exclusive conversations between User 1 and User 2 corresponding to the skip area 610 are output in a form of a preview image in the group chat screen 601. In detail, while a touch input is applied to the file icon 612, a window 620 displaying thereon images of the contents shared in the exclusive conversations may be popped up. A scroll bar 629 for scrolling up and down the images of the contents may be displayed on a right side of the window 620.

When a preview image 621 to be checked is selected on the window 620, the window 620 disappears and an image whose size changes is generated in the skip area 610 (620″). Accordingly, a part of the contents shared in the exclusive conversations is displayed within the image 620″ (hereinafter, referred to as 'exclusive conversation display area') based on the selected preview image 621 or regarding the selected preview image 621 as a start position. For example, a photo image 621a corresponding to the selected preview image 621 and a next photo image 622a may be downloaded and output in the exclusive conversation display area 620″ of the group chat screen 601. As such, the checked photo images 621a and 622a can be viewed in an album of the corresponding group chat along with images shared in the group chat.

As described above, while a part of the contents is displayed in the exclusive conversation display area 620″, downloading of the remaining contents shared in the exclusive conversations may be restricted. As a result, contents desired to be checked in the exclusive conversations can preferentially checked and a problem of charging for overused data can be solved.

Figure 7:
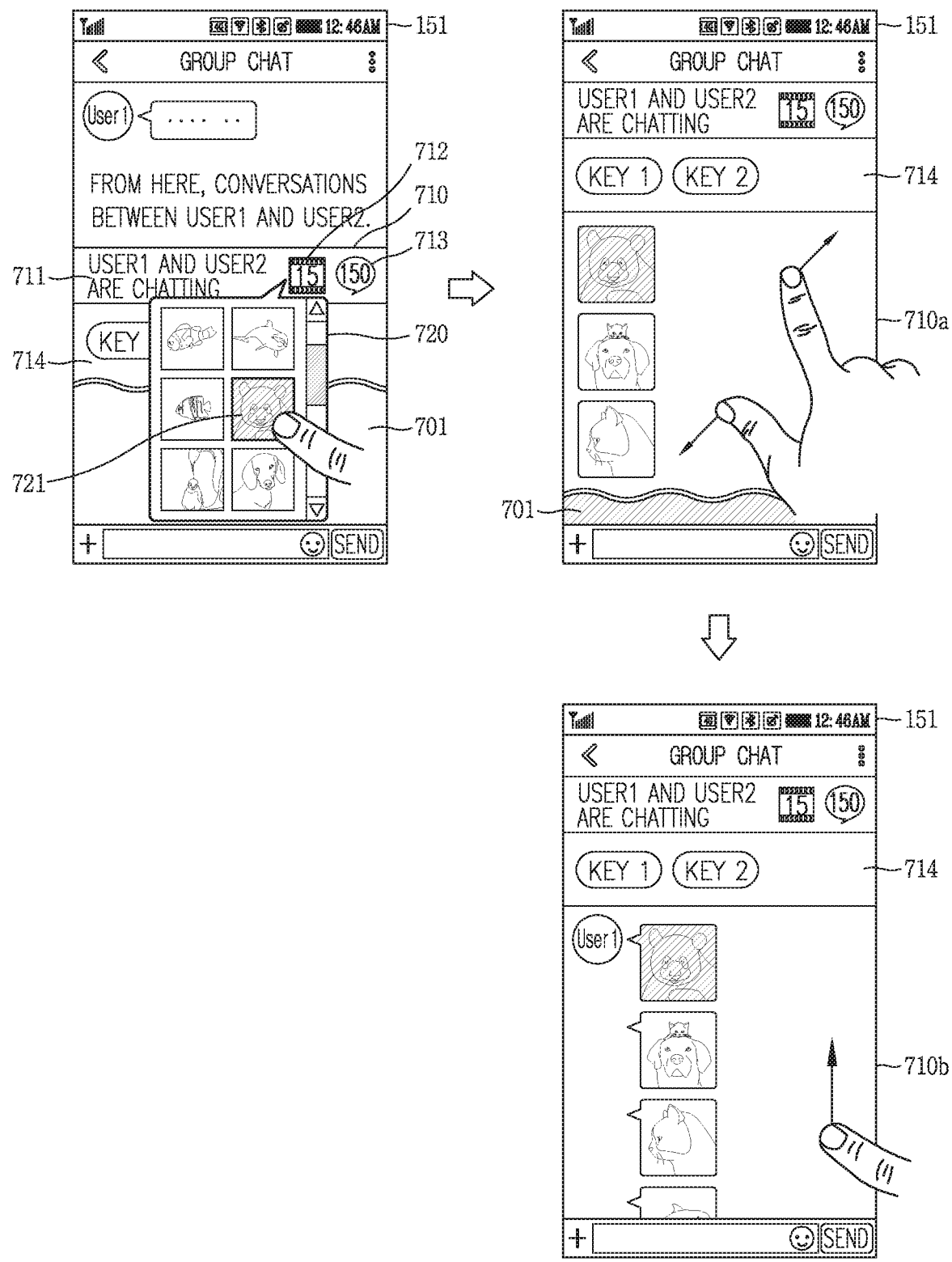

Next, FIG. 7 is an exemplary view of a method of checking remaining contents shared in the exclusive conversations.

Referring to FIG. 7, when a preview image 721 desired to be confirmed is selected in a window 720 popped up by touching a file icon 712 of a skip area 710, a photo image corresponding to the selected preview image 721 and contents following the image may be sequentially output in an exclusive conversation display area 710a.

While a part of the contents shared in the exclusive conversations is output, when a size of the exclusive conversation display area 710a is varied according to a preset touch gesture applied to the exclusive conversation display area 710a, the controller 180 may adjust a display degree of the contents shared in the exclusive conversations to correspond to the varied size of the area. That is, the user may check the following contents as many as desired by using the touch gesture.

Specifically, when a preset touch gesture, for example, a pinch-out touch input, is applied to the exclusive conversation display area 710a, the exclusive conversation display area 710a extends in size (710b) to overlap a group chat screen 701. Then, subsequent shared contents are automatically downloaded and displayed in the extended exclusive conversation display area 710b by the extended size.

When a scroll operation is applied to the extended exclusive conversation display area 710b, subsequent shared contents are naturally downloaded and displayed by a size of an area, which is newly appeared by the scroll operation. At this time, if there is no shared content to be displayed, the overlapped group chat screen 701 may appear at the bottom of the display unit 151, and group conversations may be subsequently checked.

Meanwhile, although not illustrated, when a pinch-out touch input is applied to the skip area 710 itself, the skip area 710 may extend in size by a touch degree of the pinch-out touch input and thus corresponding exclusive conversation may also be unfolded within the extended skip area 710.

In addition, when checking the exclusive conversations corresponding to the skip area, the mobile terminal 100 according to the present invention can automatically edit and provide a portion of the exclusive conversations, which is determined to be unnecessary or is repeated, for simplifying the output of the exclusive conversations.

For this purpose, when a touch is applied to a file icon for checking shared contents in the exclusive conversations corresponding to the skip area in a distinguishing manner, the controller 180 may edit a part of the contents that satisfies a preset filtering condition to be displayed within the group chat screen. Here, the preset filtering condition is a condition for deleting a part of the entire contents shared in the exclusive conversations or excluding the part from being displayed. Here, the preset filtering condition may be set by considering at least one of resolution of an image, similarity among a plurality of images, and a cumulative number of shared contents.

Figure 8A:
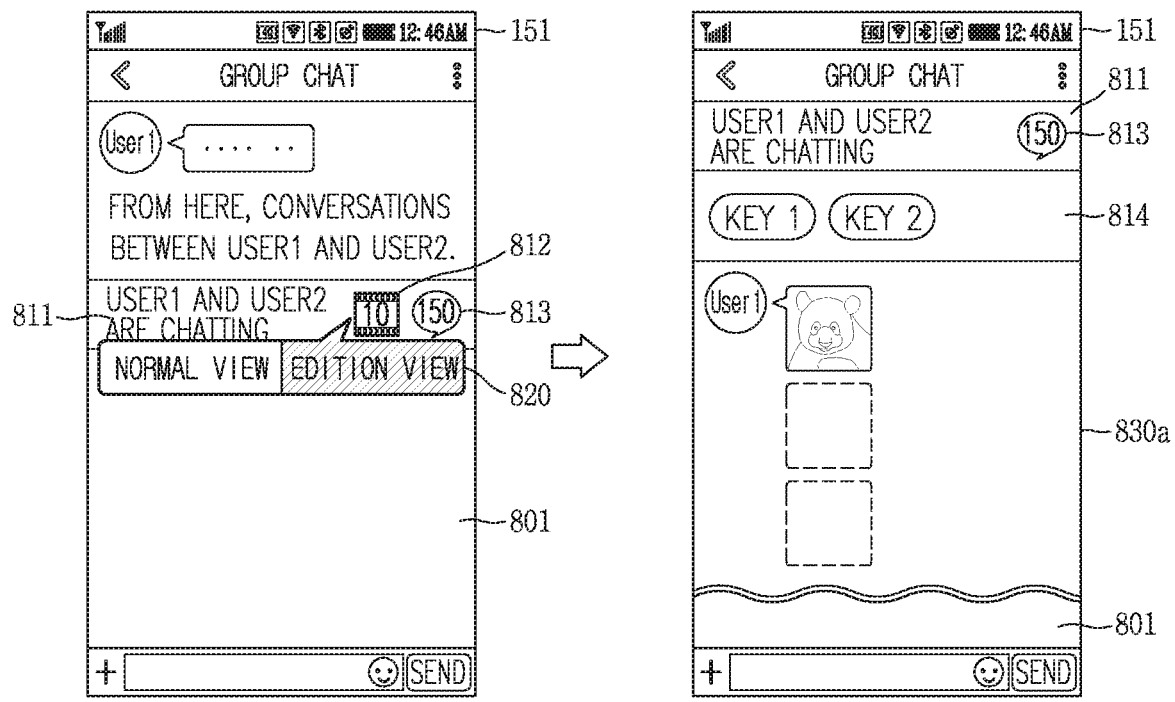

As one example, referring to FIG. 8A, when a touch is applied to a file icon 812 in a skip area provided within a group chat screen 801, options 820 for checking an edition for contents shared in exclusive conversations may be provided. Once an edition view is selected from the options 820, images with low image qualities, such as an image with resolution lower than a reference value, an image with an object whose shape is difficult to be recognized, an image with a person who closes eyes, an image with an object which is not seen well due to a dark surrounding, and the like, may be automatically deleted from those images shared in the exclusive conversations. As a result, only images with resolutions exceeding the reference value are output in an exclusive conversation display area 830a. In this instance, the deleted low-quality images may be confirmed, for example, by a full view included in the options 820, or by applying a preset touch input, e.g., a long-touch input, to the exclusive conversation display area 830a.

Figure 8B:
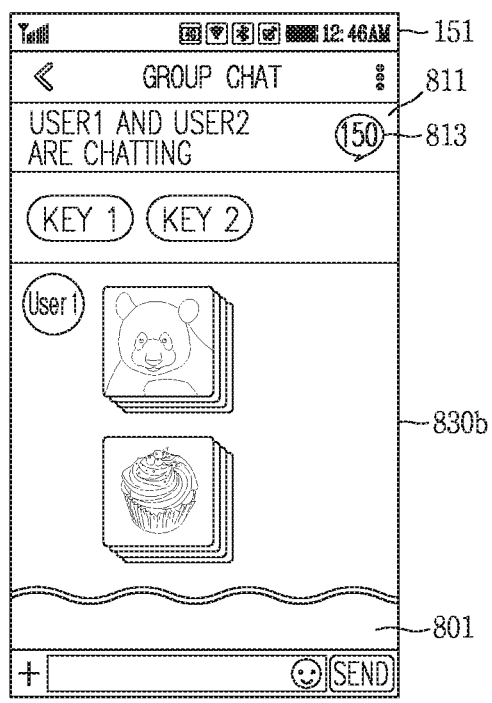

As another example, referring to FIG. 8B, when the edition view is selected from the options 820, images each having similarity more than a reference value are identified from the images shared in the exclusive conversations, and then only one representative image among the identified images is output in the exclusive conversation display area 830b. The other similar images except for the representative image may be output in an overlapping manner under the representative image as illustrated in FIG. 8B. In this instance, the other similar images may be checked according to a dragged degree of a drag touch input applied to the representative image.

Figure 9:
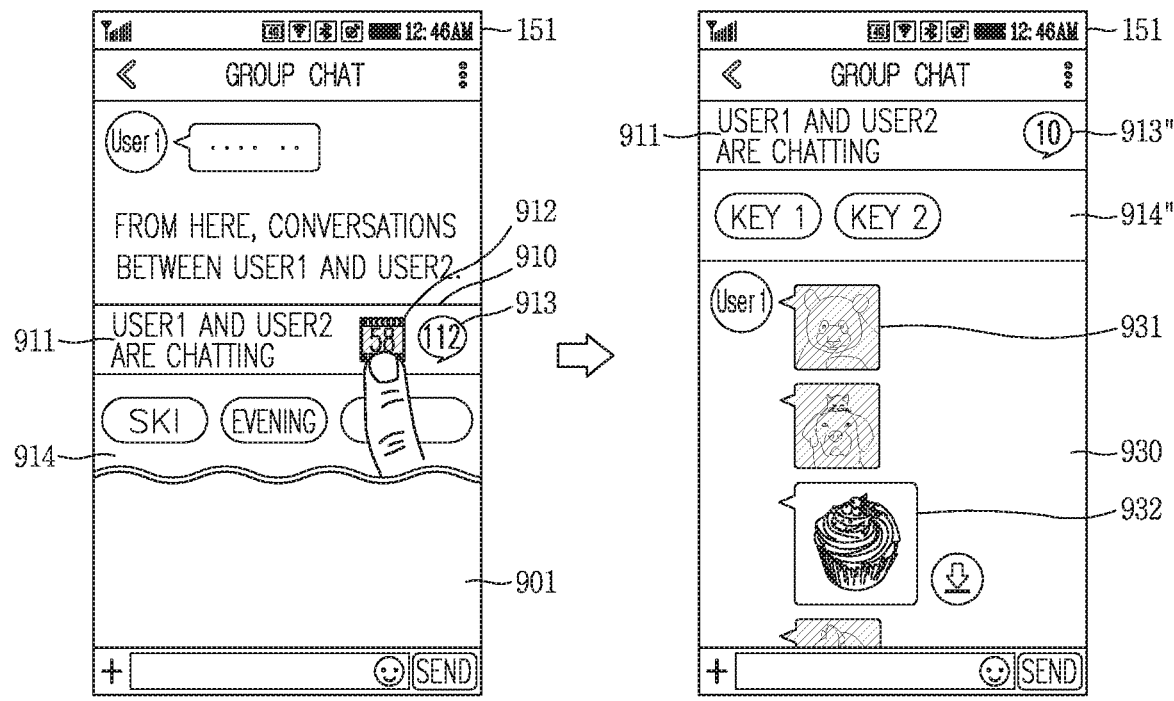

As another example, FIG. 9 illustrates an example in which a filtering condition for displaying only a part of contents shared in exclusive conversations is set based on user preference. Specifically, FIG. 9 illustrates that contents shared in exclusive conversations can be displayed in different display manners based on preference and utilization determined according to a usage pattern of a terminal user.

Specifically, it is assumed in FIG. 9 that a number of images transmitted and received in the exclusive conversations exceeds 50 and a different type of object is captured in each of the images. In this instance, when a touch input is applied to a file icon 912 displayed in a skip area 910, the controller 180 may identify images including a mainly downloaded object according to the usage pattern of the terminal user. For example, when the terminal user has mainly downloaded food images (pictures) during a group chat, images including foods as the object captured are selected.

In this manner, some images selected based on the user's preference are displayed in an exclusive conversation display area 930 in an automatically downloaded state (hereinafter, referred to as 'first display method'). The remaining images without being selected based on the user's preference are displayed in a preview form within the exclusive conversation display area 930, without being downloaded (hereinafter, referred to as 'second display method').

As such, the images can be displayed differently by the first and second display methods based on the user preference even if there is no intentional input applied by the user, thereby preventing a generation of unnecessary traffic.

When there is no history of downloading contents in the group chat or when there is no history that the users exchanging the exclusive conversations corresponding to the skip region download contents, the shared contents may all be provided in a preview form.

Figure 10:
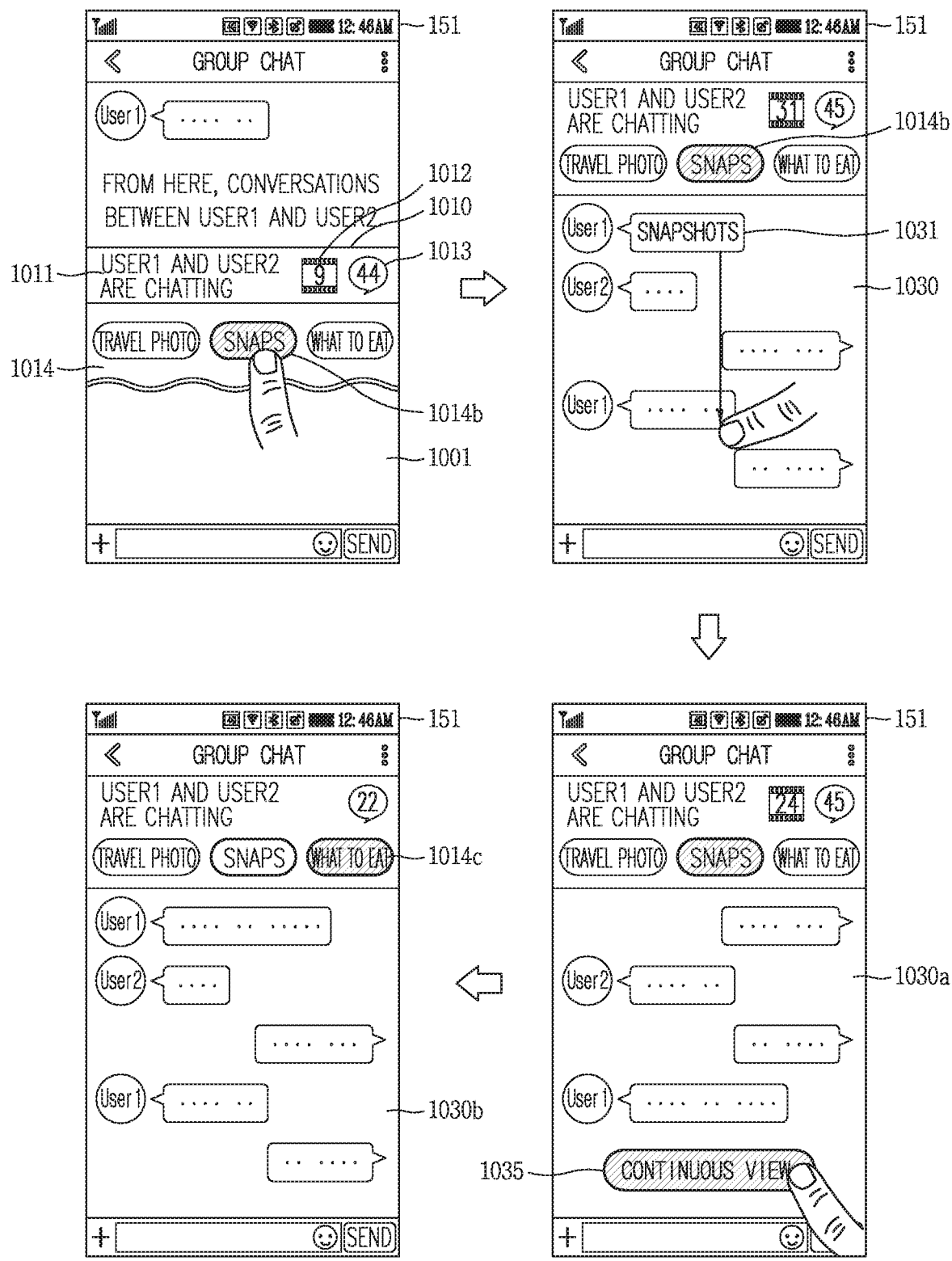

Next, FIG. 10 illustrates an example of a method of checking exclusive conversations corresponding to a skip area based on a text message, namely, a method of fast checking contents of the exclusive conversations, starting from a user-desired position.

Referring to FIG. 10, when a skip area 1010 is provided in a group chat screen 1001, keywords for estimating contents of exclusive conversations corresponding to the skip area 1010 are output. For example, 'travel photos', 'snaps' and 'what to eat' which are related to conversations between User 1 and User 2 may be generated as the keywords of the exclusive conversations, and the generated keywords may be output in one area 1014 of the skip area 1010.

As such, when the information belonging to the skip area 1010 is received, the keywords displayed in the skip area 1010 may be updated, such as added, changed and integrated. In addition, the keywords may be listed according to a conversation order of the exclusive conversations. For example, it may be estimated in FIG. 10 that contents of the exclusive conversations between User 1 and User 2 are involved in 'travel photos', and then the topic is changed sequentially to 'snaps' and 'what to eat'.

At this time, the user of the terminal may touch the 'snaps' keyword to first check the topic related to the 'snaps' among the contents of the exclusive conversations. Specifically, when a touch input is applied to the 'snaps' keyword 1014b, an image whose size changes, namely, an exclusive conversation display area 1030 is generated in the skip area 1010, and exclusive conversations related to the 'snaps' are displayed in the area 1030. That is, the exclusive conversations related to the 'travel photos' are skipped and conversations are unfolded starting from a started position of the exclusive conversations related to the 'snaps'.

Afterwards, when a scroll operation is applied to the exclusive conversation display area 1030, subsequent messages are scrolled and displayed in a time-based order in which the exclusive conversations have been executed. At this time, when the exclusive conversations related to the selected keyword 'snaps' are all displayed, a bar-like indicator 1035 may be displayed at a bottom of a scrolled area 1030*a* to guide whether or not to continuously confirm exclusive conversations related to the next keyword. When a touch input is applied to the indicator 1035, a selection mark is displayed on the next keyword, i.e., 'what to eat', displayed in the skip area 1010 (1014*c*), and a continuous view of the exclusive conversations related to the corresponding keyword is executed (1030*b*).

On the other hand, when it is desired to confirm conversations before the exclusive conversations related to the 'snaps', the user may quickly move to the previous conversations by applying a touch to the previous keyword, namely, 'travel photos', displayed in the skip area 1010. In addition, when a touch is applied again to the 'snaps' keyword displayed in the skip area 1010 while scrolling the exclusive conversations related to the 'snaps', the conversations may fast be moved to the started position of the exclusive conversations related to the 'snaps'.

Figure 11:
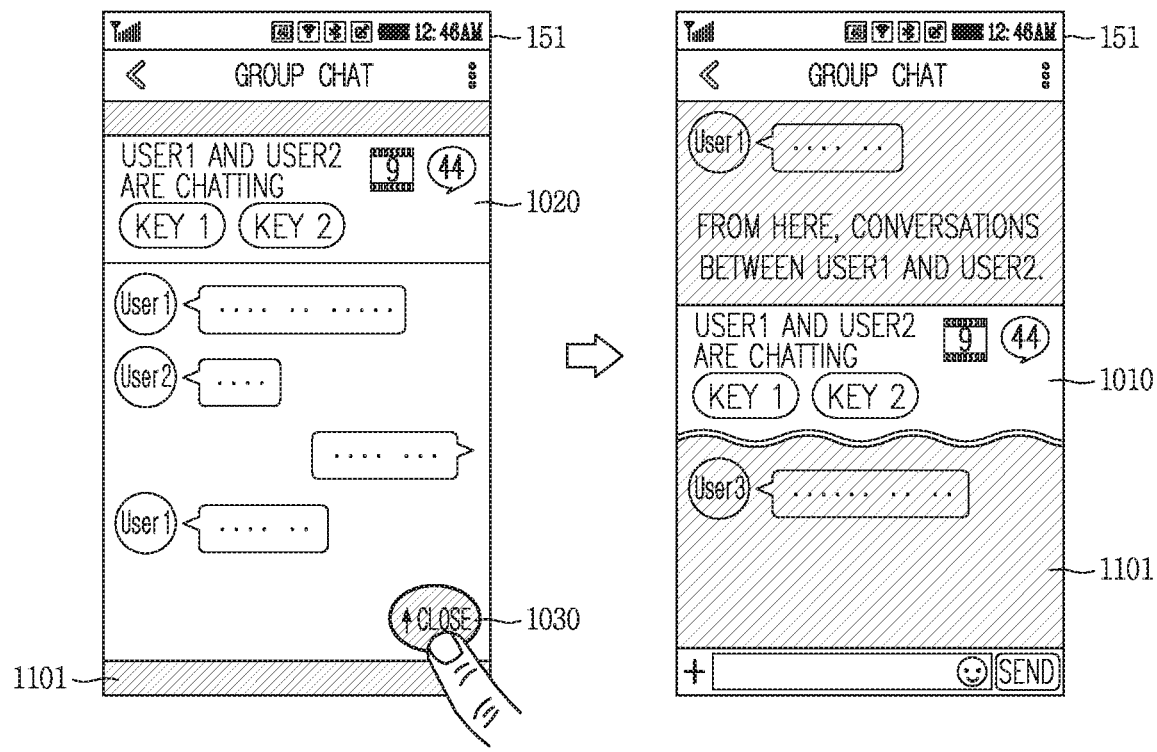

FIG. 11 illustrates an example of skipping exclusive conversations corresponding to the skip area 1020 without fully confirming the contents of the exclusive conversations or fast moving to group conversations after the exclusive conversations, in a state in which the exclusive conversations corresponding to the skip area 1020 are unfolded.

Referring to FIG. 11, when the skip area is opened, an exclusive conversation display area 1020 is displayed in a group chat screen 1101. Here, the fact that the skip area is opened means that all or part of exclusive conversation is displayed in the exclusive conversation display area, in response to a touch input applied to any one of a keyword displayed in the skip area, participant information, a file icon, and a cumulative number of conversations.

While the exclusive conversation display area 1020 is displayed, a close icon 1030 for closing the exclusive conversation display area 1020 may be provided in a floating form at a bottom of the corresponding area 1020. Here, closing the exclusive conversation display area 1020 means that the exclusive conversation display area 1020 currently outputting the exclusive conversations is folded and the skip area appears again.

The close icon 1030 is continuously fixed at the bottom of the corresponding area 1020 even while a scroll operation is applied to the exclusive conversation display area 1020. Accordingly, the user can close the skip area by touching the close icon 1030 at any time even while confirming the contents of the exclusive conversations. Consequently, as illustrated in FIG. 11, the exclusive conversation display area 1020 is switched to the skip area 1010 within the group chat screen 1101.

Figure 12:
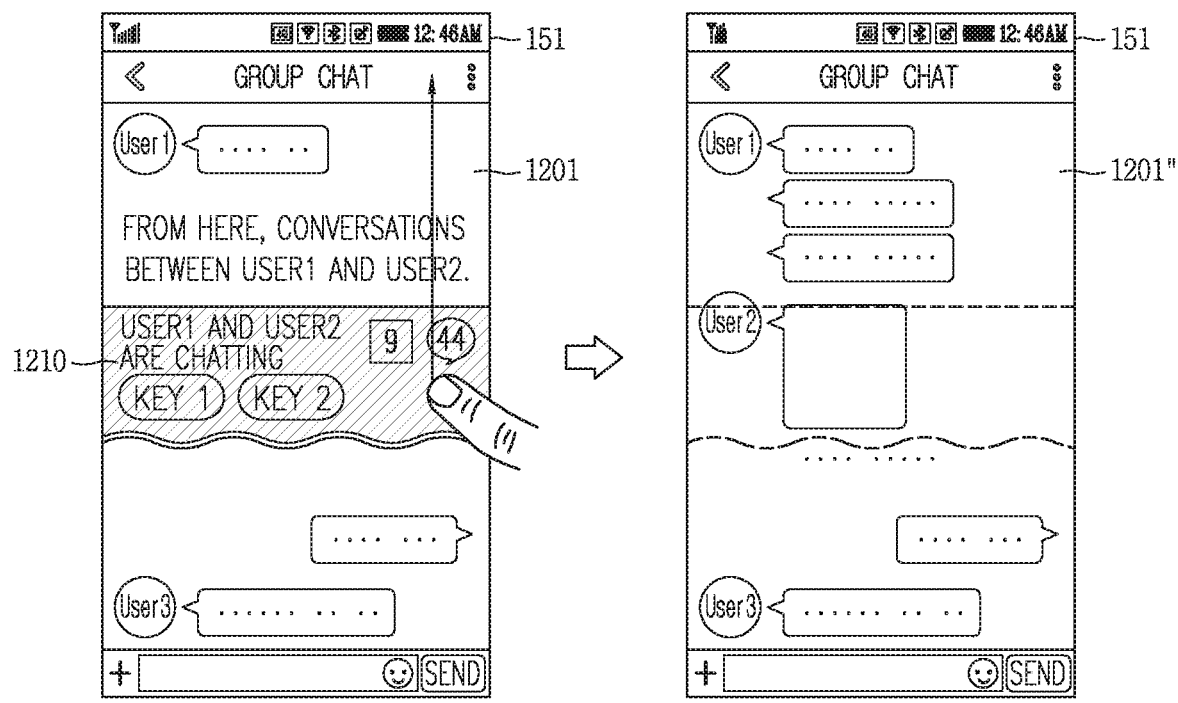

As another embodiment, FIG. 12 illustrates an example of a method for quickly unfolding full exclusive conversations corresponding to a skip area. In detail, referring to FIG. 12, in a state where a skip area 1210 is provided in a group chat screen 1201, when a touch applied to the skip region 1210 is dragged toward a top of the group chat screen 1201, the skip area 1210 disappears and all of the corresponding exclusive conversations are unfolded within the group chat screen in a time-based order (1201"). Simultaneously, a visual effect such as spreading paper or fabric may be output in the group chat screen 1201. Here, it is regarded that the user intentionally tries to confirm the entire group conversations in a sequential manner, and thus guide information notifying an amount of data to be consumed as illustrated in FIG. 5A is not output.

Hereinafter, embodiments related to providing and controlling a plurality of skip areas in a group chat screen will be described.

Figure 13A:
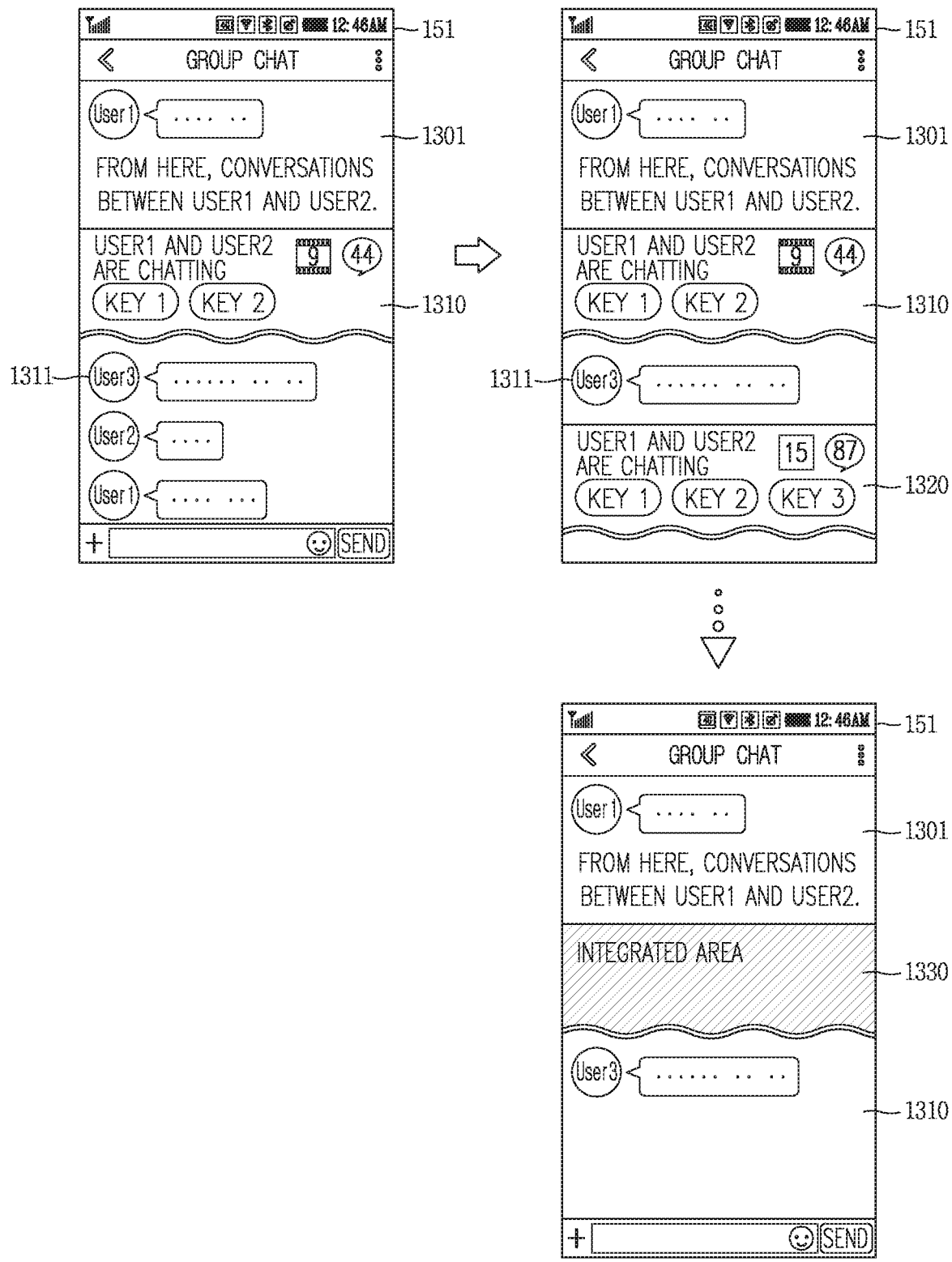
FIGS. 13A and 13B are conceptual views illustrating examples related to a method of integrating (merging) a plurality of skip areas, in a mobile terminal in accordance with the present invention.

First, an example of providing a plurality of skip areas in a group chat screen is illustrated in FIG. 13A. After a first skip area 1310 is provided as exclusive conversations between User 1 and User 2 continue in a group chat screen 1301, when User 3 participates in the conversations, a message 1311 of User 3 is then displayed below the first skip area 1310.

Afterwards, when new exclusive conversations between User 1 and User 2, namely, a second exclusive conversation (for example, exclusive conversations non-related to the exclusive conversations corresponding to the first skip area) are continued, a second skip area 1320 for selectively confirming the second exclusive conversation may be generated below the message 1311 of User 3.

At this time, the first skip area 1310 and the second skip area 1320 may be displayed as different images that are visually distinguishable from each other. Here, the visually distinguishable different images may indicate images different from each other in one of shape, color, size, and highlighting effect. Also, although not illustrated, the first skip area 1310 and the second skip area 1320 may be numbered to correspond to a time-based order. Further, a collective view of a plurality of skip areas may be executed using a more-view icon provided on an upper end of the group chat screen 1301.

Meanwhile, the first and second skip areas 1310 and 1320 may be implemented to be integrated with each other within the group chat screen 1301.

As one related example, as illustrated in FIG. 13A, when the participants (User 1 and User 2) of the exclusive conversations corresponding to the plurality of skip areas 1310 and 1320 are the same as each other, one integrated skip area 1330 may be provided. At this time, redundant keywords are removed from the plurality of skip areas 1310 and 1320, and indications of the file icon and the cumulative number of conversations are updated to summed values, respectively. In addition, the integrated skip area 1330 is provided at a position where the first skip area 1310 is displayed. Therefore, the message 1311 of User 3 that has been displayed between the plurality of skip areas 1310 and 1320 is displayed below the integrated skip area 1330.

Figure 13B:
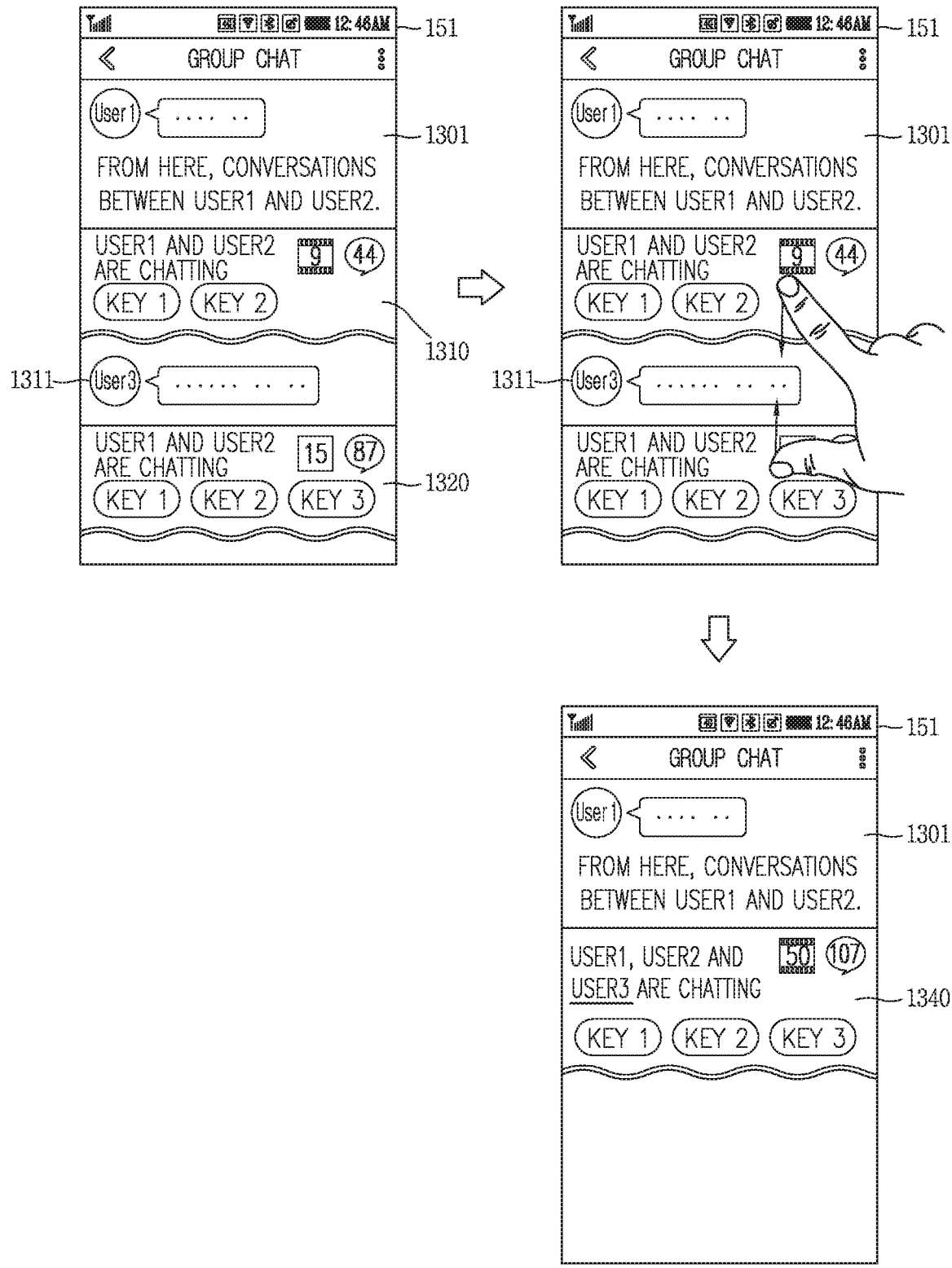

As another example, FIG. 13B illustrates an example in which the plurality of skip areas are integrated based on a user input. As illustrated in FIG. 13B, when a plurality of touch inputs are applied to an arbitrary point of the first skip area 1310 and an arbitrary point of the second skip area 1320 and dragged in a direction toward each other, the first skip area 1310 and the second skip area 1320 may be merged into one integrated skip area 1340.

At this time, the message 1311 of User 3 displayed between the first skip area 1310 and the second skip area 1320 is also merged into the integrated skip region 1340. As a result, User 3 is added to the participant information displayed in the integrated skip area 1340 in addition to User 1 and User 2.

On the other hand, even in case of a low battery of the mobile terminal 100, it is necessary to change a display method of contents shared in exclusive conversations corresponding to a skip area. To this end, the mobile terminal 100 according to the present invention may summarize or reconstruct the contents shared in the exclusive conversations corresponding to the skip area according to a remaining battery capacity of the terminal, and display the summarized or reconstructed contents.

To this end, when a touch input is applied to the skip area, the controller 180 of the mobile terminal 100 according to the present invention may check a remaining battery capacity mounted in the terminal main body. When an amount of charged power is less than a reference value, the contents shared in the corresponding exclusive conversations may be reconstructed to correspond to a low power mode and display the reconstructed contents.

Figure 14B:
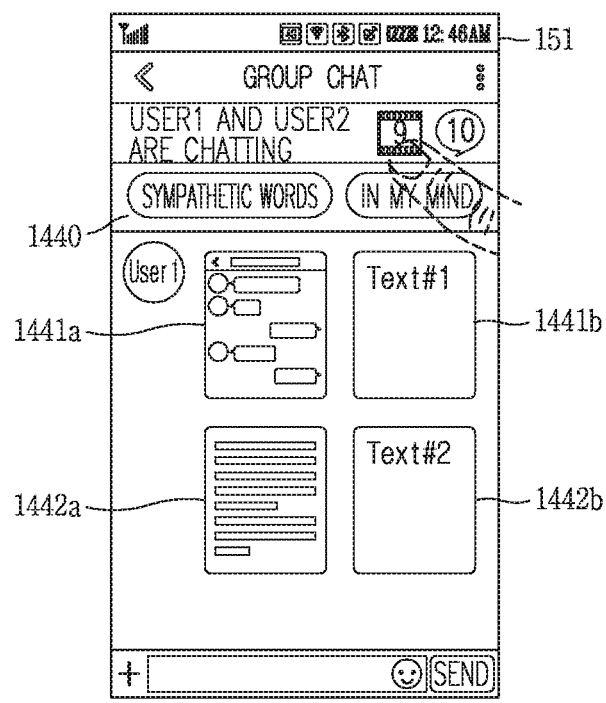

For example, FIGS. 14A and 14B illustrate examples of providing contents shared in exclusive conversations by converting a file format of the contents in case of a low battery.

First, as illustrated in FIG. 14A, when guide information 1410 informing a low battery is popped up while a group chat screen 1401 is displayed, an operation mode of the terminal may be set using the popped-up guide information 1410 such that the terminal is operated in a low power mode. However, if the low power mode is set as a default for a shortage of the battery capacity, the process may be omitted.

When a touch input is applied to a video file icon 1422 displayed in a skip area 1420 in the low power mode, an exclusive conversation display area 1430 may be displayed and video files shared in the skip area 1420 may be displayed in the corresponding area 1430. In this instance, the controller 180 of the mobile terminal 100 may also provide a plurality of still images 1431, 1432, and 1433 corresponding to the video files, respectively. Here, the plurality of still images may be generated by capturing a part where a gesture of an object is noticeably changed in each video file, and then storing the captured images in an image file format, such as bmp, jpg, jpeg, gif, tif and the like.

As described above, the video files shared in the exclusive conversations may be displayed in a manner of matching the plurality of still images. Thus, the images associated with the videos can immediately checked without downloading the videos and playing back the videos when the battery is low.

As another example, as illustrated in FIG. 14B, in a state of a low battery, image files such as bmp, jpg, jpeg, gif, or tif shared in exclusive conversations corresponding to a skip area may be converted into a message format and then displayed. Specifically, for example, when small-sized texts are included in an image file, the image file should be downloaded in order to check those texts. Accordingly, when the battery capacity is low, texts may be extracted from captured images 1441a and 1442a shared in the exclusive conversations, scales of the extracted texts may be adjusted so that the extracted texts can be read, and the texts may be provided in the message form to match the captured images, respectively (1441b and 1442b).

Accordingly, information contained in an image file can be immediately checked without downloading the image file in a situation where the battery capacity is low.

Figure 15A:
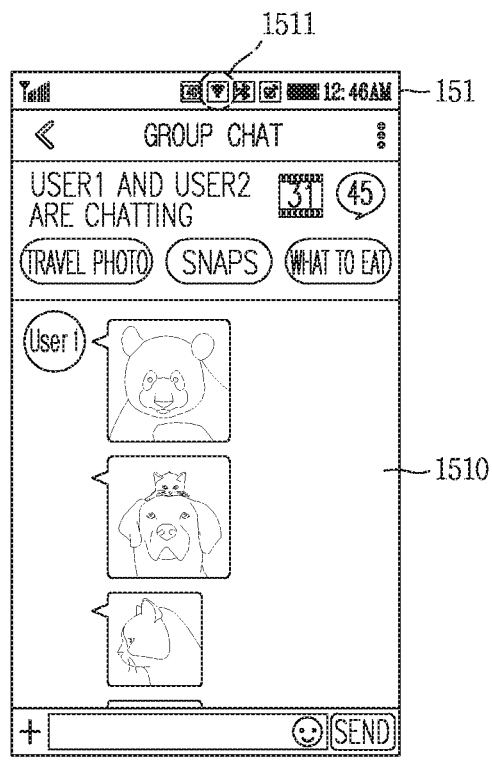
FIGS. 15A to 15C are conceptual views illustrating different methods of displaying a content shared in an exclusive conversation in a group chat according to a data usage, in a mobile terminal in accordance with the present invention.
Figure 15B:
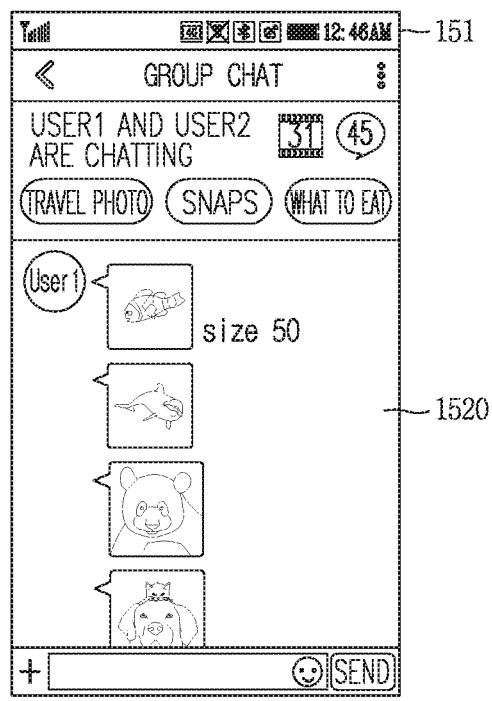
Figure 15C:
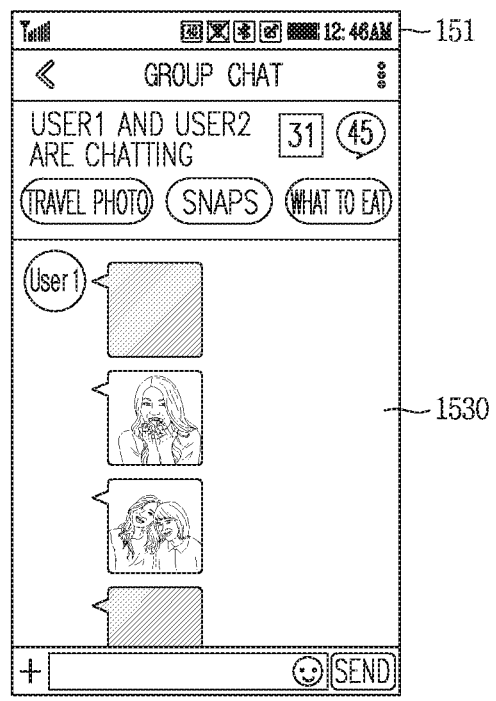

FIGS. 15A to 15C illustrate examples of varying a display method of contents shared in exclusive conversations according to a data usage in association with a charging issue.

First, FIG. 15A illustrates a case of downloading and displaying files shared in exclusive conversations corresponding to a skip area in an environment without a worry about charging, for example, in an environment supporting Wi-Fi communications. Without the worry of the charging, the files shared in the exclusive conversations may be downloaded and displayed in transmitted file format and size (1510). Next, FIG. 15B illustrates a case in which about 70% of an allowed amount of data is used. It is confirmed in FIG. 15B that files shared in the exclusive conversations corresponding to the skip area are scaled down, downloaded and displayed in consideration of the worry of the charging. Next, FIG. 15C illustrates a case where an allowed amount of data is smaller than before, for example, when about 90% of the data has been used. In this case, the controller 180 may selectively download and display a file which satisfies a specific condition among files shared in the exclusive conversations corresponding to the skip area, for example, only an image including the user of the terminal.

According to the embodiments described above, when exclusive conversations between some of participants in a group chat continue, the exclusive conversations may be grouped and provided in a form of a skip area in which downloading and displaying are restricted. Accordingly, group conversations can be checked after skipping the exclusive conversations between those participants without downloading them, thereby preventing unnecessary data consumption and also preventing noise due to frequent push alarms. Also, a portion to be checked in exclusive conversations can first be checked or only a part of the exclusive conversations can be downloaded and displayed, by using the skip area. In addition, a size or format of a file shared in the exclusive conversations can be converted to be suitable for a situation, thereby providing user convenience.

Figure 16:
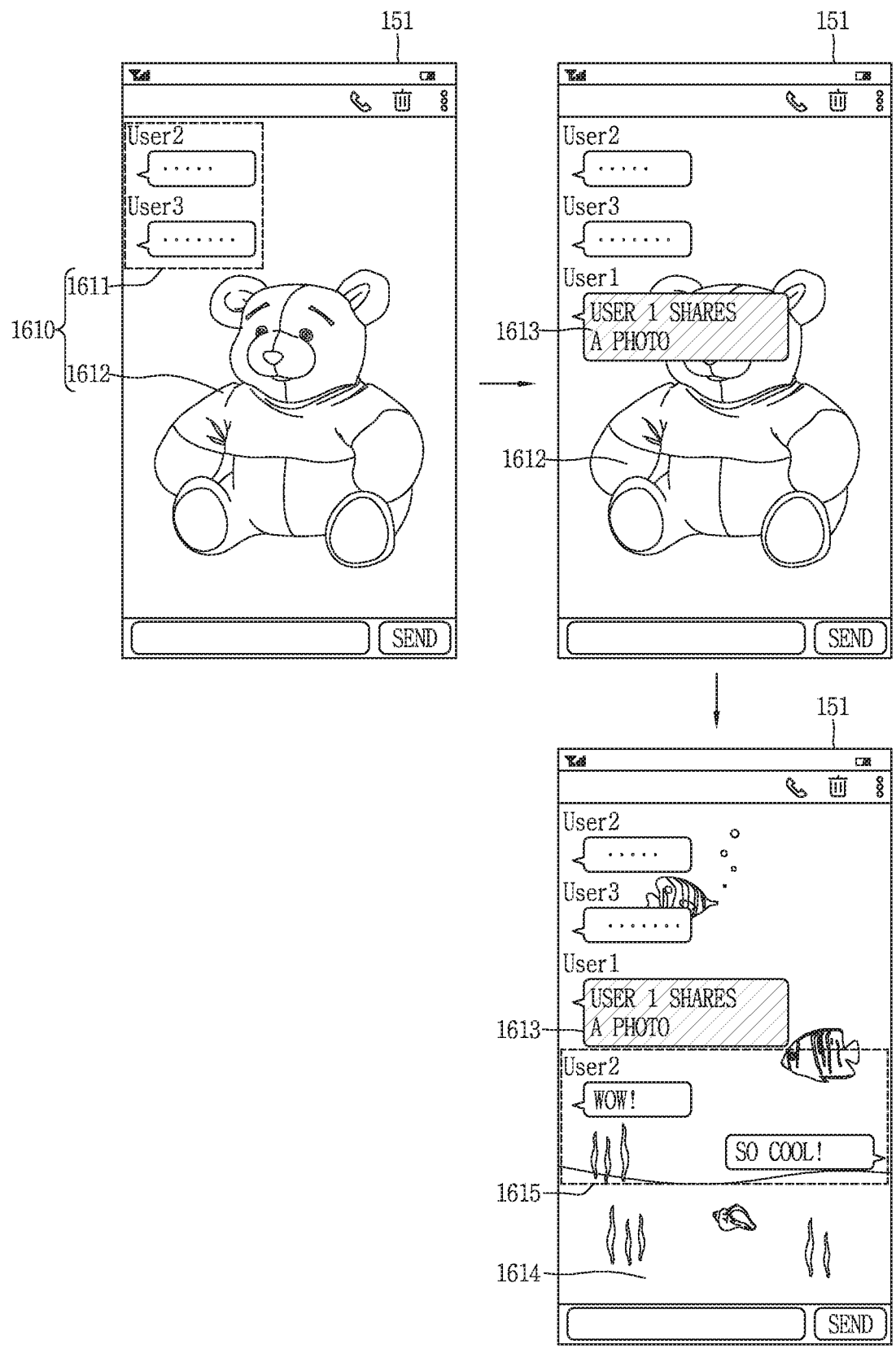
FIG. 16 is a conceptual view illustrating an operation implemented in a mobile terminal in accordance with the present invention.

Next, FIG. 16 is a representative conceptual view illustrating operations implemented in the mobile terminal related to the present invention.

Referring to FIG. 16, a group chat screen 1610 including a message area 1611 and a background area 1612 may be displayed on the display unit 151 of the mobile terminal 100. The message area 1611 may be located on a left and/or right side of the display unit 151 based on an originator of a message.

In this instance, an image corresponding to one of contents shared in the group chat screen 1610 may be displayed in the background area 1612. For example, an image corresponding to the most recently shared content, such as a photo, an image, a captured image of a video or a web page, a mirroring screen, link information, etc., may be output in the background area 1612 of the group chat screen 1610.

In an example, if there is no content shared in the group chat screen 1610, a preset alternative image or a user-set image may be displayed until the next content is shared. In addition, the content most recently shared in the group chat is output as a background image at a time point when the group chat screen 1610 is output in the display unit 151.

When a new content sharing request is received from a specific person belonging to the chat group while the group chat screen 1610 is displayed, information related to the new content sharing request is displayed in a form of a text message (1613). The information related to the new content sharing request, for example, may include information related to a user (originator) ('User 1') requesting for the content sharing and information related to a type ('photo') of the content requested to be shared, as illustrated in FIG. 16.

In addition, an image of the message area 1613 in which the corresponding information is displayed may be different from images of other message areas 1611 and 1615. For example, a shape, color, size, highlighting effect, or the like of the message area 1613 outputting thereon the information may be implemented differently so that the message area 1613 can be visually distinguished from the images of the other message areas 1611 and 1615.

In this manner, when the information related to the new content sharing request is displayed in the message area, an image 1612 displayed in the background area is switched to an image 1614 corresponding to the new content simultaneously or sequentially. When the image of the background area is changed to the image corresponding to the new content, the shape, color, size, or highlighting effect of the message area 1613 may be changed to correspond to the images of the other message areas 1611 and 1615.

Also, the image 1612 displayed in the background area may be automatically saved at a designated position (e.g., a chat folder) of the terminal. Afterwards, the display state of the changed background image 1614 is maintained even while new text-based messages (e.g., 'Wow!', 'Really cool!') with respect to the new content are displayed in the message area 1615.

As described above, according to the present invention, since a content is displayed on a full group chat screen every time of requesting for sharing the content, the user does not have to additionally check a detail view of the content. Thus, the user can continuously write and check text-based messages while viewing the content requested to be shared, so that seamless content sharing and chatting can be executed.

Figure 17:
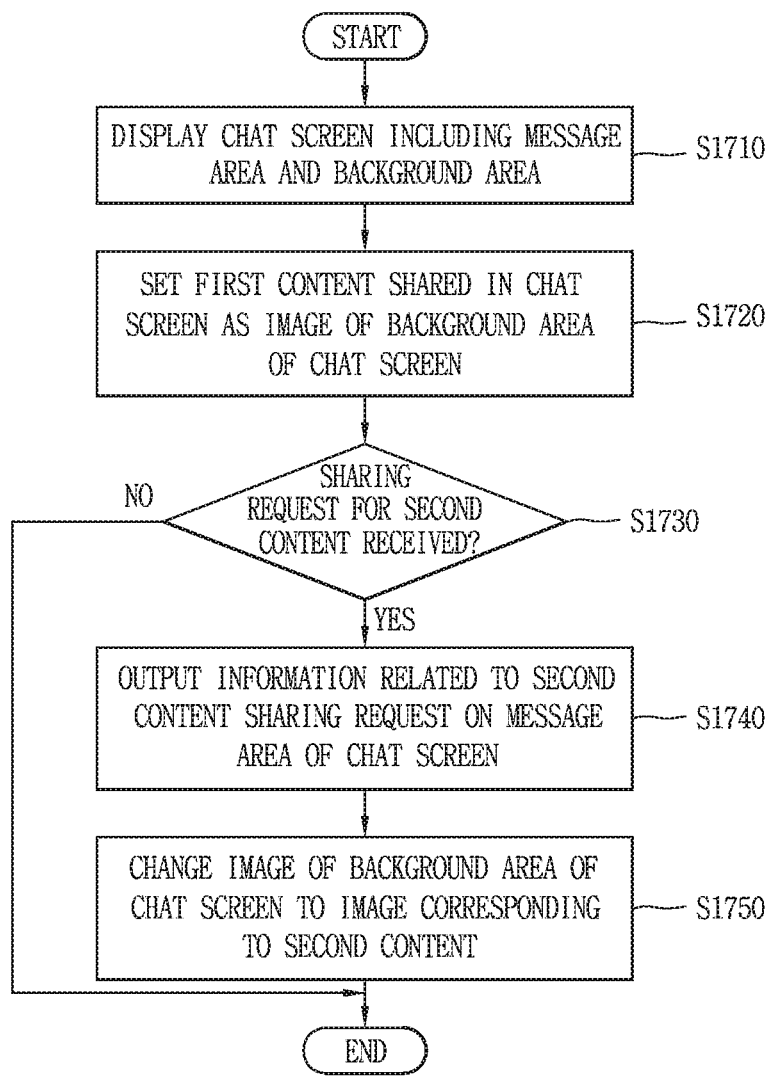
FIG. 17 is a flowchart illustrating an operation implemented in a mobile terminal in accordance with the present invention.

Hereinafter, FIG. 17 is a representative flowchart illustrating operations implemented in the mobile terminal according to the present invention.

First, referring to FIG. 17, a step of displaying a chat screen including a message area and a background area on the display unit 151 of the mobile terminal 100 is started (S1710). Meanwhile, if a user does not use the terminal or is currently using another application, the step S1710 may be omitted.

Next, a first content shared in the chat screen is set as an image of the background area of the chat screen (S1720). Here, the first content may be one of the most recently shared content or a content that has made headlines for the longest time on the chat screen.

In addition, the set image of the background area, that is, the image corresponding to the first content is output as an image decided at a time point when the corresponding chat screen is displayed on the display unit 151. That is, the image of the background area of the chat screen may be changed by a number of times of sharing the content. For example, when another content is shared before the chat screen is displayed, the image of the background area may be reset from the first content to the newly shared content.

Next, while the chat screen is displayed, when a sharing request for a second content associated with the chat screen is received through the wireless communication unit 110 of the mobile terminal 100 (S1730), the controller 180 of the mobile terminal 100 displays information related to the sharing request for the second content in the message area of the chat screen (S1740).

Here, the second content may be the same as or different from the type of the first content. For example, the second content may be one of a photo, an image, a captured screen of a video or a web page, a mirroring screen and link information. Also, the information related to the second content sharing request may include information related to the user (originator) requesting for the sharing of the second content, and information related to the type of the second content. In one example, the information related to the sharing request for the second content may be visually distinguished from other text messages output in the message area, so that the user can intuitively predict and engage with a screen change performed in the following step S1750.

Next, the image of the background area of the chat screen is changed to the image corresponding to the newly shared second content (S1750). To this end, the controller 180 may store the image corresponding to the first content, which has been displayed in the background area of the chat screen, in a designated folder, and then switch the image of the background area to the image corresponding to the second content. In addition, the controller 180 may adjust size and magnification of the image corresponding to the shared second content to correspond to size and magnification of the displayed chat screen.

Accordingly, since the user can write and check text messages related to a content while checking the content in a chat screen, more seamless chatting can be performed. Also, the shared content can be output in the full chat screen together with the messages, which may result in providing a more realistic and immersive content sharing environment.

Hereinafter, with reference to FIGS. 18A and 18B, examples related to a method of setting a shared content as a background image of a chat screen will be described in detail.

Figure 18A:
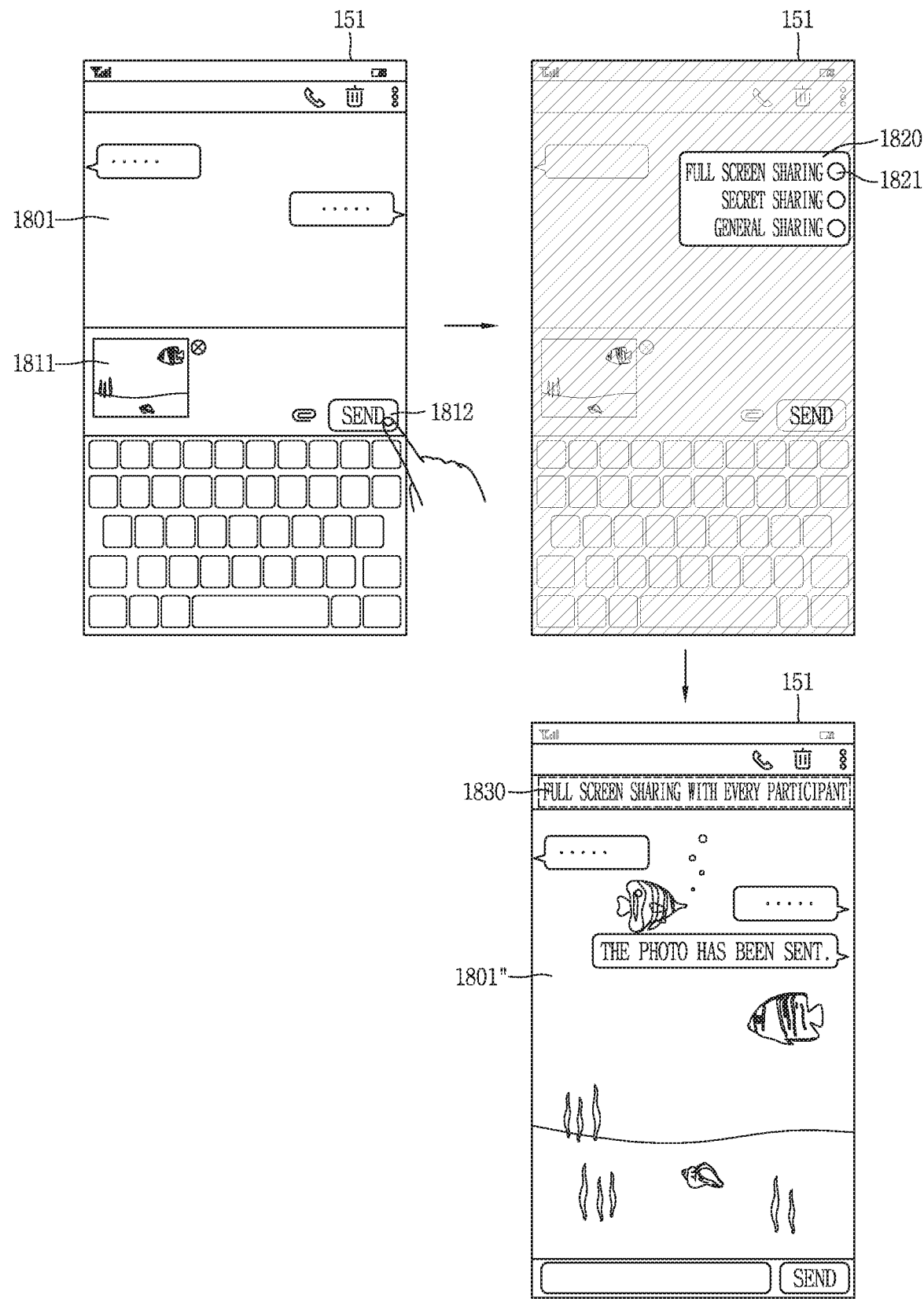
FIGS. 18A and 18B are views illustrating examples related to a method of setting a shared content to a background image of a chat screen, in a mobile terminal in accordance with the present invention.
Figure 18B:
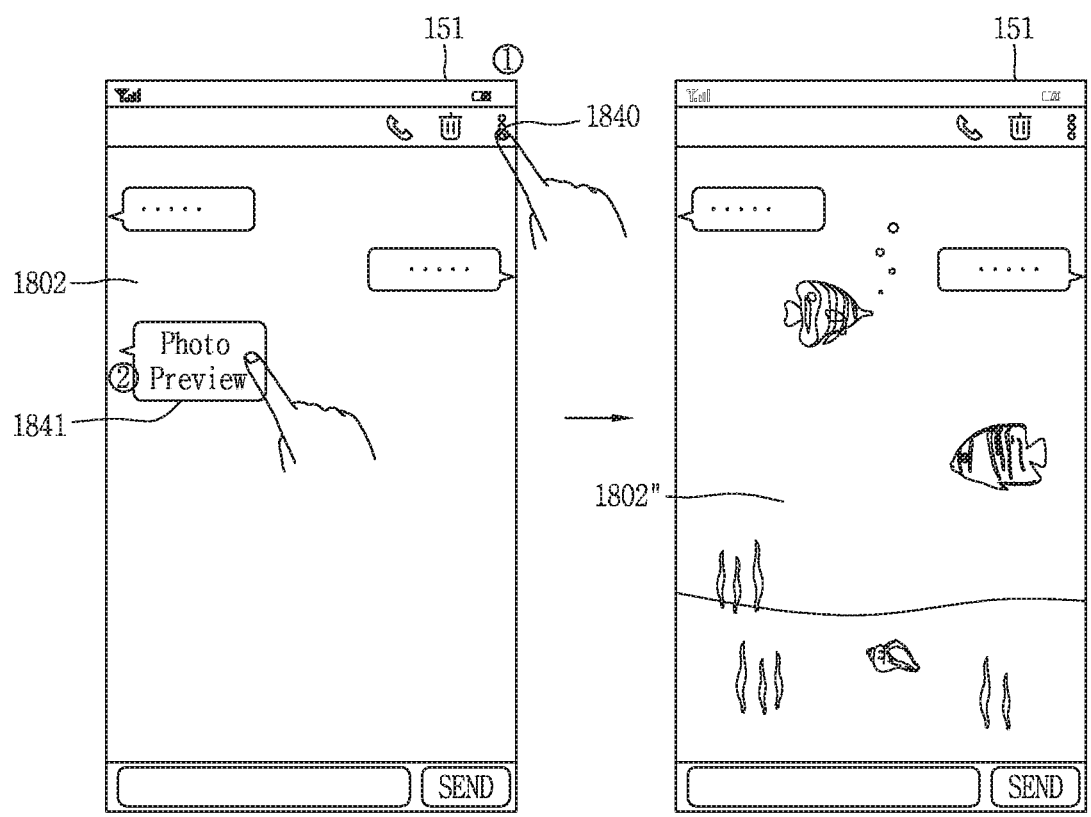

FIG. 18A illustrates an exemplary operation implemented in an originator terminal (hereinafter, referred to as 'first terminal') sending a content sharing request, and FIG. 18B illustrates an exemplary operation implemented in a terminator terminal (hereinafter, referred to as 'second terminal') receiving the content sharing request First, as illustrated in FIG. 18A, a user of the first terminal selects a photo image 1811 to share on a chat screen 1801. Afterwards, when a touch input is applied to a transmit icon 1812, a menu window 1820 for selecting a transmitting method of the selected photo image 1811 is popped up. The popped-up menu window 1820 outputs thereon a plurality of menus related to content sharing methods, such as full screen sharing 1821, secret sharing, general sharing and the like.

The controller 180 may process the selected photo image differently based on the transmitting method selected using the menu window 1820.

For example, when a touch input is applied to the full screen sharing 1821, as illustrated in FIG. 18A, the selected photo image is displayed as a background image of the chat screen (1801"). In this instance, a bar-like indicator 1830 indicating that the selected photo image 1811 is currently shared in the full screen may be output on a top of the chat screen.

On the other hand, when the secret sharing is selected in the menu window 1820, the selected photo image 1811 is shared in the full screen only by several selected participants or users. In this instance, the indicator displayed on the top of the chat screen may display information related to those selected users.

Next, in FIG. 18B, a user of the second terminal may set a display method of a content shared on the chat screen by using a more view icon 1840 provided on a top of a chat screen 1802. Alternatively, when the content shared on the chat screen is displayed in a message area 1841, the display method of the content may be changed by applying a preset touch input, for example, a long-touch input or a double-touch input (or applying the preset touch input after entering a detail view of the content) to the message area 1841.

Accordingly, as illustrated in FIG. 18B, the content output in the message area 1841 is switched to a background image 1802" of the chat screen. In this instance, a graphic object notifying that the display method of the shared content has been changed may be output in one area of the chat screen, for example, a top or bottom of the chat screen.

Next, FIGS. 19A, 19B, 19C and 19D illustrate various examples related to a method of displaying a shared content on a background area according to an attribute of the content.

When a sharing request for a second content is received while a chat screen is displayed on the display unit 151 of the mobile terminal 100 according to the present invention (S1730, FIG. 17), originator information requesting for the sharing of the second content and attribute information related to the second content are displayed on a message area.

Here, the attribution information related to the shared content may include at least one of a type of the content, a file format and/or a file size of the content, a number of sharing the content, a source of the content, and a transmitting method of the content. Also, as described with reference to FIG. 18A, the content transmitting method may include the full screen sharing, the secret sharing, and the general sharing.

In addition, the controller 180 may differently decide a display method of the shared content based on setting information related to a second terminal that has received the content sharing request. Here, the display method of the shared content may include a general mode, a full screen mode, and a secret mode.

Figure 19A:
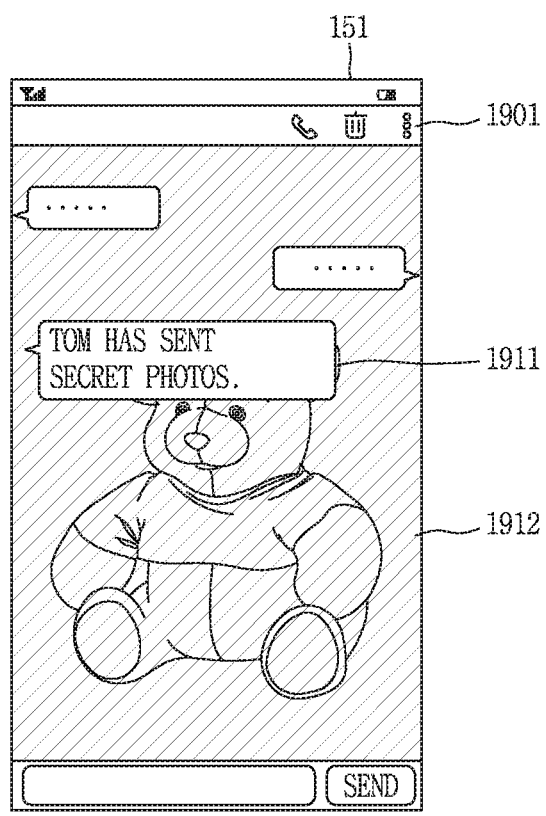
FIGS. 19A to 19D are views illustrating various examples of a method of displaying a shared content as a background image of a chat screen according to an attribute of the shared content, in a mobile terminal in accordance with the present invention.

For example, FIG. 19A illustrates a case where a first terminal transmits a shared content in a secret sharing manner and a display method of a second terminal is set to a full screen mode.

In this instance, a message area 1911 of a displayed chat screen 1901 may include an indication (e.g., 'oo has sent a secret photo') indicating that attribute information regarding a content to be shared is secret content. On a background area of the chat screen 1901, an image of the shared content is displayed on the full screen in a deformed state so as to correspond to the indication indicating the secret content. For example, as illustrated in FIG. 19A, the transmitted content may be displayed on the background area in a state that at least part thereof is blinded or blurred.

In this state, when a touch input is applied to a background area 1912 of the chat screen, the blinded or blurred at least part of the shared content may appear as a background image. At this time, the controller 180 may differently process the deformed shared content according to a dragged degree, a drag path, and a released point of a touch input applied to the background area 1912.

Figure 19B:
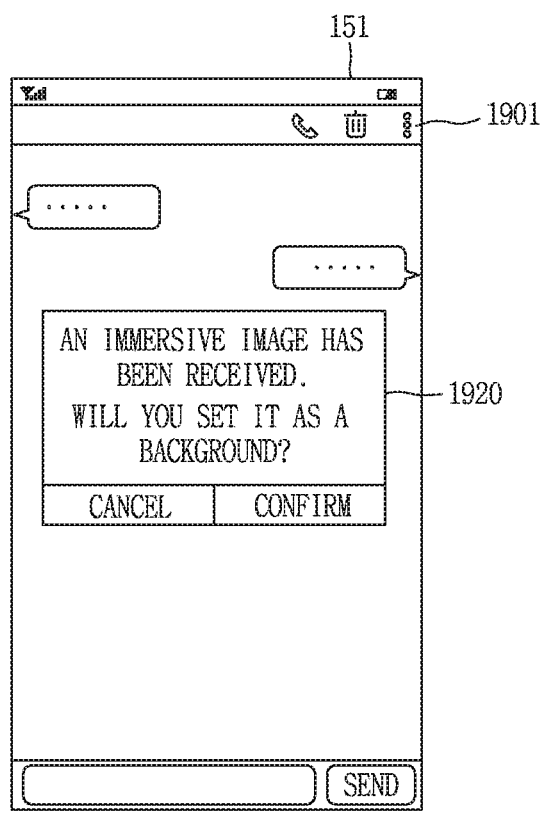

In another example, FIG. 19B illustrates a case where a first terminal transmits a content to be shared in a full screen sharing manner and a display mode of a second terminal is set to a general mode.

In this instance, as illustrated in FIG. 19B, a pop-up window 1920 asking whether to set the shared content as a background image of the chat screen may be provided on the chat screen 1901. As a result, the user can select whether to view the shared content as the background image. That is, according to a response to the pop-up window 1920, the shared content may be displayed as the background image of the chat screen or displayed only on the message area.

On the other hand, even when 'Cancel' is selected according to the response to the pop-up window 1920, as described with reference to FIG. 19B, the content output in the message area may be switched to the background image of the chat screen by applying a preset touch input to the message area in which the shared content is displayed.

Figure 19C:
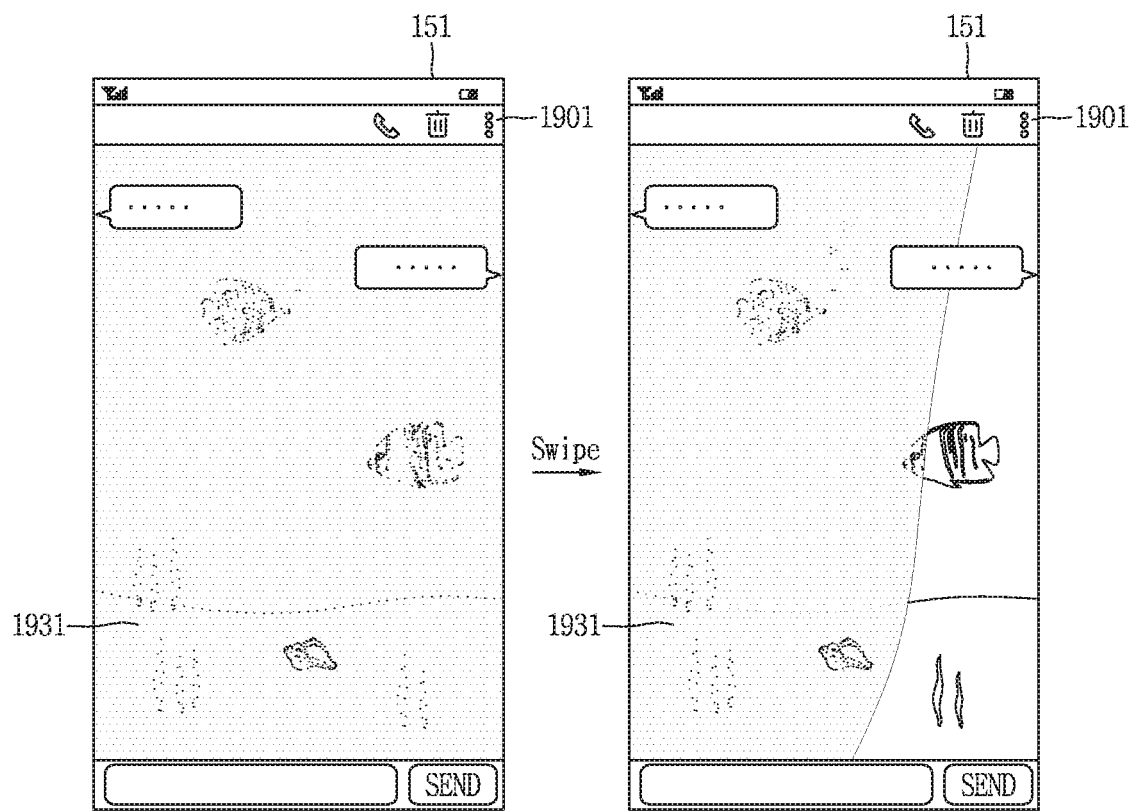

In another example, FIG. 19C illustrates a case where a first terminal transmits a content to be shared in a full screen sharing manner or a secret sharing manner, and a display method of a second terminal is set to a secret sharing mode.

In this instance, all of received shared contents are displayed on a message area or a background area 1931 of the chat screen 1901 in an obscured state. As illustrated in FIG. 19C, in a state that the shared contents are displayed on the full background area 1931 in a blurred state, when a tap or swipe input is applied to the background area 1931, a part of the blurred shared contents may be exposed (1932). However, an exposure of a portion which is intentionally edited in the first terminal to be blinded may be restricted even though the tap or swipe input is applied.

In addition, the controller 180 may differently decide the display method of the shared content according to a number of content sharing requests received for a preset time. Here, the preset time may be, for example, 3 to 10 seconds or less, and a cumulative number of the content sharing request may be limited to a case where the content originator is the same.

Figure 19D:
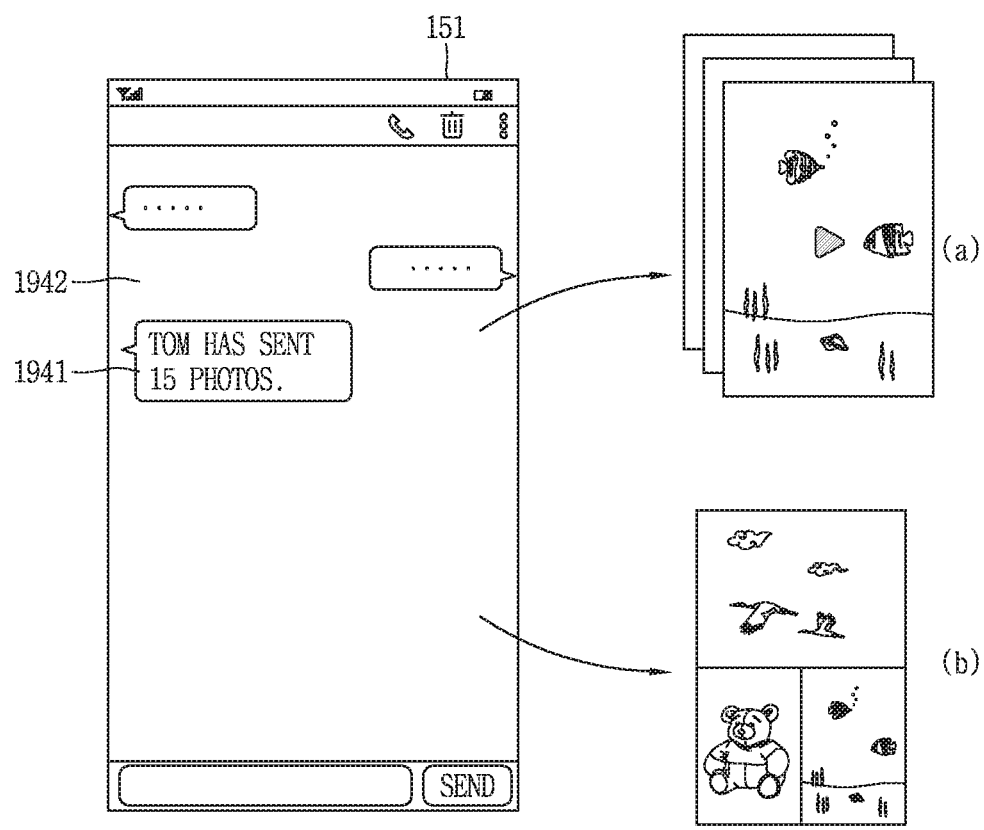

For example, FIG. 19D illustrates a case where a sharing request for a plurality of contents, for example, a sharing request for 15 contents, are received from the same originator for a preset time. More specifically, the controller 180 may check that a sharing request for a plurality of contents has been received for the preset time and information related to originators requested for the sharing of the contents are the same, on the basis of information 1941 related to the sharing request displayed in the message area, for example, attribute information related to the shared contents (e.g., 'the number of shared contents is 15', 'photos') and originator information (e.g., 'Tom'). Here, the plurality of contents do not have to necessarily be transmitted simultaneously and also may be received from the same originator within a few seconds to several tens of seconds.

In this instance, when a plurality of images corresponding to the plurality of contents may be reproduced on the background area in a moving GIF format or a form of a slide show as illustrated in (a) of FIG. 19D. Alternatively, as illustrated in (b) of FIG. 19D, the plurality of images may be displayed on the background area in a collective manner like a tile view mode. Even in this instance, when desiring to set only a specific content to the background image, the desired specific content may be fixed on the background area by touching a specific area of the tile view or touching the background area at a time point when a specific image is displayed in the slide show.

Figure 20:
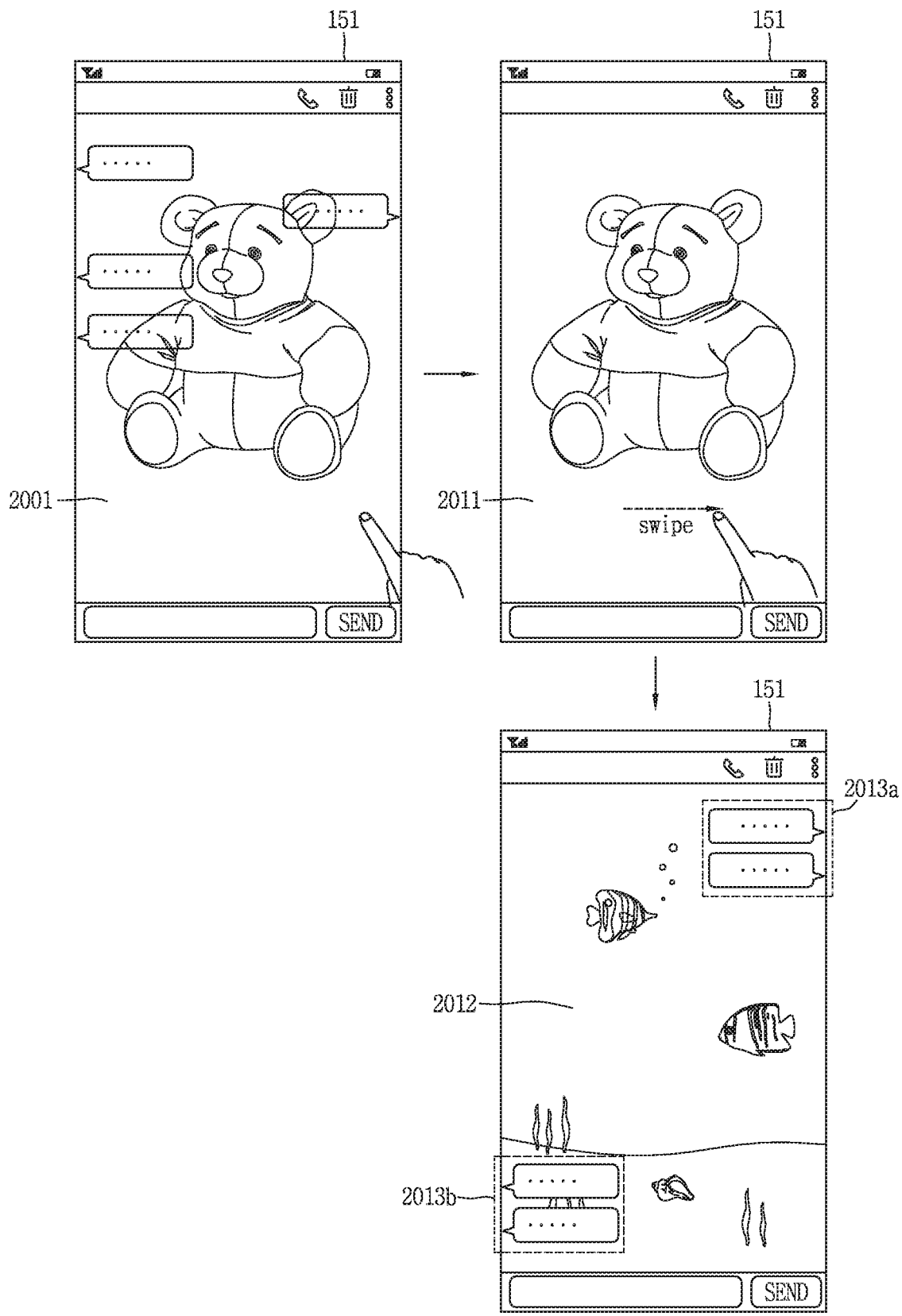
FIGS. 20, 21A and 21B are exemplary views illustrating a method of searching for a chat based on a content-sharing time point on a chat screen, in a mobile terminal in accordance with the present invention.
Figure 21A:
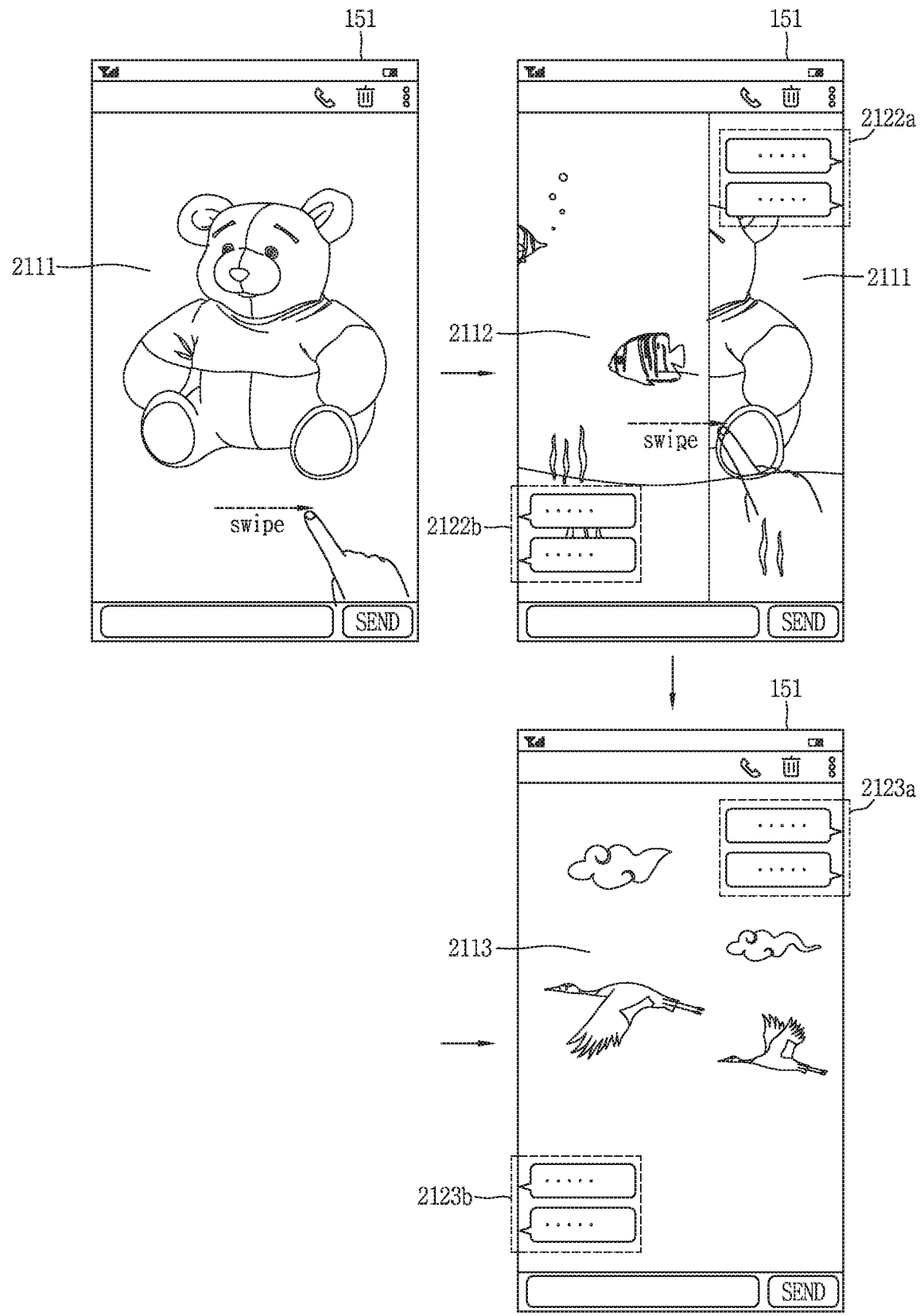
Figure 21B:
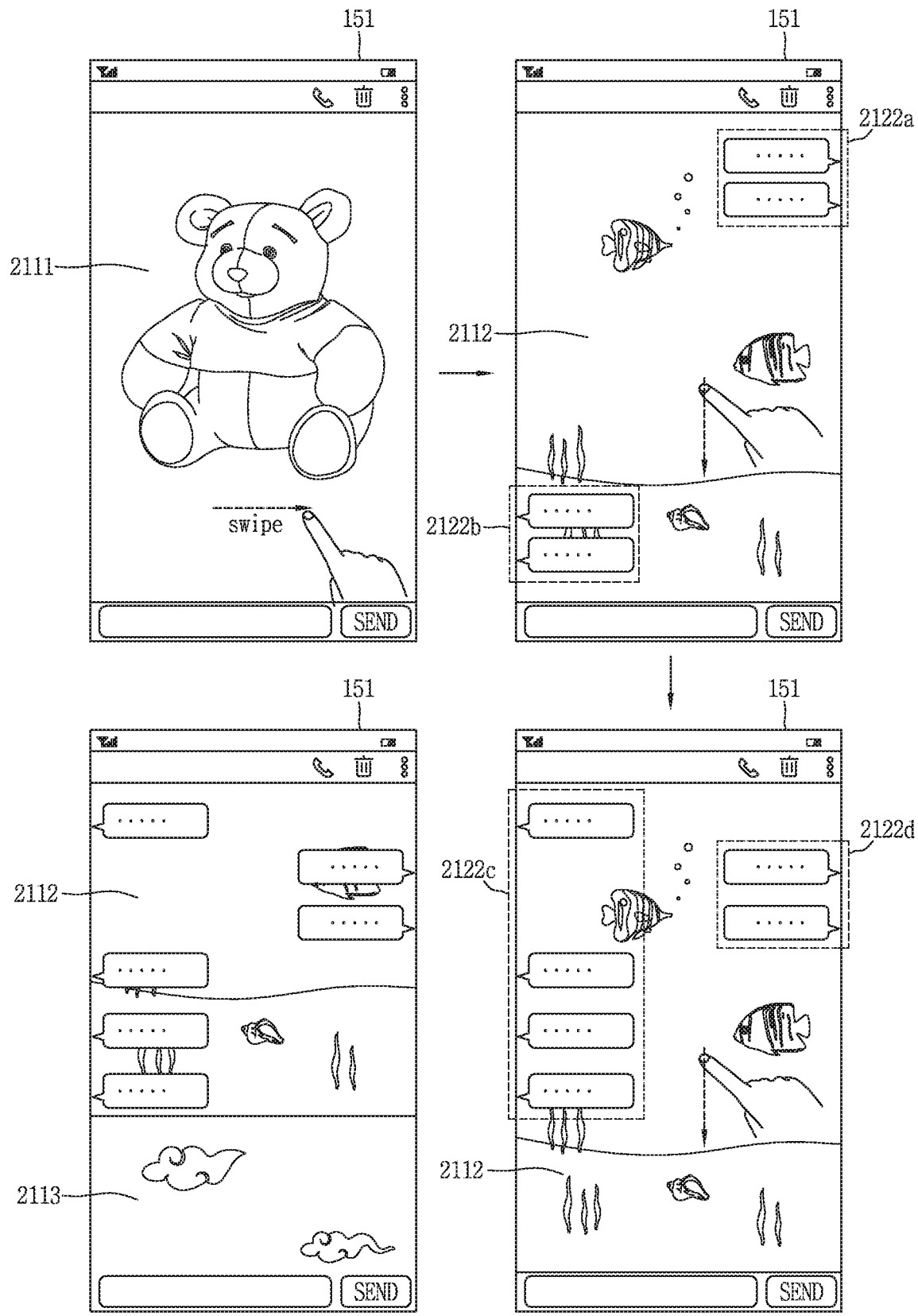

Next, FIGS. 20, 21A and 21B are exemplary views illustrating a method of searching for chat conversations based on a shared time point of a content on a chat screen in the mobile terminal according to the present invention.

First, referring to FIG. 20, when a touch input is applied to one point of a background area 2001 of a chat screen while a shared content (e.g., a first content or a second content) is displayed on the background area 601, a detail view of the displayed shared content may be entered. As a result, the chat screen including message areas is converted into the detail view 2011 of the shared content.

In this state, when a touch input is applied in a horizontal direction to the detail view 2011 of the shared content, a detail view 2012 of the next/previous shared content appears, and 'search mode' based on a content shared time point is executed. The controller 180 outputs contents, which have been shared on the chat screen, on the display unit 151 based on shared time points of the contents according to a number of touch inputs applied to the detail view of the shared content.

During the executed search mode, one of the contents shared on the chat screen is displayed as a background image and simultaneously at least a part of messages displayed at the shared time point of the content is displayed on a left/right area of the display unit 151. That is, some of text messages displayed based on a transmitted time point (or received time point) of the shared content are displayed on the screen, such that context exchanged at the transmitted time point of the shared content can be easily recognized.

For example, it can be seen in FIG. 20 that while a specific content is displayed as a background image, two transmitted messages and two received messages at the shared time point of the specific content are displayed on a right message area 2013a and a left message area 2013b of the screen, respectively. According to this, a content-shared time point may be used as a new reference for searching for a chat conversation.

In detail, referring to FIG. 21A, when a swipe input is applied to the display unit 151 in a horizontal direction after entering a detail view 2111 ('first image') of a shared content, a search mode is executed. Accordingly, a detail view 2112 ('second image') of a content shared immediately before the first image gradually appears on the screen along the swiped direction. Next, when a predetermined time elapses after the second image 2112 is displayed on the full screen, a part of messages exchanged at a time point when the second image is shared is output on the screen. In this instance, messages transmitted by the user of the terminal may appear on an upper right (or lower right) of the screen (2122a), and messages received from a chat partner may appear on a lower left (or upper left) of the screen. In addition, a number of output messages may be preset. Also, appearing direction and position of the output messages may differ depending on a time point that each message is transmitted or received.

Next, when a swipe input is continuously applied to the display unit 151 in the horizontal direction, a detail view 2113 ('third image') of a content shared before the second image 2112 is gradually displayed on the display unit 151 and finally displayed on the full screen. And, messages 2122a and 2122b exchanged at the time point when the second image is shared disappear and messages 2123a and 2123b exchanged at the time point when the third image is shared are displayed on the corresponding area. Also, although not illustrated, when the swipe input is applied to the display unit 151 in a direction opposite to the previous direction, the output messages 2123a and 2123b may disappear, and the second image and the messages 2122a and 2122b exchanged at the time point when the second image is shared may sequentially appear again.

Also, those messages 2122a, 2122b, 2123a, and 2123b exchanged at the time points when the second image and the third image are shared may disappear from the screen after a lapse of a preset time without a user's operation.

FIG. 21B illustrates a screen change when a drag touch input is applied to the display unit 151 in a vertical direction after a search mode is executed. In detail, when the drag touch input is applied in the vertical direction while the second image 2112 and the messages exchanged at the shared time point of the second image 2112 are displayed, the search mode is terminated and chat messages 2122c and 2122d are scrolled starting from a current position. That is, the messages exchanged during the chat are sequentially or reversely scrolled along the scroll direction (up and down directions), starting from the current position. On the other hand, the second image displayed as the background image is continuously output while the chat messages are scrolled. Afterwards, when reaching the shared time point of the third image, the third image 2113 gradually appears as the background image along the scroll direction.

In this state, switching to the second image or the first image is limited even if a touch input is applied again to the display unit 151 in the horizontal direction. Accordingly, in order to search for conversations based on the shared content again, the user should enter a detail view by applying a touch to the background area of the chat screen, and then execute the search mode using the swipe touch input.

As described above, when a shared content is output as a background image of a chat screen, a content and a part of messages may overlap each other according to an image (shape, color, size of an included object, presence or absence of text, etc.) of the content, which may make it difficult to identify the content at a glance. Hereinafter, description will be given of a method in which a user can concentrate on a shared content or exchanged message conversations while maintaining a chat screen.

Figure 22A:
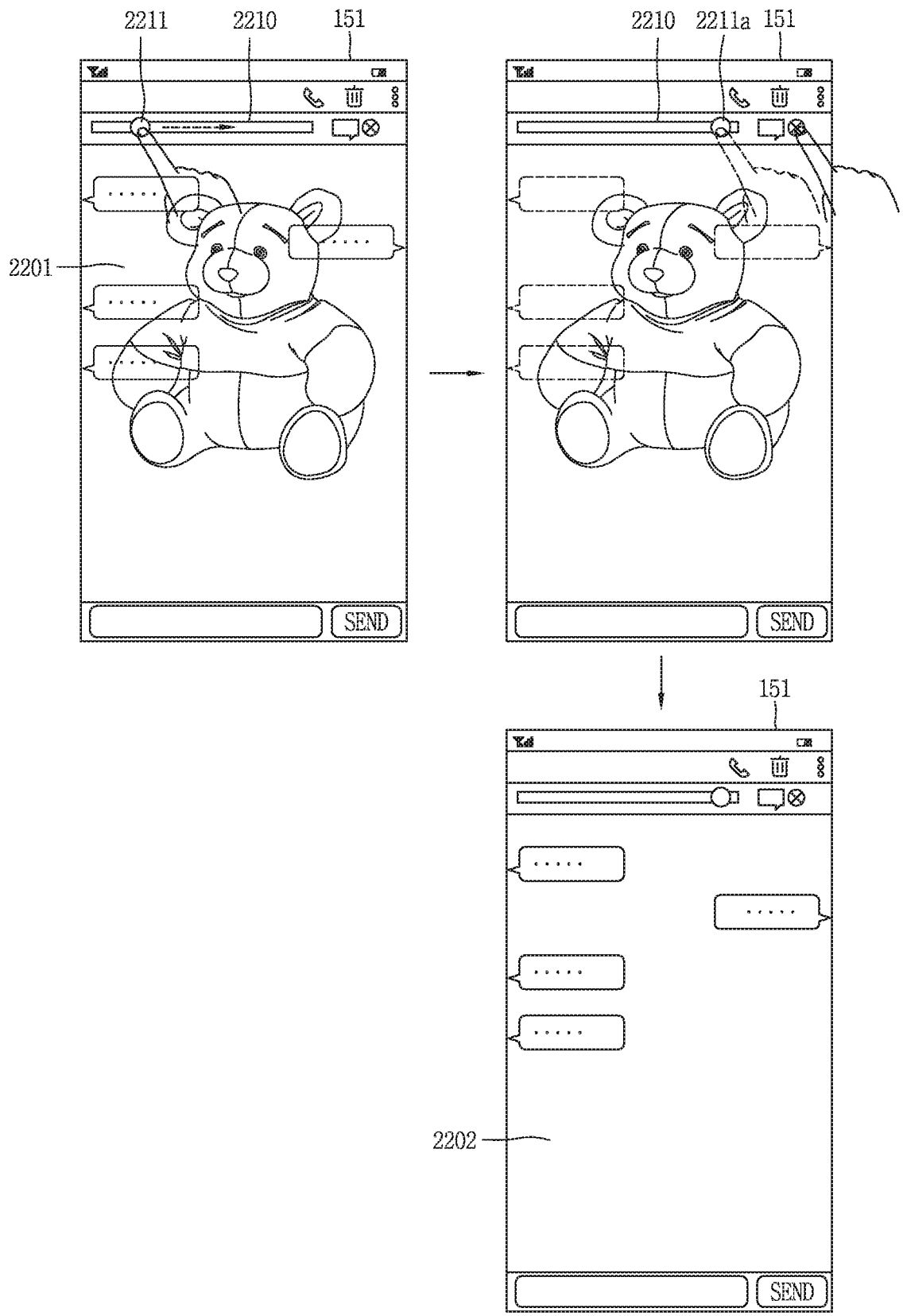
FIGS. 22A and 22B are exemplary views illustrating a method of adjusting transparency of a message area or a background area in a chat screen, in a mobile terminal in accordance with the present invention.
Figure 22B:
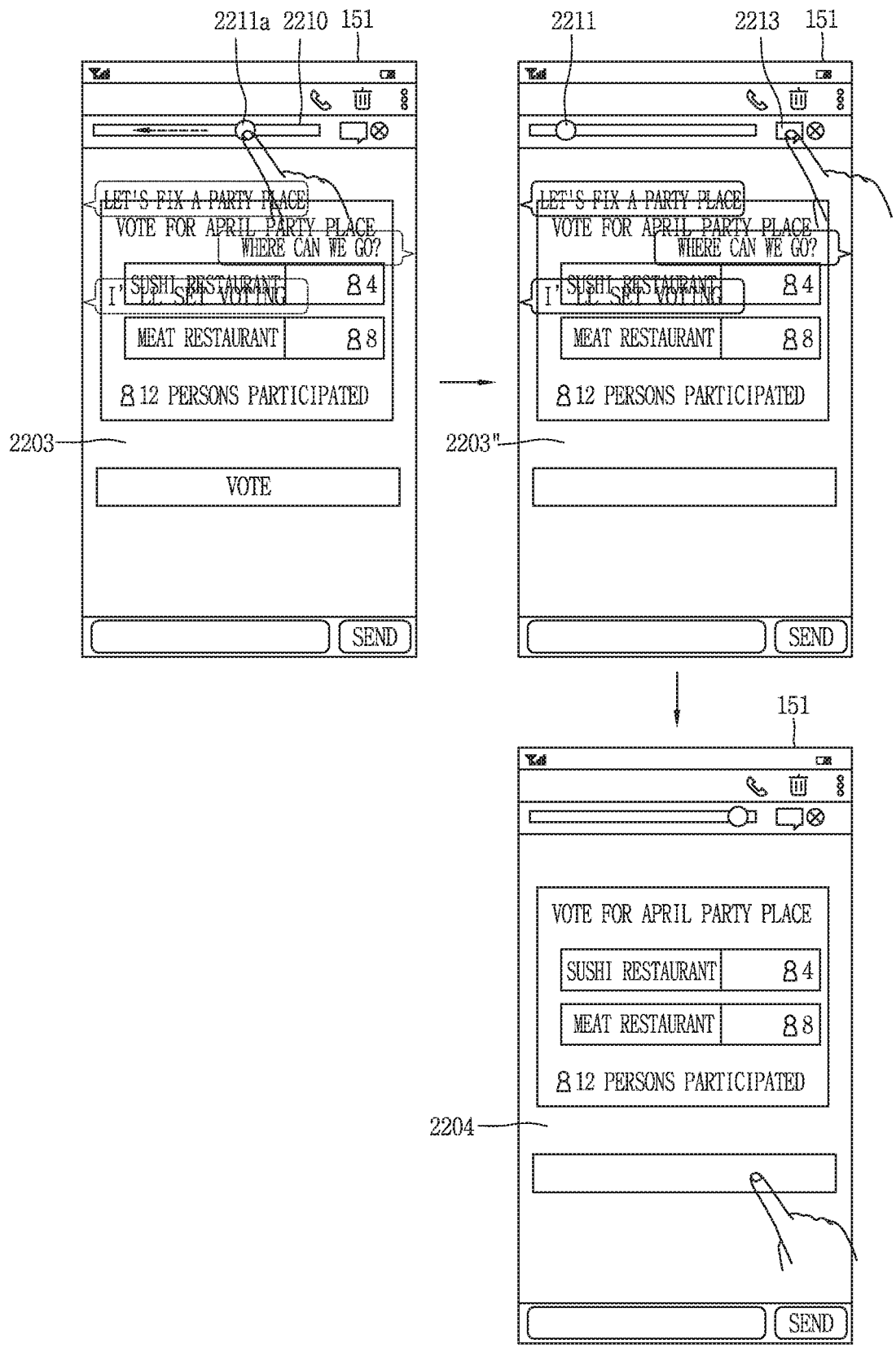

In detail, as illustrated in FIGS. 22A and 22B, while an image corresponding to a shared content is displayed on a background area of a chat screen 2201, a bar-like indicator 2210 may be provided on a top of the chat screen 2201 to adjust transparency of the background area (or message area).

As illustrated in FIG. 22A, the bar-like indicator 2210 includes a moving object 2211 implemented to be movable in left and right directions within the indicator 2210. When the moving object 2211 moves to left or right using a drag touch input, the transparency of the background area of the chat screen 2201 is decreased or increased.

For example, as the moving object 2211 is moved to the right (2211a), the transparency of the background area gradually increases and the transparency of the message area is maintained. Accordingly, the messages displayed on the chat screen 2201 may be more clearly visible, thereby allowing concentration on the message-based conversation.

In addition, as illustrated in FIG. 22A, a first icon 2212 for turning on/off the background area on the chat screen may be further provided near the indicator 2210. When the user touches the first icon 2212 once, the shared content displayed on the background area completely disappears and only the message areas are left on the chat screen (2202). Accordingly, the user can be immersed in the message-based conversation with the chat partner. When the activated first icon is touched one more time, the first icon is deactivated even though the shared content displayed on the background area appears again.

FIG. 22B illustrates an operation in case of desiring to concentrate on the shared content displayed on the background area of the chat screen.

Referring to FIG. 22B, when the moving object 2211 included in the indicator 2210 is moved to left using a drag touch input, the transparency of the background area is gradually decreased according to a dragged degree and the transparency of the message area is maintained or increased. Accordingly, the content displayed on the background area of the chat screen, for example, a voting share screen 2203 may be more clearly visible (2203"), thereby allowing further concentration on the voting share screen.

Also, as illustrated in FIG. 22B, in addition to the first icon 2212 (FIG. 22A) for turning on/off the background area, a second icon 2213 for turning on/off the message areas may further be provided. When the user touches the second icon 2213, the message areas of the chat screen completely disappear and only the vote sharing screen is left (2204). Even in this instance, when a new text message is received, the received text message is immediately displayed on the current screen 2204.

When the second icon 2213 is touched again, the disappeared message areas immediately appear on the chat screen and the second icon 2213 is deactivated.

According to the foregoing embodiments, chat conversations can be continued while checking shared contents on a full chat screen, and also the screen can be controlled such that a currently-preferred portion of the shared content and chat conversations within the chat screen can be more immersed.

Hereinafter, description will be given in detail of a method of changing an image of a content displayed on a background area based on a message output in a message area of a chat screen, with reference to FIGS. 23A, 23B and 23C.

While a shared content is displayed on a background area of a chat screen, when a message associated with the displayed content is transmitted/received and output in a message area of the chat screen, the controller 180 detects information associated with the content from the message output in the message area. The controller 180 may then change the shared content currently displayed on the background area differently based on the detected information.

In this instance, the controller 180 may differently generate a control command related to the change of the shared content based on an attribute of the shared content displayed on the background area.

Figure 23A:
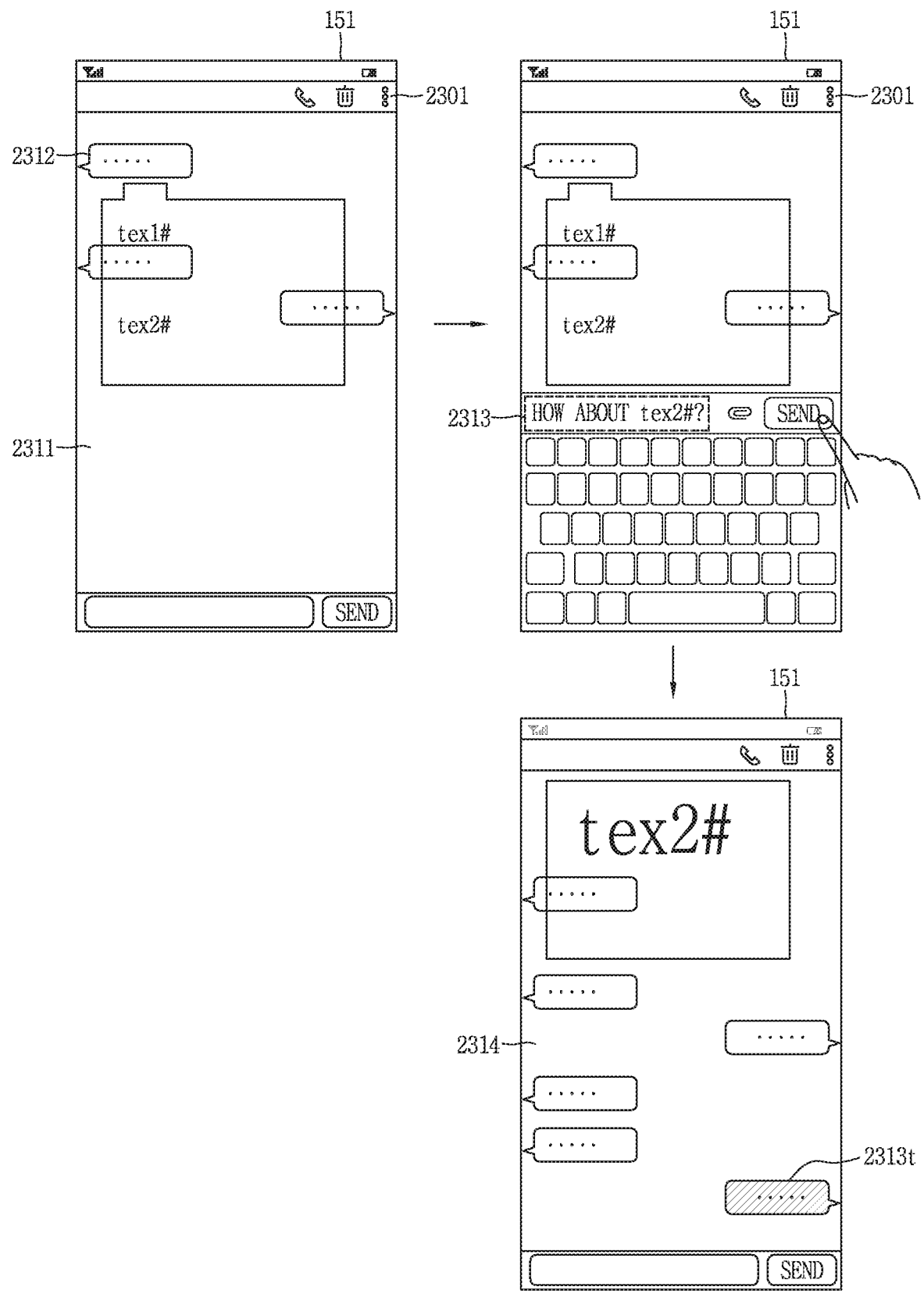
FIGS. 23A to 23C are exemplary views illustrating a method of changing an image of a content displayed in a background area based on a message output on a chat screen, in a mobile terminal in accordance with the present invention.

Specifically, FIG. 23A illustrates a case where a content displayed on a background area 2311 of a chat screen 2301 includes texts (e.g., text1#, text2#). When the user of the terminal transmits a message 'How about text2#' (2313), the transmitted message is displayed on a right message area 2313 of the chat screen (2313*t*). Then, the controller 180 compares the text of the transmitted message with the text included in the content displayed on the background area 2311, and extracts a matched area from the background area. Next, focusing is performed on the content displayed on the background area 2311 based on the extracted area.

The focused content based on the specific area is displayed on the background area of the chat screen (2314). In addition, the focused content based on the specific area is automatically shared with (transmitted to) other participants or users of the chat screen, so that all the participants are naturally immersed in the output portion of text2#. As a result, more realistic and interesting chatting can be executed using the shared content.

Figure 23B:
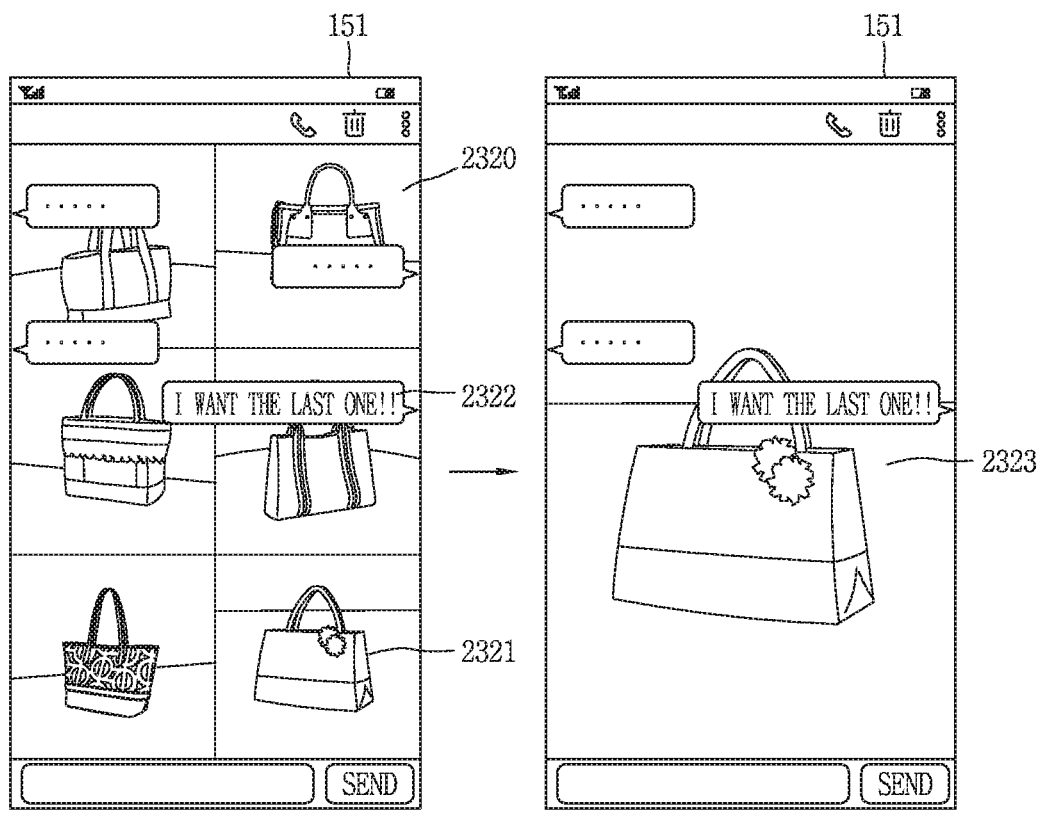

As another example, FIG. 23B illustrates a case where a plurality of images are displayed in a form of a tile view on a background area 2320 of a chat screen. In this instance, when the user of the terminal transmits a message 'I want the last one!!' indicating a specific image 2321 among the plurality of images (2322), the controller 180 may analyze the message and recognize the indicated specific image 2321 among the plurality of images. The controller 180 may then provide (display and share) the specific image by focusing the background image displayed in the form of the tile view in a manner that the specific image can be output in the full screen.

Also, when a specific event is included in a message output in a message area, the controller 180 may control a visual effect corresponding to the event to be displayed on the background area of the chat screen.

Figure 23C:
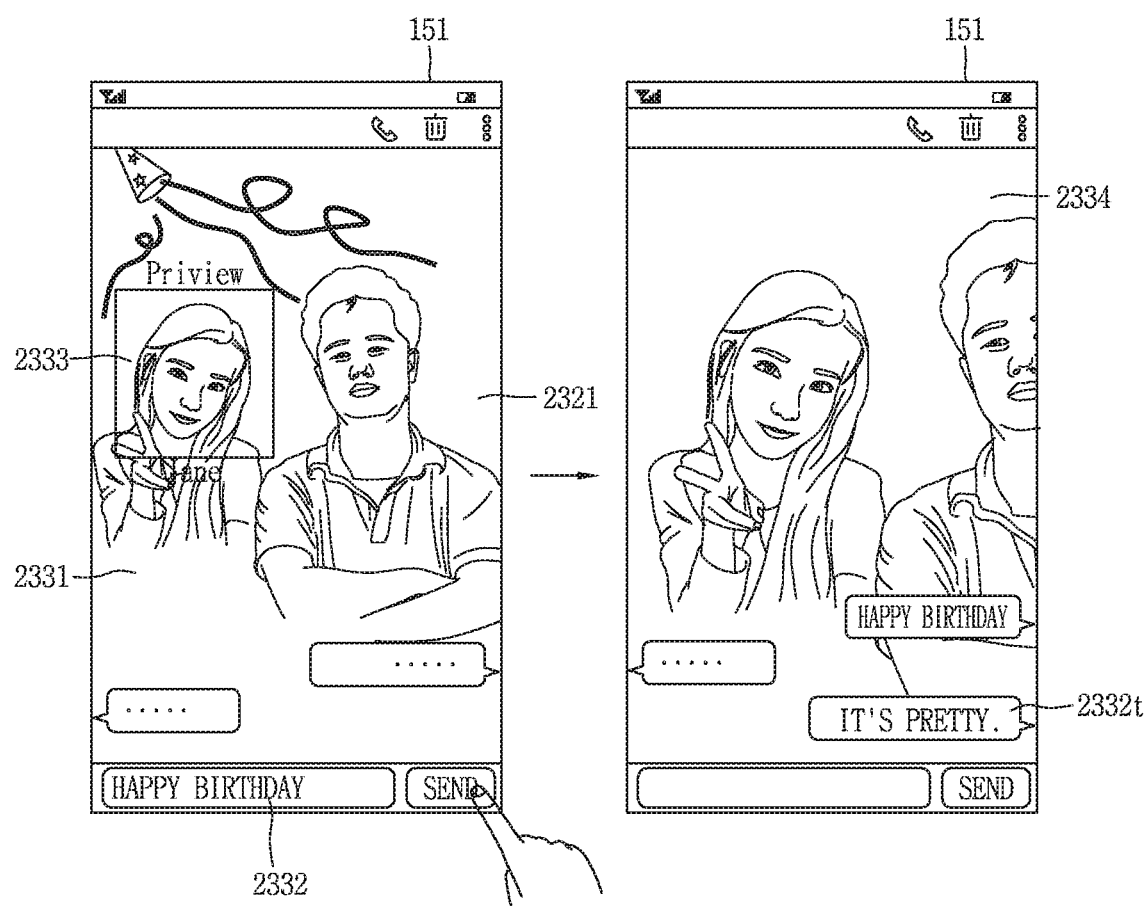

Specifically, referring to FIG. 23C, when a face area is included in a background area 2331 of a chat screen and the user of the terminal transmits a congratulatory message saying 'Happy birthday, 00', the controller 180 may detect information related to 'name' and 'anniversary (e.g., birthday)' from the message. Then, a face area that matches the name detected from a shared image on the background area 2331 may be extracted based on the detected information, and a box image 2333 may be output around the extracted face area. Next, a graphic effect (for example, firework popping effect, moving cake, etc.) corresponding to the detected anniversary information may be applied to a target object indicated by the box image 2333. Then, when a new message 'This photo is well taken' is transmitted (2332*t*), the face area within the box image 2333 displayed on the background area is zoomed in (2334), and the zoomed-in image is shared among the chat participants. On the other hand, in an application corresponding to the memory 160 of the terminal or the chat screen, a graphic effect that matches a specific event may be stored in advance.

The foregoing embodiments have been given of the automatic change of a specific portion of an image on a background area based on a displayed message. Hereinafter, examples in which a user directly changes the image of the background area while performing a chat will be described in detail.

Figure 24A:
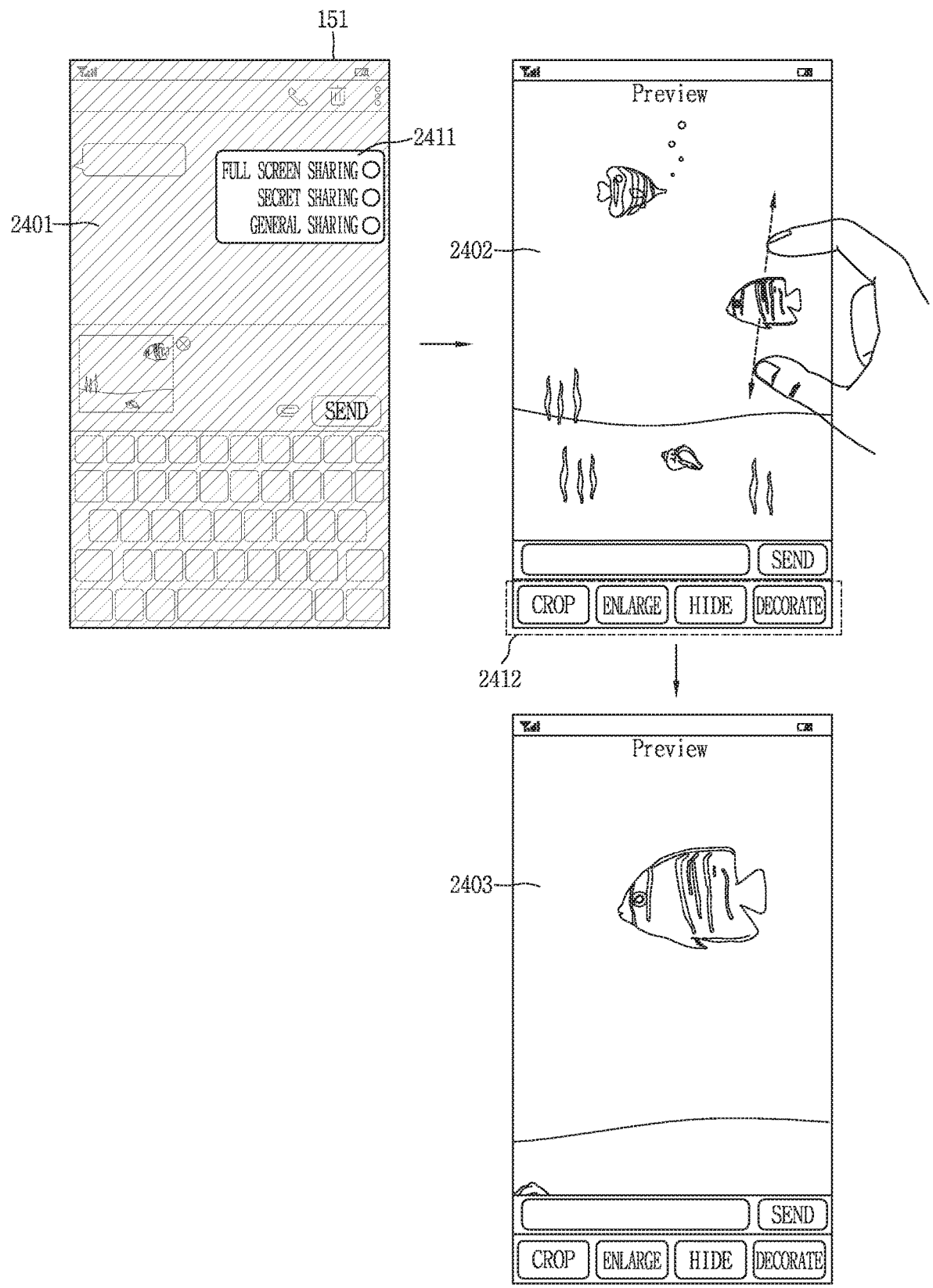
FIGS. 24A to 24E are exemplary views illustrating a method of editing an image of a content displayed in a background area on a chat screen, to be suitable for a situation, in a mobile terminal in accordance with the present invention.

First, FIG. 24A illustrates an example of editing a content to be shared in a terminal of an originator requesting for sharing the content. When a full screen sharing 2411 is selected as a transmitting mode of a selected photo image, an edit screen for editing the selected photo image is overlapped on a chat screen 2401.

On an upper portion of the edit screen, a photo image 2402 to be edited is displayed. On a lower portion of the edit screen, various edit menus 2412, for example, crop, enlarge, hide, decorate, and the like may be provided. In addition, the photo image 2402 may be moved in a specific direction or a specific portion of the photo image 2402 may be zoomed in/out by applying a touch gesture such as drag and pinch-in/out to the photo image 2402 to be edited. As such, the photo image is edited using the edit menus or the touch gesture, and then transmitted to a terminal of a chat partner when a transmit icon is touched. The edited photo image is displayed on the background area of the chat screen 2401.

Figure 24B:
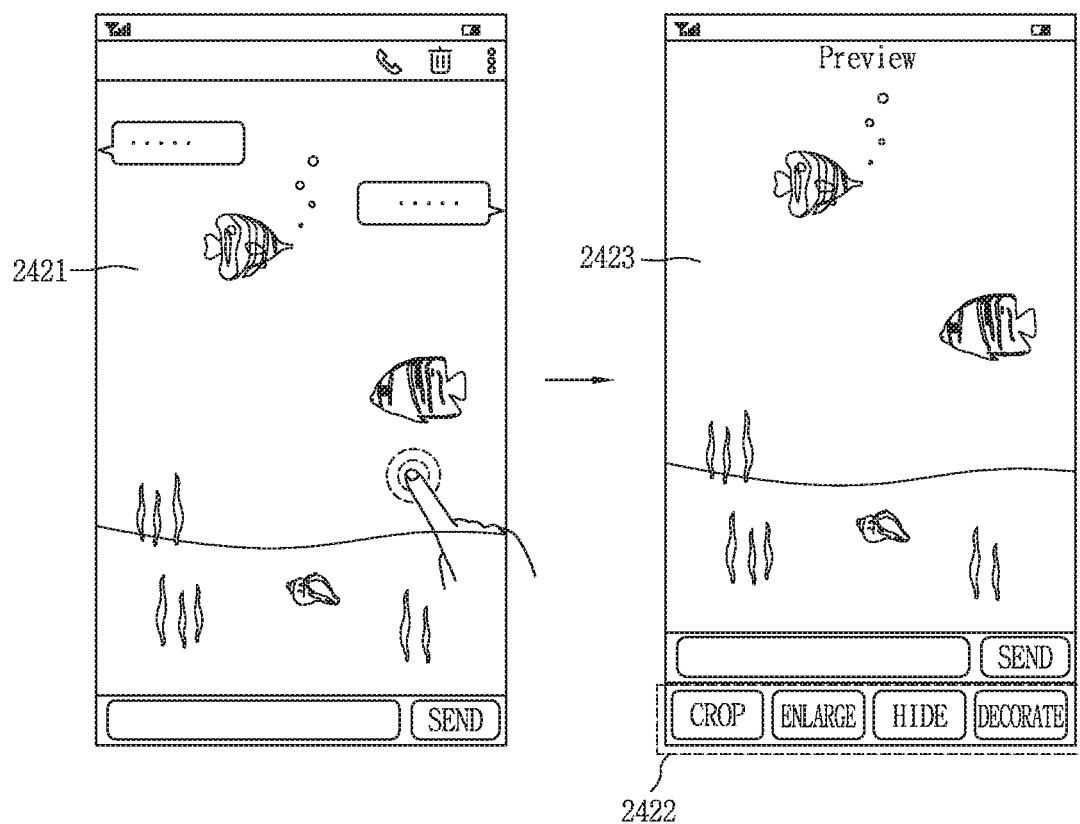

Next, FIG. 24B illustrates an example in which the user fast edits a shared content to be suitable for conversations while the shared content is displayed on the background area of the chat screen.

In detail, when a preset touch input is applied to a background area of a chat screen while a shared content is displayed on the background area, the controller 180 may immediately execute an edit mode for changing an image of the shared content displayed on the background area. When the edit mode is executed, an edit screen as illustrated in FIG. 24B is displayed. The shared content displayed on the background area is output fully on an upper portion of the edit screen (2423) and various edit menus 2422 are output in a lower portion of the edit screen. When a request for re-sharing the shared content edited using the edit menus is received, that is, when a touch input is applied to the transmit icon 2422 after the completion of the edition, the controller 180 not only transmits the edited image to the chat participants, but also resets the edited image as a background image of the chat screen.

Figure 24C:
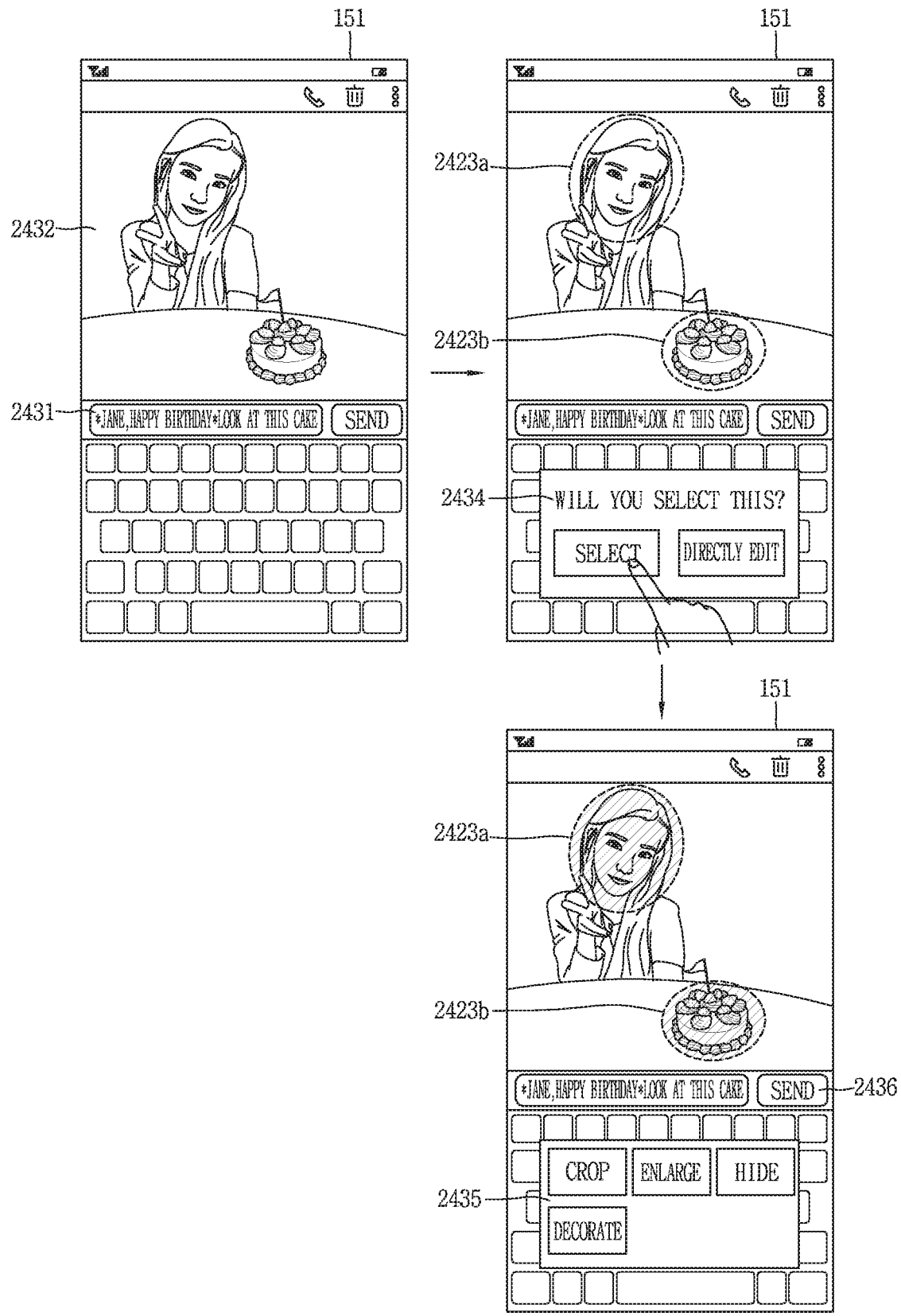

Next, FIG. 24C illustrates an example of editing a content displayed on the background area to be suitable for message contents by quickly selecting a specific area of the content using the message.

As illustrated in FIG. 24C, when direction, name and object are input after a special symbol (e.g., '*') (e.g., '* JANE', '* cake') while writing a message on a chat screen (2431), areas which match the input direction, name and object are extracted from the image currently displayed on the background area of the chat screen, and the current chat screen is switched to an edit screen. Select marks in a form of a dotted line are output in extracted first and second areas 2423*a* and 2423*b* on an upper portion of the switched edit screen. And, a first window 2434 is displayed on a lower portion of the edit screen to ask whether to edit or re-select the selected areas. Next, a second window 2435 including various edit menus for the selected areas, e.g., menus for cropping, highlighting, hiding, and decorating the selected areas, is displayed on the lower portion of the edit screen based on an input applied to the first window 2434. When the edition is completed, the image edited to be suitable for message contents may be re-shared with the chat participants by touching a transmit icon 2436.

Figure 24D:
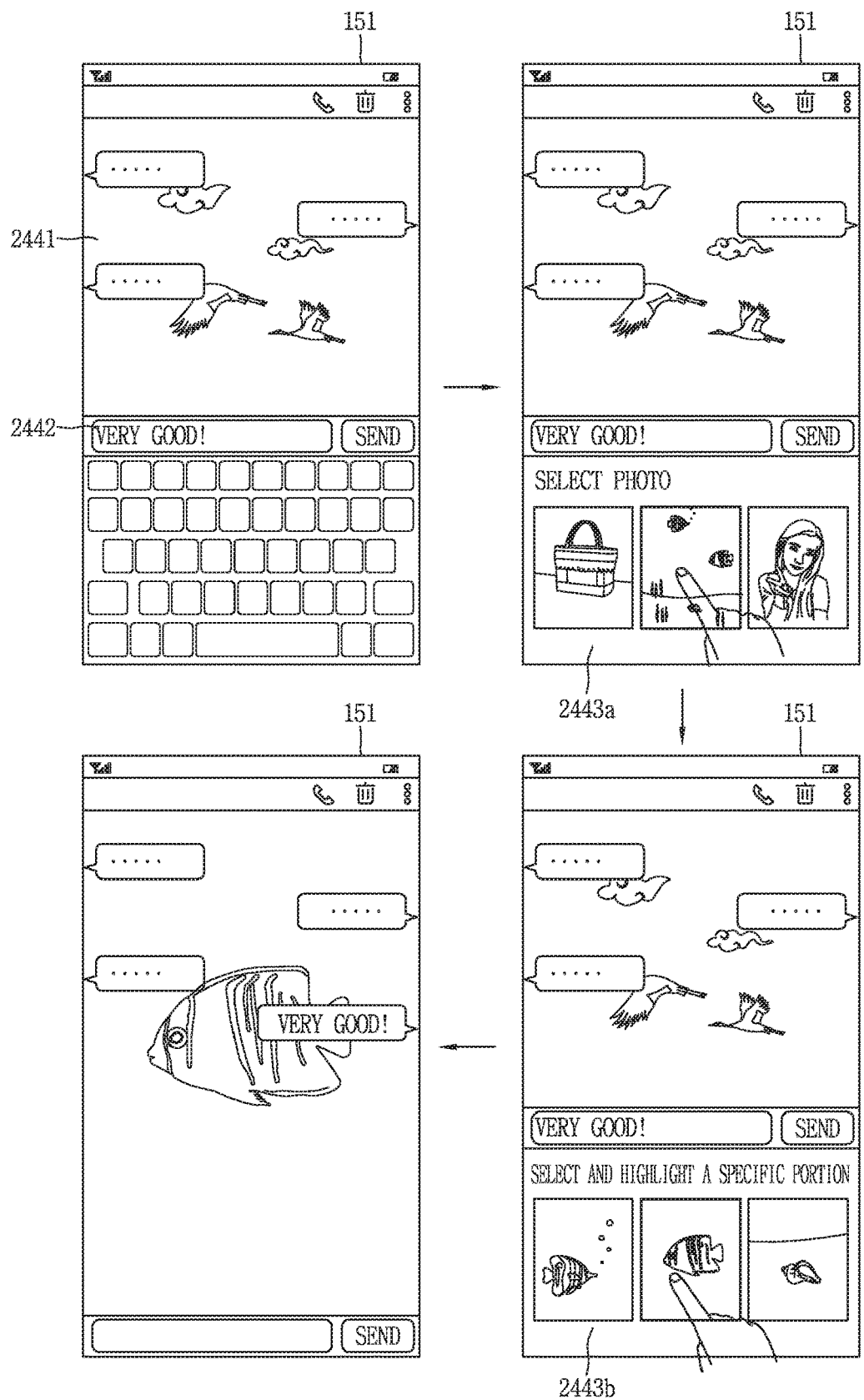

As another example, as illustrated in FIG. 24D, when an input area is touched after inputting a message 2442 related to a shared photo image 2441 displayed on a background area of a chat screen, thumbnail images of a plurality of areas extracted from the shared photo image 2441 may be recommended on a virtual keyboard area. In this instance, when a plurality of images are displayed on the background area of the chat screen in a form of a tile view, each of the images may be recommended on the virtual keyboard area (2443a). When one of the recommended areas or images is selected (2443b), the shared photo image edited based on the selected area is reset as an image of the background area of the chat screen upon transmission of the input message.

Figure 24E:
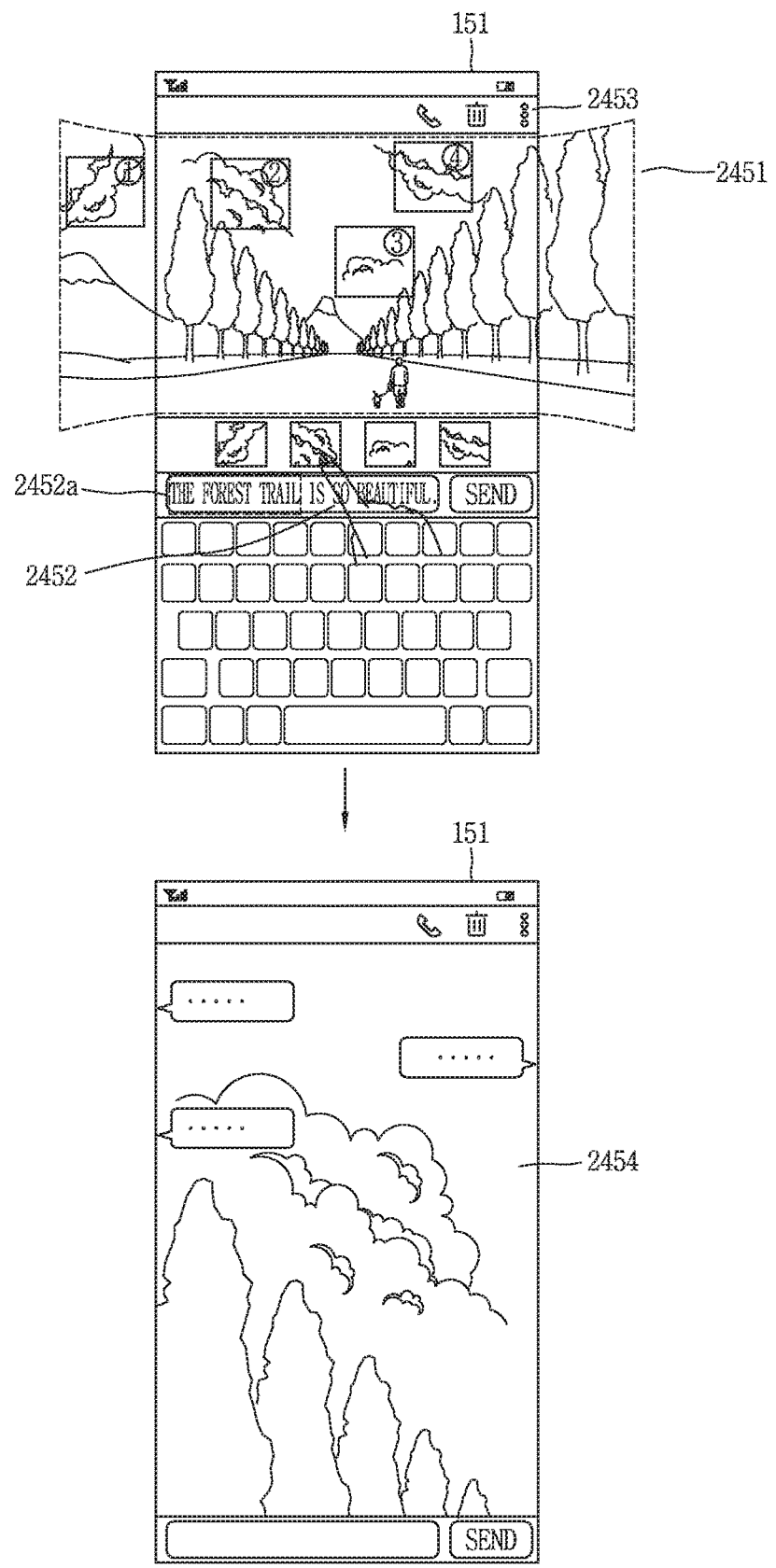

As another example, FIG. 24E illustrates a case where a content to be shared is a 360-degree image 2453. When a message is input on the chat screen (2452), the controller 180 may extract information related to a specific area, for example, 'forest trail' from the input message (2452a). The controller 180 detects specific areas matching the extracted information from the 360-degree background image 2453. In this instance, the detected specific areas may be displayed on an upper end of a message input area in a form of a preview image. Afterwards, if requested upon transmission of the message, one image connecting the detected specific areas, for example, areas including 'forest trail' is set as a background image 2454 of the chat screen.

On the other hand, when a drag touch input is applied to the chat screen in an up-and-down direction, the message area is scrolled up and down along the drag touch input. The background image of the chat screen is changed at a time point when information related to the shared content is displayed on the message area.

Figure 25:
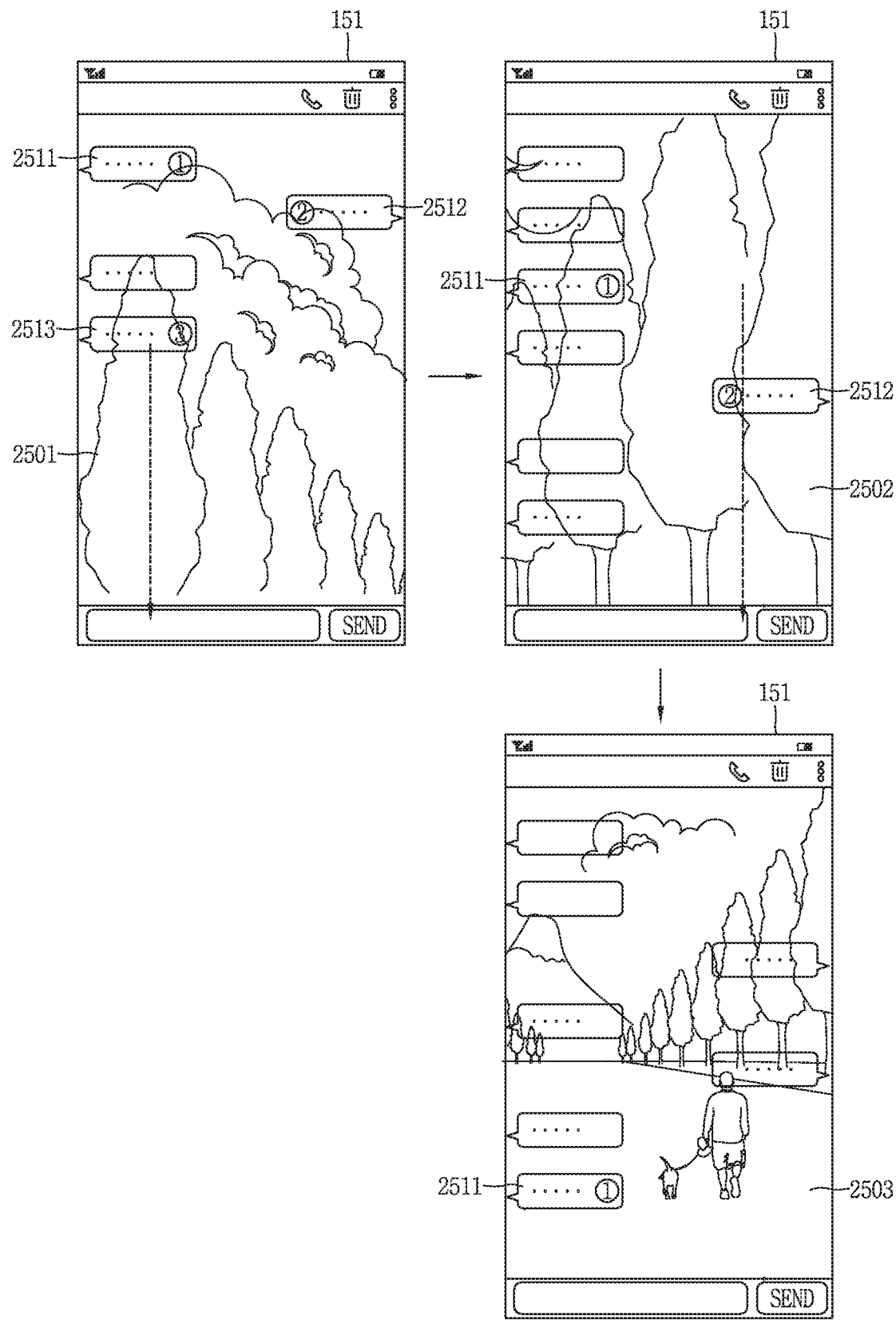
FIG. 25 is an exemplary view illustrating a screen change of a background area during a scroll of a chat screen, in a mobile terminal in accordance with the present invention.

However, when a shared content is edited and re-shared as described above, as illustrated in FIG. 25, the re-shared image is also applied to background images sequentially displayed when a scroll operation is performed on a chat screen. In detail, while a first message 2511, a second message 2512 and a third message 2513 are displayed on a message area of the chat screen, a third edited image 2501 which has been re-shared upon transmission of the third message 2513 is displayed as a background image. When the third message 2513 disappears from the chat screen in response to a scroll signal being received on the display unit 151, the background image is replaced with a second edited image 2502 which has been re-shared upon transmission of the second message 2512. Continuously, when the second message 2512 disappears from the chat screen in response to a scroll signal being received on the display unit 151, a first edited image 2503 which has been re-shared upon transmission of the first message 2511 is output as the background image of the chat screen. Thereafter, when the scroll direction is changed, the second edited image 2502 and the third edited image 2501 are sequentially displayed again.

Figure 26:
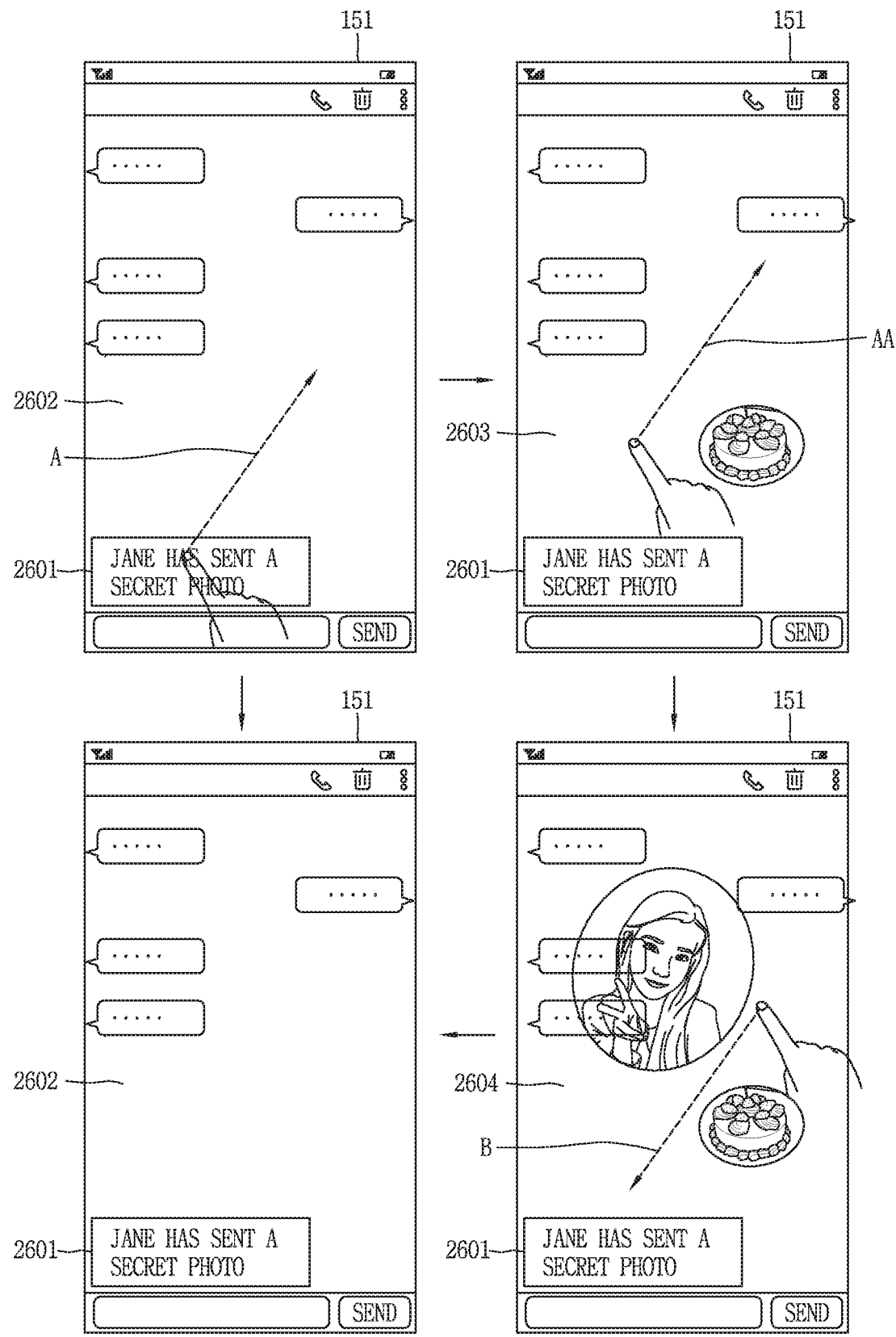
FIG. 26 is an exemplary view illustrating a method of displaying or hiding a secret content on a chat screen, in a mobile terminal in accordance with the present invention.

FIG. 26 illustrates a case where a shared content is re-shared by being edited in a secret mode. When a fourth message 2601 indicating that the shared content has been edited in the secret mode is displayed on a message area of a chat screen, an output of the shared content as a background image of the chat screen may be restricted at the beginning. Afterwards, when a swipe input A is applied to the display unit 151 in a diagonal direction, a part of the shared content edited in the secret mode may be exposed. Accordingly, the part of the hidden shared content may appear as the background image of the chat screen (2603). When the swipe input is applied continuously (AA), the full shared content may be exposed as the background image (2604). Afterwards, when a swipe input B is applied to the display unit 151 in a reverse direction, the output of the shared content is restricted again as in the first time. For this operation and implementation, when sharing of the content edited in the secret mode is requested, the controller 180 of the mobile terminal 100 according to the present invention may restrict a generation of a control command corresponding to the scroll signal or generate different control commands by distinguishing the swipe input applied in the up-and-down direction from the swipe input applied in the diagonal direction.

Hereinafter, description will be given of examples related to sharing mirrored information with chat participants while maintaining the chat, when a content to be shared is a mirrored screen of an execution screen of another application or a screen currently displayed on another device.

In this regard, description will be given of detailed examples related to easily sharing information provided in another application with chat participants while maintaining a seamless chat, with reference to FIGS. 27A, 27B, 28A and 28B.

When a content displayed on a background area of a chat screen is a mirrored screen of an execution screen of another application and a preset touch input is applied to the background area, the controller 180 of the mobile terminal 100 may access a link corresponding to the mirrored screen while maintaining the chat screen.

Here, mirroring typically refers to that an execution screen of an application is displayed as it is or processed and displayed (casted) on another adjacent display device. However, here, the mirroring refers to that an execution screen of another application is displayed as it is or processed and displayed on the chat screen. Therefore, the execution screen of the another application displayed in the form of the mirrored screen is distinguished from an independent window. When the execution screen of the another application is displayed in the form of the mirrored screen within the chat screen, the simultaneous execution of the chat and the content sharing can be performed seamlessly.

Figure 27A:
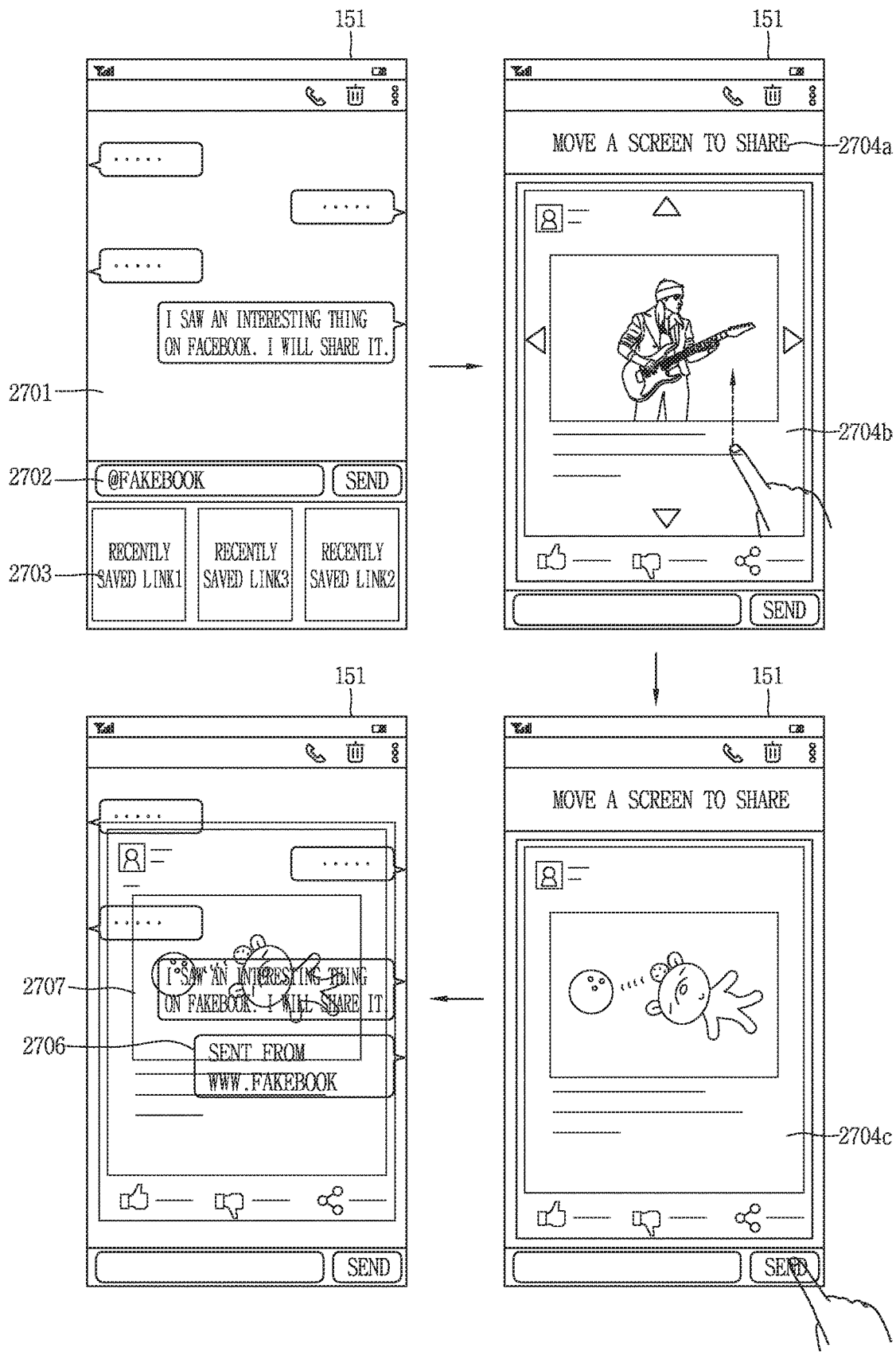
FIGS. 27A, 27B, 28A and 28B are exemplary views related to displaying an execution screen of another application as an image of a background area of a chat screen, in a mobile terminal in accordance with the present invention.

In detail, as illustrated in FIG. 27A, information regarding another application to be shared may be searched for by inputting a text (e.g., 'Facebook') after a predetermined special symbol (e.g., '@') at the time of inputting a message on the chat screen (2702). The search results may be recommended using, for example, a virtual keyboard area 2703. When specific link information is selected in the virtual keyboard area 2703, the controller 180 accesses a page corresponding to the selected link information, and displays the page on the chat screen 2704a in an overlapping manner (2704b). After arranging a portion to be shared of the displayed page to be fully exposed (2704c) by using a touch input, when a transmit icon 2705 is touched, the corresponding page is mirrored on the background area of the chat screen (2707). At the same time, a message 2706 indicating that the shared content is the mirrored screen is displayed on a message area.

Figure 27B:
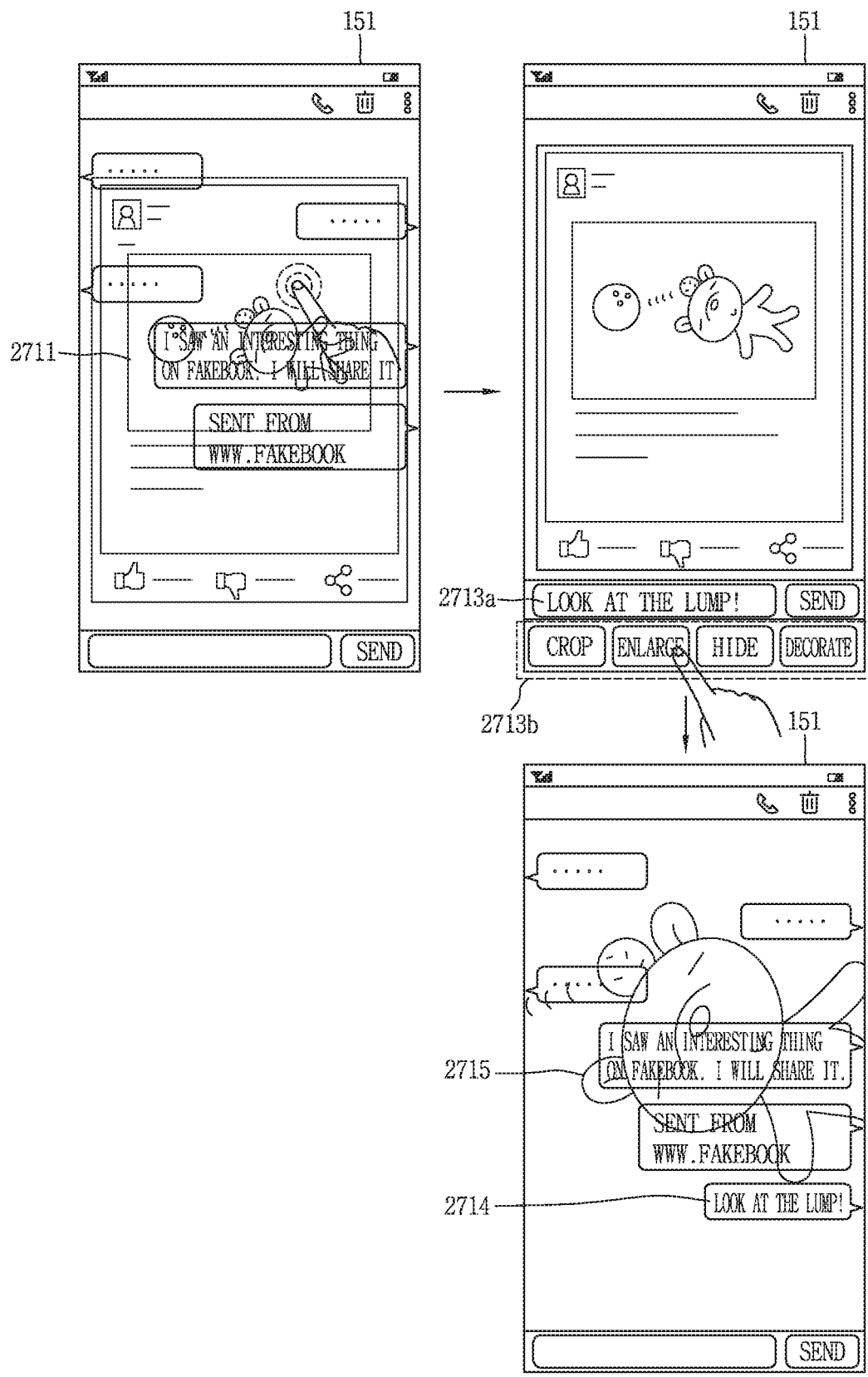

FIG. 27B illustrates an example of editing such mirrored screen. Referring to FIG. 27B, when a touch input is applied to a mirrored web page 2711 displayed on a background area of a chat screen, the controller 180 may access the corresponding web page and execute an edit mode for the web page. In this instance, areas which have not been displayed on the background area of the chat screen may also be displayed on a web page 2712 displayed on the edit screen. That is, the background image 2711 of the chat screen and the web page 2712 of the edit screen may not match each other. Also, editing for the web page 2712 using edit menus 2713b and message writing 2713a may simultaneously be performed on the edit screen. When the message written on the edit screen is transmitted, the transmitted message may be displayed on a message area of the chat screen (2714) and the image of the background area may be replaced with the edited web page (2715).

On the other hand, in one example, the edited web page may be implemented to be displayed as a background image in a form of a still image, other than being displayed as such mirrored screen any more.

Hereinafter, description will be given of an example of controlling a mirrored screen when execution screens of different applications are mirrored within the chat screen, with reference to FIGS. 28A and 28B.

Figure 28A:
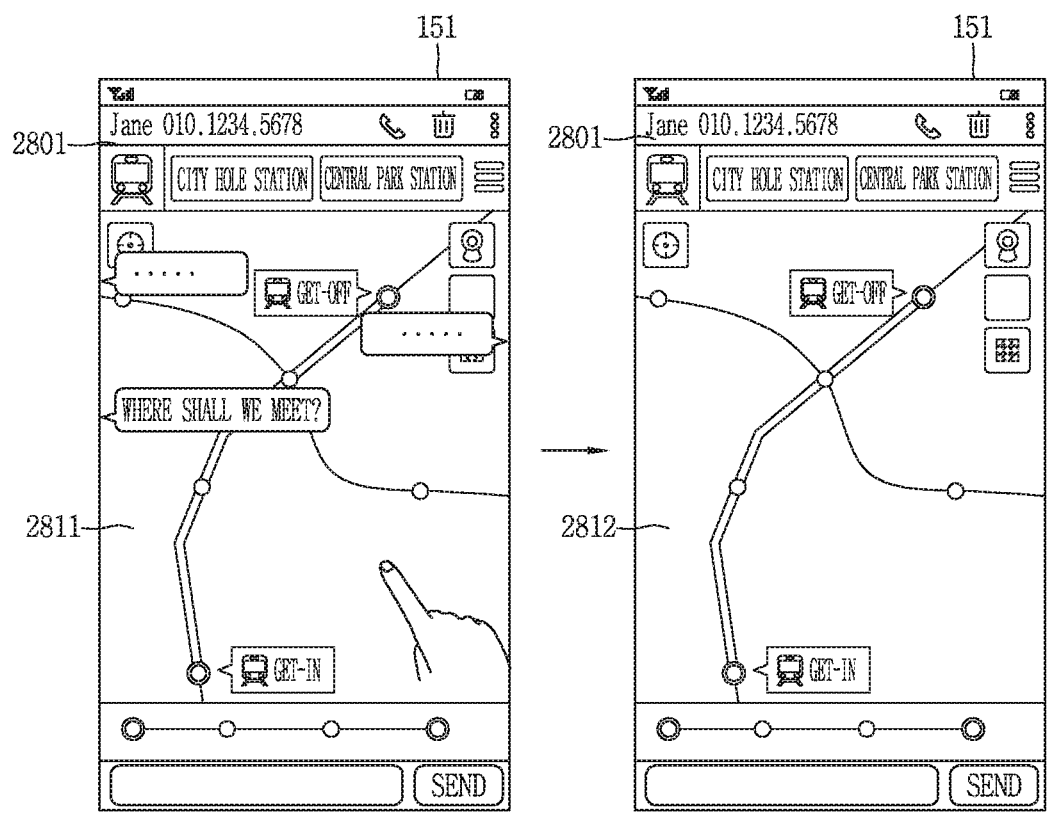

First, FIG. 28A illustrates a case where a map screen 2811 of a map application is mirrored on a background area of a chat screen 2801. The user of the terminal may interact with the map screen 2811 using a touch input while confirming messages. In detail, the user may search for a desired position, destination, POS, or the like or check a distance between two points by applying a swipe input to the map screen 2811. In this instance, message areas of the chat screen 2801 may remain still or be temporarily blurred only while interacting with the map screen 2811.

Also, when a preset touch input, for example, a long touch input, is applied to the background area on which the mirrored map screen is displayed, a link corresponding to the map screen 2811 is directly accessed. In this instance, an accessed map execution screen 2812 may be displayed on the chat screen and an output of the message areas may be restricted while searching for desired information. On the other hand, even in this instance, the hidden message areas may be automatically displayed unless an input for searching for information is applied to the accessed map execution screen 2812 for a predetermined time.

Figure 28B:
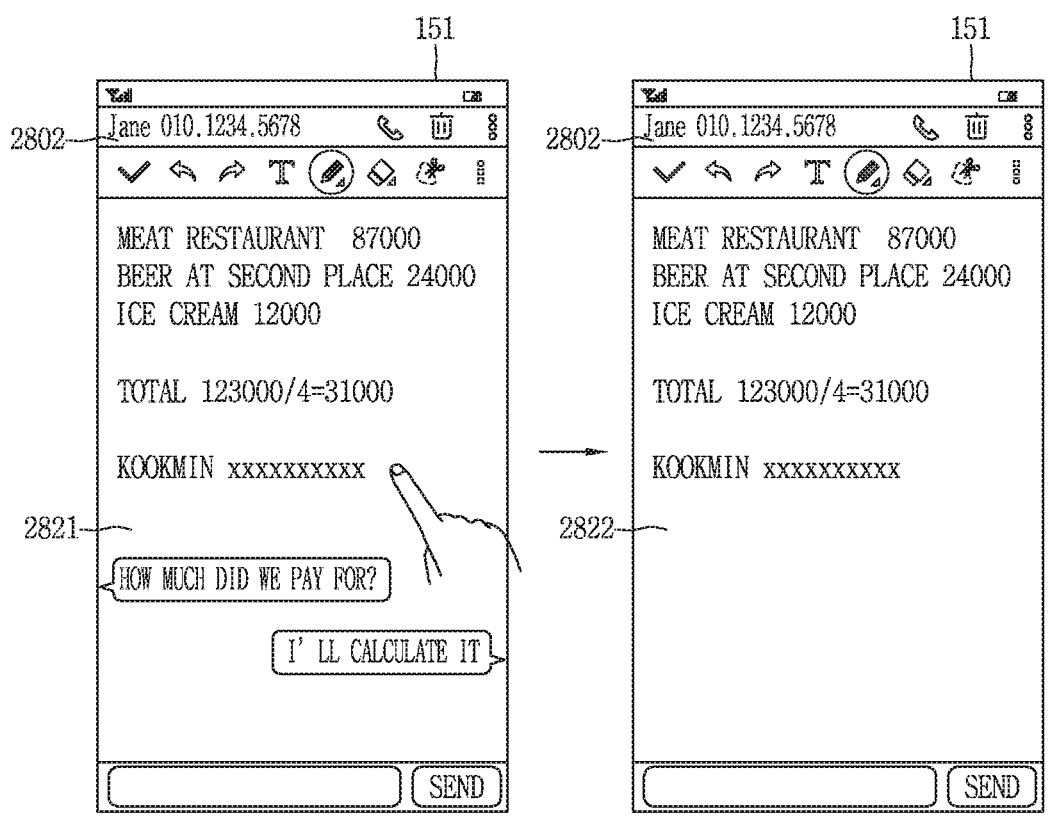

FIG. 28B illustrates a case where a specific memo page 2821 of a memo application is mirrored on a background area of a chat screen 2802. The user of the terminal, similar to FIG. 28A, may interact with the memo page 2821 or enter the corresponding memo page 2822 using a touch input while confirming messages on the chat screen. In addition, although not illustrated, specific text may be cut or copied in the entered memo page and directly input into the message area of the chat screen 2802.

According to the embodiments described above, chat conversations can be seamlessly executed while viewing a shared content in a great screen, by displaying the shared content as a background image of a chat screen during the chat. Accordingly, the user can advantageously execute the chat immediately from a current conversation time point even when unconfirmed shared contents are accumulated. In addition, the user can interact with a shared content displayed as a background image to edit and re-share the shared content in various manners according to a context of chat conversations. As a result, more realistic and interesting chatting and content sharing are allowed. In addition, since chat conversations can be quickly searched based on a content-shared time point during the chat, thereby providing user convenience. Furthermore, information related to different applications can be confirmed easily and fast without switching of the chat screen by incorporating a mirroring or casting technique.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal.

The invention claimed is:

1. A mobile terminal, comprising:
   an antenna installed in a main body or a case of the main body;
   a wireless communication unit disposed in the main body, operably coupled to the antenna and configured to transmit or receive wireless signals including information via the antenna to or from another mobile terminal, wherein the wireless communication unit comprises a broadcast receiving module, a mobile communication module, a wireless Internet module, a short-range communication module, and a location information module;
   a touch screen configured to output a group chat screen corresponding to a group chat; and
   a controller configured to:
      determine whether exclusive conversations between several participants in the group chat are continued over a reference range,
      group the exclusive conversations when the exclusive conversations are continued over the reference range,
      control the touch screen to display a skip area for selectively confirming the grouped exclusive conversations within the group chat screen,
      restrict download and output of received information belonging to the skip area and update an indication related to the exclusive conversations corresponding to the skip area, when the information is received while the group chat screen including the skip area is displayed, and
      control the touch screen to display guide information, which is related to an amount of data to be consumed during a download of the exclusive conversations corresponding to the skip area, on a pop-up window in response to a touch input received to the skip area,
   wherein the guide information includes options for selecting one of selectable display schemes, each display scheme consuming a different amount of data when the exclusive conversations corresponding to the skip area are downloaded.

2. The mobile terminal of claim 1, wherein the controller is further configured to determine whether or not the exclusive conversations are continued over the reference range based on at least one of a number of conversations, a conversation duration, or conversation contents between specific participants in the group chat.

3. The mobile terminal of claim 1, wherein the controller is further configured to:
   fold a displayed area of the exclusive conversations, replace the displayed area of the exclusive conversations with the skip area when the exclusive conversations are continued over the reference range, and control the touch screen to display the skip area on the group chat screen at a started position of the exclusive conversations.

4. The mobile terminal of claim 1, wherein when the information belonging to the skip area is received, the controller is further configured to update at least one of keywords, a cumulative number of chat conversations, or a cumulative number of shared contents, all related to the exclusive conversations output in the skip area, and wherein when information not belonging to the skip area is received, the controller is further configured to download the information not belonging to the skip area and output the downloaded information within the group chat screen outside of the skip area.

5. The mobile terminal of claim 1, wherein the participants corresponding to the skip area are set based on a user input applied on the group chat screen.

6. The mobile terminal of claim 1, wherein the pop-up window is output over the group chat screen such that the skip area is obscured by the pop-up window.

7. The mobile terminal of claim 1, wherein the controller is further configured to provide a summary of the exclusive conversations corresponding to the skip area within the group chat screen, when a preset gesture is applied to the group chat screen while the exclusive conversations corresponding to the skip area are fully output within the group chat screen.

8. The mobile terminal of claim 1, wherein the controller is further configured to:

output an icon for checking only shared contents in a distinguishing manner in the skip area when the shared contents are present in the exclusive conversations corresponding to the skip area, and output the shared contents in the exclusive conversations corresponding to the skip area in a form of a preview image within the group chat screen, when a touch is applied to the icon.

9. The mobile terminal of claim 8, wherein the controller is further configured to:

generate an image whose size changes in the skip area when one of preview images is selected, output a part of the contents shared in the exclusive conversations within the generated image based on the selected preview image, and restrict a download of other contents shared in the exclusive conversations while the part of the shared contents is output.

10. The mobile terminal of claim 1, wherein the controller is further configured to:

generate an image whose size changes in the skip area when a touch input is applied to one of keywords output in the skip area, and output exclusive conversations related to the touch input-applied keyword within the generated image.

11. The mobile terminal of claim 1, wherein the controller is further configured to unfold the entire exclusive conversations corresponding to the skip area within the group chat screen while the skip area disappears, when a touch applied to the skip area is dragged toward a top of the group chat screen.

12. The mobile terminal of claim 1, wherein the controller is further configured to:

provide a second skip area for selectively checking a second exclusive conversation in the group chat screen when the second exclusive conversation is continued over a reference range after first information not belonging to the skip area is output in the group chat screen, and integrate the skip area and the second skip area with each other within the group chat screen.

13. The mobile terminal of claim 1, wherein the controller is further configured to:

reconstruct a content shared in the exclusive conversations corresponding to the skip area to correspond to a low power mode and output the reconstructed content, when a charged level of a battery disposed in the main body is less than a reference value at a time point when a touch input is applied to the skip area, and convert a file size or a file format of the content shared in the exclusive conversations differently in the low power mode.

14. The mobile terminal of claim 1, wherein the group chat screen includes a message area and a background area, wherein the controller is further configured to set a first content of a plurality of contents shared in the group chat screen as an image of the background area, and wherein when a sharing request for a second content related to the group chat screen is received while the first content is output, the controller is further configured to output information related to the sharing request for the second content in the message area and control the touch screen to display an image corresponding to the second content instead of the set image of the background area.

15. The mobile terminal of claim 14, wherein the controller is further configured to control display of information related to an originator who has requested for sharing of the second content and attribute information related to the second content in the message area when the sharing request for the second content is received.

16. The mobile terminal of claim 14, wherein the controller is further configured to:

output a detail view image of the shared content output in the background area in the entire touch screen when a touch input is applied to the background area while the group chat screen is output, and execute a search mode based on a content-shared time point when a touch input is applied to the output detail view image in left and right directions.

17. The mobile terminal of claim 16, wherein in the search mode, the controller is further configured to output one of shared contents in the group chat screen as a background image, and the controller is configured to output at least part of the message area displayed at a shared time point of the corresponding content in the touch screen.

18. The mobile terminal of claim 16, wherein the image of the second content is changed to correspond to an indication indicating a secret content and displayed in the background area when the indication is included in the attribute information displayed in the message area, and the touch screen is controlled to output at least part of the hidden second content when a touch input is applied to the background area.

19. The mobile terminal of claim 16, wherein a plurality of images corresponding to a plurality of contents are output in the background area in a form of a collective view or a slide show, when it is confirmed, based on the information related to the sharing request output in the message area, that a sharing request for the plurality of contents is received for a preset time and information related to an originator sending the request for sharing the plurality of contents is the same.

20. The mobile terminal of claim 16, wherein an image output in the background area is differently changed based on a message related to a shared content when the message related to the shared content output in the background area is output in the message area.

* * * * *